(12) United States Patent
Thompson et al.

(10) Patent No.: US 10,002,214 B2
(45) Date of Patent: Jun. 19, 2018

(54) HOST MATERIALS AND LIGANDS FOR DOPANTS IN ORGANIC LIGHT EMITTING DIODES

(71) Applicant: University of Southern California, Los Angeles, CA (US)

(72) Inventors: Mark E. Thompson, Anaheim Hills, CA (US); Patrick Saris, Los Angeles, CA (US); Peter I. Djurovich, Long Beach, CA (US); Hsiao-fan Chen, Lawrenceville, NJ (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 116 days.

(21) Appl. No.: 14/917,445

(22) PCT Filed: Oct. 29, 2014

(86) PCT No.: PCT/US2014/063013
§ 371 (c)(1),
(2) Date: Mar. 8, 2016

(87) PCT Pub. No.: WO2015/066244
PCT Pub. Date: May 7, 2015

(65) Prior Publication Data
US 2016/0232265 A1    Aug. 11, 2016

Related U.S. Application Data

(60) Provisional application No. 61/897,091, filed on Oct. 29, 2013, provisional application No. 61/994,065, (Continued)

(51) Int. Cl.
*G06F 17/50* (2006.01)
*H01L 51/00* (2006.01)

(52) U.S. Cl.
CPC ........ *G06F 17/5036* (2013.01); *H01L 51/002* (2013.01); *G06F 2217/02* (2013.01); *H01L 2251/552* (2013.01)

(58) Field of Classification Search
CPC .................................................... G06F 17/5036
(Continued)

(56) References Cited

U.S. PATENT DOCUMENTS 6,210,900 B1    4/2001   Yamashita et al.
6,377,895 B1    4/2002   Horlbeck
(Continued)

OTHER PUBLICATIONS

Hackmann, J. et al., "The Harvard Clean Energy Project: Large-Scale Computational Screening and Design of Organic Photovoltaics on the World Community Grid," J. Phys. Chem. Lett., 2011, 2 (17), pp. 2241-2251.
(Continued)

*Primary Examiner* — Suchin Parihar
(74) *Attorney, Agent, or Firm* — Duane Morris LLP

(57) ABSTRACT

Compound libraries, systems, methods, and apparatus, including computer program apparatus, are described for implementing techniques for processing data from a combinatorial inquiry to determine materials of use in various photoelectronic devices, e.g., organic light emitting diodes. The libraries include a collection of putative compounds of use as components of OLED devices, which are cross-referenced with one or more electronic property relevant to the efficacy of the compounds in an OLED device. The techniques broadly include receiving data from a chemical experiment on a library of materials having a plurality of members and generating a queriable representation of the chemical experiment. The chemical experiment is optionally an in silico experiment.

20 Claims, 46 Drawing Sheets

Related U.S. Application Data filed on May 15, 2014, provisional application No. 62/003,472, filed on May 27, 2014, provisional application No. 62/036,533, filed on Aug. 12, 2014.

(58) Field of Classification Search
USPC .................................................... 716/106
See application file for complete search history.

(56) References Cited

U.S. PATENT DOCUMENTS

| | | |
|---|---|---|
| 6,448,412 B1 | 9/2002 | Murphy et al. |
| 6,567,751 B1 | 5/2003 | Sun |
| 7,338,428 B2 | 3/2008 | Chang et al. |
| 2003/0129659 A1 | 7/2003 | Whelihan et al. |
| 2004/0038310 A1 | 2/2004 | Bawendi et al. |
| 2007/0285843 A1* | 12/2007 | Tran ................... B82Y 10/00 360/245.9 |
| 2007/0295973 A1 | 12/2007 | Jinbo et al. |
| 2008/0157235 A1 | 7/2008 | Rogers et al. |
| 2008/0206890 A1 | 8/2008 | Burstyn et al. |
| 2012/0263793 A1* | 10/2012 | Vitaliano ............ G01N 21/554 424/490 |
| 2016/0126020 A1* | 5/2016 | Snaith .................. H01L 51/002 136/263 |

OTHER PUBLICATIONS

Valleau, S. and Roman, C., ""Molecular Space" Clean Energy Project Database (CEPDB)" •v 1.0.0 (Jun. 24, 2013): original CEPDB release http://www.molecularspace.org/explore/about-cepdb/.

International Search Report and Written Opinion dated Mar. 20, 2015 for PCT/US2014/063013.

Halls, Mathew et al., "Virtual screening of electron acceptor materials for organic photovoltaic applications" New Journal of Physics, vol. 15, Oct. 2013, 105029, pp. 1-15.

\* cited by examiner

| structure | Title | Hole Reorganization Energy (eV) | Electron Reorganization Energy (eV) | Triplet Energy (eV) | Dipole (D) | HOMO (eV) | LUMO (eV) |
|---|---|---|---|---|---|---|---|
|  | h3_N_3_4 | 0.23 | 0.33 | 3.03 | 3.94 | -6.10 | -1.67 |
|  | h3 | 0.19 | 0.26 | 3.07 [2.88][a] | 0.00 | -5.98 | -0.94 |
|  | h3_N_3_6 | 0.21 | 0.32 | 3.06 | 2.72 | -6.34 | -1.52 |
|  | h3_N_3_9 | 1.05 | 0.35 | 3.07 | 1.72 | -6.25 | -1.31 |
|  | h3_N_3_10 | 0.56 | 0.25 | 3.06 | 0.87 | -6.32 | -1.47 |

| Structure | Name | | | | | | |
|---|---|---|---|---|---|---|---|
|  | h3_N_3_6 | 0.76 | 0.28 | 3.07 [2.88][a] | 0.48 | -6.25 | -1.61 |
|  | h3_N_3_11 | 0.23 | 0.33 | 3.59 | 1.95 | -6.36 | -1.51 |
|  | h3_N_3_12 | 1.07 | 0.30 | 3.07 [2.93][a] | 2.82 | -6.18 | -1.35 |
|  | h3_N_3_15 | 0.25 | 0.49 | 3.08 [2.93][a] | 3.15 | -6.31 | -1.28 |
|  | h3_N_3_16 | 0.21 | 0.25 | 3.05 | 4.25 | -6.32 | -1.47 |
|  | h3_N_4_5 | 0.23 | 0.27 | 2.66 | 5.07 | -6.16 | -1.65 |
|  | h3_N_3_17 | 0.21 | 0.33 | 3.15 | 3.78 | -6.34 | -1.47 |
|  | h3_N_4_11 | 0.50 | 0.34 | 3.65 | 0.61 | -6.41 | -1.66 |

| | | | | | | |
|---|---|---|---|---|---|---|
|  | h3_N_4_16 | 0.49 | 0.31 | 3.14 | 4.14 | -6.47 | -1.58 |
|  | h3_N_4_10 | 0.81 | 0.29 | 3.16 | 2.58 | -6.47 | -1.56 |

| Structure | | Hole Reorg. Energy (eV) | Electron Reorga. Energy (eV) | Triplet Energy (eV) | Dipole (D) | HOMO (eV) | LUMO (eV) |
|---|---|---|---|---|---|---|---|
|  6,12 H2P Ph | Calc. | 0.30 | 0.55 | 2.63 | 6.41 | -6.10 | -1.67 |
| | Exp. | -- | -- | 2.67 | -- | -5.90 | -2.33 |
|  6,12-H2P-tBu | Calc. | 0.28 | 0.22 | 2.90 | 6.67 | -5.96 | -0.94 |
| | Exp. | -- | -- | 2.84 | -- | -5.97 | -1.29 |
|  H2P_N_6_12 | Calc. | 0.28 | 0.36 | 3.22 | 6.2 | -5.65 | -1.06 |

FIG. 5A

| | | | | | | |
|---|---|---|---|---|---|---|
| HOMO (eV) | -5.85 | -5.98 | -5.78 | -6.39 | -6.25 | |
| LUMO (eV) | -0.93 | -1.22 | -1.34 | -1.64 | -1.61 | |
| H-L gap (eV) | 4.92 | 4.76 | 4.44 | 4.75 | 4.64 | |
| S₀–T1 (nM) | | | | | | |

$X_1$ = CH, C-Alkyl, C-Ar, or N
$X_2$ = CH, C-Alkyl, C-Ar, or N
$X_3$ = CH, C-Alkyl, C-Ar, or N
$X_4$ = CH, C-Alkyl, C-Ar, or N
$X_5$ = CH, C-Alkyl, C-Ar, or N
$X_6$ = CH, C-Alkyl, C-Ar, or N
$X_7$ = CH, C-Alkyl, C-Ar, or N
$X_8$ = CH, C-Alkyl, C-Ar, or N $R_1$ = H, Alkyl, Ar, or $SiR_3$
$R_2$ = H, Alkyl, Ar, or $SiR_3$
$R_3$ = H, Alkyl, Ar, or $SiR_3$
R = Alkyl or Ar Alkyl:

n = 0 - 12

Ar:

Reorg. anion < 0.27
dipole < 1.3

Reorg. anion = 0.25
dipole < 1.3

X = N, CH, C-aryl, C-alkyl, C-heteroaryl, C-alkenyl, C-alkynyl, Si-alkyl, Si-aryl
Y = CR₂, SiR₂, GeR₂, O, S, Se, NR, PR
R = alkyl, aryl, heteroaryl 103,239

204,786

Number of unique structures 1,165,644

32,442

Y= CH2, CMe2, O, S, NMe, Pme

X= CH, N, CPh; 0-4 N; 0-4 CPh

Positions 3, 4, 5, 6, 9, 10, 11, 12 are selected to form a library. Each of these positions can be either N or CH. The library is generated by considering all compounds that 0-4 nitrogen atoms in the eight positions.

FIG. 17B

| Title | Hole Reorganization Energy (eV) | Electron Reorganization Energy (eV) | Triplet Energy (eV) | Dipole (D) | HOMO (eV) | LUMO(eV) | H-L gap (eV) |
|---|---|---|---|---|---|---|---|
| H2P | 0.233207 | 0.296025 | 2.897976 | 3.8455 | -5.29825 | -0.67945 | 4.618795 |
| H2P_N_3 | 0.24551 | 0.277672 | 2.890585 | 4.3791 | -5.49308 | -0.95892 | 4.534169 |
| H2P_N_4 | 0.23725 | 0.337711 | 2.884827 | 6.2306 | -5.50914 | -1.04654 | 4.462604 |
| H2P_N_9 | 0.232376 | 0.343602 | 2.880366 | 2.2283 | -5.47322 | -1.04436 | 4.428862 |
| H2P_N_6 | 0.24481 | 0.271694 | 2.896937 | 4.3634 | -5.45907 | -0.91919 | 4.539883 |
| H2P_N_5 | 0.252493 | 0.278322 | 2.916191 | 6.283 | -5.62206 | -0.89497 | 4.727095 |
| H2P_N_10 | 0.235874 | 0.333926 | 2.889243 | 2.5166 | -5.50587 | -1.06776 | 4.438114 |
| H2P_N_11 | 0.27093 | 0.284488 | 2.878575 | 4.495 | -5.62098 | -0.97497 | 4.646006 |
| H2P_N_12 | 0.23645 | 0.311368 | 2.833603 | 5.3764 | -5.42859 | -0.96653 | 4.46206 |
| H2P_N_3_5 | 0.289471 | 0.276782 | 2.898346 | 6.6279 | -5.80492 | -1.1981 | 4.606822 |
| H2P_N_3_4 | 0.253385 | 0.345093 | 2.811247 | 7.173 | -5.69472 | -1.45225 | 4.242467 |
| H2P_NI_3_6 | 1.256418 | 0.305614 | 3.013178 | 4.4377 | -5.63485 | -1.33307 | 4.301787 |
| H2P_NI_3_10 | 1.256444 | 0.3325 | 2.880311 | 2.081 | -5.70397 | -1.31456 | 4.389406 |
| H2P_NI_3_11 | 0.539363 | 0.243497 | 3.347288 | 3.8917 | -5.83485 | -1.22232 | 4.612537 |
| H2P_N1_3_9 | 0.661798 | 0.451848 | 2.888906 | 3.5919 | -5.68655 | -1.23837 | 4.448182 |
| H2P_NI_3_12 | | 0.336604 | 2.851723 | 5.5906 | -5.66506 | -1.14558 | 4.519475 |
| H2P_N_4_5 | 0.255014 | 0.35736 | 2.923963 | 8.9148 | -5.84737 | -1.3064 | 4.540972 |
| H2P_N_4_6 | 0.252723 | 0.341192 | 2.866193 | 6.4958 | -5.67594 | -1.27946 | 4.396481 |
| H2P_N_4_9 | 1.367968 | 0.375783 | 2.874098 | 4.7925 | -5.69118 | -1.36001 | 4.331175 |
| H2P_N_4_10 | 1.311106 | 0.371778 | 2.84857 | 4.2495 | -5.7203 | -1.43266 | 4.287637 |
| H2P_N_4_11 | 0.266651 | 0.298106 | 2.865572 | 6.1546 | -5.83649 | -1.27973 | 4.556754 |
| H2P_N_4_12 | 1.350328 | 0.371225 | 2.830562 | 7.6212 | -5.64792 | -1.27511 | 4.372808 |
| H2P_N_5_9 | 1.280826 | 0.300542 | 2.910723 | 4.3974 | -5.80383 | -1.26749 | 4.536346 |
| H2P_N_5_6 | 0.261877 | 0.292357 | 2.827989 | 7.0902 | -5.7774-4 | -1.28218 | 4.495257 |
| H2P_N_5_11 | 0.262374 | 0.338307 | 2.912886 | 6.9485 | -5.97091 | -1.2449 | 4.726006 |
| H2P_N_5_12 | 0.255516 | 0.277399 | 2.871094 | 7.8593 | -5.77009 | -1.19647 | 4.573625 |
| H2P_N_5_10 | 1.271891 | 0.334964 | 2.909 | 4.9491 | -5.82968 | -1.27103 | 4.558659 |
| H2P_N_6_9 | 0.257502 | 0.351972 | 2.912132 | 2.2946 | -5.66832 | -1.15021 | 4.518114 |
| H2P_N_6_10 | 1.50623 | 0.341743 | 2.886466 | 3.928 | -5.67186 | -1.25606 | 4.415801 |
| H2P_NI_6_11 | 0.277846 | 0.247698 | 2.901879 | 5.7499 | -5.80792 | -1.18313 | 4.624782 |
| H2P_N_9_11 | 0.271902 | 0.342448 | 2.854569 | 2.3477 | -5.79023 | -1.31157 | 4.478658 |
| H2P_N_6_12 | 0.281787 | 0.379197 | | 6.1547 | -5.6471 | -1.06259 | 4.584509 |
| H2P_N_9_10 | 0.248332 | 0.384377 | 2.77427 | 0.6449 | -5.70724 | -1.56354 | 4.143691 |
| H2P_N_9_12 | 1.555891 | 0.367206 | 3.114765 | 3.3361 | -5.60791 | -1.49824 | 4.109677 |
| H2P_N_10_12 | 1.459918 | 0.359206 | 2.816462 | 4.3208 | -5.64574 | -1.33252 | 4.313216 |
| H2P_NI_10_11 | 0.249098 | 0.272268 | 2.847617 | 4.805 | -5.86805 | -1.3864 | 4.481652 |
| H2P_N_11_12 | 0.266887 | 0.357134 | 2.711283 | 6.4788 | -5.75676 | -1.40844 | 4.348318 |
| H2P N 3 4 5 | 0.281454 | 0.36728 | 2.857907 | 9.6431 | -6.06805 | -1.70314 | 4.364917 |
| H2P_N_3_4_6 | 1.071085 | 0.37508 | 2.112603 | 7.2544 | -5.88057 | -1.83321 | 4.047364 |
| H2P_N_3_4_9 | 0.255979 | 0.3763 | | 6.2674 | -5.83513 | -1.69606 | 4.139065 |
| H2P N 3 4 10 | 1.045099 | 0.383183 | 2.283269 | 4.7768 | -5.90479 | -1.80491 | 4.099881 |
| H2P N 3 4 11 | 1.011632 | 0.313039 | 2.832582 | 6.2879 | -5.86179 | -1.68273 | 4.179065 |
| H2P_M_3_4_12 | 1.090608 | 0.389633 | | 8.2714 | -5.69635 | -1.58558 | 4.110766 |
| H2P N 3 5 6 | 1.053091 | 0.347423 | | 7.2513 | -5.9203 | -1.7328 | 4.187501 |

FIG. 17C

| Title | Hole Reorganization Energy (eV) | Electron Reorganization Energy (eV) | Triplet Energy (eV) | Dipole (D) | HOMO (eV) | LUMO (eV) | H-L gap (eV) |
|---|---|---|---|---|---|---|---|
| H2P_N_3_5_9 | 1.054313 | 0.342683 | 3.075805 | 5.1983 | -6.00656 | -1.45497 | 4.551584 |
| H2P_N_3_5_10 | 1.111755 | 0.338004 | 2.892497 | 4.6586 | -6.0188 | -1.53198 | 4.486822 |
| H2P_N_3_5_12 | 0.912864 | 0.336778 | 3.08067 | 8.025 | -5.99186 | -1.37279 | 4.619067 |
| H2P_N_3_5_11 | 0.792835 | 0.317365 | 3.05344 | 6.5471 | -6.17037 | -1.50069 | 4.66968 |
| H2P_N_3_6_9 | 1.132706 | 0.34439 | 3.001914 | 2.8965 | -5.85338 | -1.52218 | 4.331175 |
| H2P_N_3_6_10 | 1.159789 | 0.357163 | 2.969286 | 2.904 | -5.849 | -1.63429 | 4.214712 |
| H2P_N_3_6_12 | 1.049796 | 0.364514 | 2.899791 | 5.9921 | -5.83948 | -1.40354 | 4.435937 |
| H2P_N_3_9_10 | | 0.37848 | 2.780869 | 1.2848 | -5.91866 | -1.76164 | 4.157024 |
| H2P_N_3_6_11 | 0.811018 | 0.275029 | 2.950872 | 4.906 | -5.99322 | -1.57661 | 4.416617 |
| H2P_N_3_9_12 | 0.263535 | 0.373185 | 3.1069 | 3.9387 | -5.85173 | -1.66286 | 4.188861 |
| H2P_N_3_10_11 | 0.27263 | 0.280625 | 2.860569 | 3.2074 | -6.09717 | -1.63235 | 4.464781 |
| H2P_N_3_9_11 | 1.048567 | 0.357107 | | 1.8438 | -6.02452 | -1.47213 | 4.5524 |
| H2P_N_3_10_12 | 1.127286 | 0.361578 | | 3.7193 | -5.86356 | -1.53035 | 4.353216 |
| H2P_N_3_11_12 | 0.293309 | 0.366264 | 2.733272 | 5.8351 | -6.01118 | -1.5611 | 4.450087 |
| H2P_N_4_5_9 | 0.265175 | 0.344194 | 2.917474 | 7.2188 | -5.98615 | -1.64463 | 4.341515 |
| H2P_N_4_5_6 | 0.359592 | 0.321346 | 2.814998 | 9.4964 | -6.03703 | -1.58341 | 4.453624 |
| H2P_N_4_5_10 | 0.259985 | 0.383583 | 2.90928 | 7.1476 | -6.06125 | -1.69416 | 4.367093 |
| H2P_N_4_5_12 | 0.280626 | 0.338237 | | 10.4072 | -5.78996 | -1.56518 | 4.22478 |
| H2P_N_4_6_9 | 1.227946 | 0.383253 | 3.12046 | 4.6479 | -5.89064 | -1.52154 | 4.368598 |
| H2P_N_4_5_11 | 0.278337 | 0.356471 | 2.911007 | 9.0588 | -6.01717 | -1.52953 | 4.487638 |
| H2P_N_4_6_10 | 1.20506 | 0.386423 | 3.073976 | 5.134 | -5.89254 | -1.6332 | 4.259338 |
| H2P_N_4_6_12 | 1.117103 | 0.408569 | 2.866001 | 8.1784 | -5.86968 | -1.43647 | 4.433216 |
| H2P_N_4_6_11 | 0.892726 | 0.299984 | 2.87936 | 7.1394 | -6.03159 | -1.52327 | 4.508318 |
| H2P_N_4_9_11 | 1.172033 | 0.38801 | 2.847708 | 4.0191 | -6.01281 | -1.57742 | 4.435393 |
| H2P_N_4_9_10 | 0.918496 | 0.412996 | 2.730886 | 2.1394 | -5.92601 | -1.88899 | 4.037024 |
| H2P_N_4_9_12 | 1.22412 | 0.391246 | 2.695547 | 5.7449 | -5.83106 | -1.77198 | 4.059065 |
| H2P_N_4_10_11 | 0.264639 | 0.336829 | 2.813652 | 5.2266 | -6.092 | -1.73688 | 4.355121 |
| H2P_N_4_10_12 | 1.187536 | 0.396719 | | 5.9711 | -5.86914 | -1.67048 | 4.198657 |
| H2P_N_5_6_9 | 0.270921 | 0.304683 | 2.852709 | 5.0196 | -5.98315 | -1.45524 | 4.52791 |
| H2P_N_5_6_10 | 0.267611 | 0.317471 | 2.817912 | 5.3887 | -5.99241 | -1.56708 | 4.425325 |
| H2P_N_4_11_12 | 0.271708 | 0.347773 | 2.707388 | 8.0959 | -5.97907 | -1.64463 | 4.33444 |
| H2P_N_5_6_11 | 0.277502 | 0.304383 | 2.859033 | 8.3433 | -5.95839 | -1.56354 | 4.394849 |
| H2P_N_5_9_10 | 0.959146 | 0.369546 | 2.836157 | 2.5557 | -6.0471 | -1.78178 | 4.265324 |
| H2P_N_5_9_11 | 0.969296 | 0.359093 | 2.900478 | 4.7493 | -6.13962 | -1.56599 | 4.573625 |
| H2P_N_5_6_12 | 0.284993 | 0.31112 | 2.847705 | 8.2891 | -5.58506 | -1.34831 | 4.236753 |
| H2P_N_5_10_11 | 0.259453 | 0.265425 | 2.878554 | 6.6843 | -6.21744 | -1.61797 | 4.599475 |
| H2P_N_5_9_12 | 0.932456 | 0.353306 | 3.035889 | 5.8075 | -5.95153 | -1.72184 | 4.22995 |
| H2P_N_5_10_12 | 0.950418 | 0.34501 | 3.114666 | 6.7699 | -5.99486 | -1.55375 | 4.441107 |
| H2P_N_5_11_12 | 0.249434 | 0.364765 | 2.767169 | 8.9543 | -6.09935 | -1.65416 | 4.445189 |
| H2P_N_6_9_10 | 0.267895 | 0.410317 | 2.505807 | 2.3711 | -5.90343 | -1.65905 | 4.244372 |
| H2P_N_6_9_11 | 1.094664 | 0.300258 | 2.903092 | 3.8231 | -6.01009 | -1.37416 | 4.635938 |
| H2P_N_6_9_12 | 0.279128 | 0.389333 | 2.969758 | 4.1074 | -5.83833 | -1.54069 | 4.297795 |
| H2P_N_6_10_11 | 0.388325 | 0.294776 | 2.873303 | 6.5063 | -6.03975 | -1.58613 | 4.453624 |

FIG. 17D

| Title | Hole Reorganization Energy (eV) | Electron Reorganization Energy (eV) | Triplet Energy (eV) | Dipole (D) | H GM (eV) | LU MO(eV) | H-L gap (eV). |
|---|---|---|---|---|---|---|---|
| H2P_N6_10_12 | 1.247915 | 0.400554 | 2.868132 | 5.7582 | -5.86832 | -1.46014 | 4.408182 |
| 1"12P_N_6_11_12 | 0.308186 | 0.36938 | 2.300623 | 7.8046 | -5.7388 | -1.44436 | 4.29444 |
| H2P_N_9_10_11 | 0.273946 | 0.419222 | 2.812474 | 3.6468 | -6.05227 | -1.80817 | 4.2441 |
| 1-12P_N_9_10_12 | 0.904198 | 0.413553 | 2.269925 | 2.2826 | -5.8637 | -1.98858 | 3.875119 |
| H2P_N_9_11_12 | 0.275926 | 0.410641 | 2.588386 | 4.4911 | -5.95186 | -1.9162 | 4.035663 |
| 1"12.P_N_10_11_12 | 0.258326 | 0.383778 | 2.68901 | 6.6278 | -6.00819 | -1.66477 | 4.34342 |
| H2P N 3 4 5 6 | 0.2926 | 0.388896 |  | 10.1747 | -6.13853 | -2.15865 | 3.979881 |
| H2P N 3 4 5 9 | 0.291731 | 0.37673 | 2.317238 | 8.3044 | -6.27812 | -1.963 | 4.31512 |
|  | 0309677 | 0.407337 | 2.805301 | 7.4697 | -6.28302 | -2.0577 | 4.225324 |
| H2P_N3_4_5_11 | L355886 | 0.337782 | 2.305198 | 9.1766 | -6.33771 | 4.94042 | 4.397298 |
| H2P_N346_9 | 1.094286 | 0.389033 | 2.083923 | 5.8511 | -6.03486 | -2.03565 | 3.999201 |
| H2IP N 3 4 5 12 | L474742 | 0.393389 | 2.869063 | 10.9306 | -6.15758 | -1.86368 | 4.293896 |
| 112'PN34610 | 1.063594 | 0,416094 | 2.054649 | 5.2008 | -6.09771 | -2.15348 | 3,944234 |
| :"12P N 3 4 6 11 | 0.97619 | 0.359704 | 2.077895 | 7.0797 | -6.03241 | -2.0664 | 3.966003 |
| H2 P_N_346_12 | 1.057271 | 0.418783 | 2.047233 | 8.614 | -5.85091 | 4.92082 | 3,930085 |
| :"12P N 3 4 9 10 | 0.955999 | 0.410237 | 2.22917 | 3.5747 | -6.07486 | -2.18722 | 3.887636 |
| H2P N 3 4 9 11 | 1.050809 | 0.362663 | 2.298357 | 4.5491 | -6.01662 | -1.9064 | 4.110222 |
| 1"12P_N349_12 | 1.107145 | 0.398832 | 2.263794 | 6.7314 | -5.87132 | -2.00273 | 3,868588 |
| :"12P _N_3_4_10_11 | 0.755654 | 0.352825 | 2.760285 | 4.4165 | -6.07948 | -2.10477 | 3.974711 |
| 11.2P_N_3_4_10_12 | 1.088692 | 0.414711 | 2.238729 | 6,1039 | -5.92003 | -1.97416 | 3.945867 |
| H2P N 3 5 6 9 | 1.076595 | 0.346901 | 2.178975 | 5.4176 | -6.09037 | -1.90123 | 4.189133 |
| H2P N 3 5 6 10 | 1.07372 | 0.371089 | 2.722348 | 5.8482 | -6.15213 | -2.00191 | 4.150222 |
| 1"12P_N34 11 12 | 1.036094 | 0.389504 | 2.447811 | 7.998 | -5.88438 | -1.84518 | 4.039201 |
| :"12P N 3 5 6 11 | 0.939362 | 0.338896 | 2.139516 | 7.8502 | -6.06669 | -1.98967 | 4.077024 |
| 112P N 3 5 6 12 | 0.975213 | 0.343128 | 2.052391 | 8.889 | -5.78451 | -1.77361 | 4.010901 |
| N 3 5 9 10 | 0.933649 | 0.371293 | 2.520228 | 2.5705 | -6.24683 | -1.98205 | 4.26478 |
| H2P N 3 5 9 12 | 0.808906 | 0.352765 | 3,035079 | 6.1718 | -6.18098 | -1.8947 | 4.286277 |
| 1"12P_N_3_5_10_11 | 0.309178 | 0.279749 | 2.878455 | 5.526 | -6.38288 | -1.87701 | 4.505869 |
| :"12P N 3 5 9 11 | 0300932 | 0.375523 | 3.041559 | 4.4336 | -6.36356 | -1.75.511 | 4.608455 |
| I-12 P_N_3_5_10_12 | 0.858378 | 0.357325 | 3,110748 | 6.3744 | -6.21418 | -1.7513 | 4.452876 |
| H2P_N_3_5_11_12 | 0370718 | 0.381176 | 2.450599 | 8.492 | -6.22805 | -1.82395 | 4.4041 |
| 112P N 3 6 9 10 | 1.063871 | 0.400662 | 2.938034 | 05521 | -6.08846 | -1.95076 | 4,137705 |
| :"12P N 3 6 9 12 | 0.99519 | 0.399827 | 2.968604 | 4.0512 | -6.03622 | -1.75511 | 4.281107 |
| H2P_N_3_6_10_11 | 1.012902 | 0.314089 | 2.542309 | 4.9018 | -6.17009 | -1.94912 | 4.22097 |
| H2PN36911 | 0.81754 | 0.271961 | 2.951403 | 2.7291 | -6.2052 | -1.76028 | 4.444917 |
| 1"121'N361112 | 0389872 | 0.303663 | 2.315666 | 6.9736 | -5.90832 | -1.68164 | 4.226685 |
| H2 P_N_3_6_10_12 | 0.948762 | 0,41745 | 2.850323 | 4,818 | -6.06016 | -1.763 | 4.297161 |
|  | 0.844809 | 0.398915 | 2.8188 | 1.7931 | -6.28982 | -2.01497 | 4.274848 |
| H2 P_N_3_9_10_12 | 1.054589 | 0.414771 | 2.244794 | 1.3096 | -6.10261 | -2.16763 | 3.934983 |
| I"12P_N_3_9_11_12 | 1.037176 | 0.421522 | 2.203801 | 3.6452 | -6.21744 | -2.07321 | 4.144235 |
| :"12P N 4 5 6 9 | 0.280743 | 0.32548 | 2.835059 | 7.5663 | -6.26697 | -1.80327 | 4.463692 |
| 112P_N_3_10_1112 |  | 0.380557 | 2,711992 | 5,2714 | -6.27812 | -1,81715 | 4.460971 |
| :"12P N 4 5 6 10 | 0.271023 | 0.391676 | 2.795912 | 8.2087 | -6.25962 | -1.92246 | 4.337161 |

FIG. 17E

| Title | Hole Reorganization Energy (eV) | Electron Reorganization Energy (eV) | Triplet Energy (eV) | Dipole (D) | HOMO (eV) | LUMO (eV) | H-L gap (eV) |
|---|---|---|---|---|---|---|---|
| H2P_N_4_5_6_11 | 0.277846 | 0.293895 | 2.844426 | 10.2065 | -6.41554 | -1.85606 | 4.559475 |
| H2P_N_4_5_9_10 | 0.91299 | 0.394639 | 2.480765 | 4.8991 | -6.19321 | -2.16736 | 4.031854 |
| H2P_N_4_5_9_11 | 0.299827 | 0.328759 | 2.900583 | 6.3156 | -6.1652 | -1.89062 | 4.274576 |
| H2P_N_4_5_6_12 | 1.075383 | 0.464904 | 2.08416 | 11.2326 | -6.0871 | -1.72545 | 4.361651 |
| H2P_N_4_5_9_12 | 1.132815 | 0.365391 | 2.413865 | 8.4737 | -5.9652 | -2.05579 | 3.909404 |
| H2P_N_4_5_10_12 | 1.133516 | 0.383899 | 2.848592 | 8.9081 | -6.01935 | -1.95457 | 4.064779 |
| H2P_N_4_5_10_11 | 0.977657 | 0.36116 | 2.883763 | 8.0021 | -6.25744 | -1.99402 | 4.263419 |
| H2P_N_4_6_9_10 | 1.054255 | 0.439773 | 2.783285 | 2.772 | -6.12656 | -2.02014 | 4.106412 |
| H2P_N_4_5_11_12 | 1.197543 | 0.342493 | 2.445563 | 11.0215 | -5.98343 | -1.95293 | 4.030493 |
| H2P_N_4_6_9_11 | 0.923535 | 0.374773 | 3.085365 | 4.9616 | -6.23594 | -1.7396 | 4.496346 |
| H2P_N_4_6_10_11 | 0.395786 | 0.353449 | 2.826221 | 6.8498 | -6.25445 | -1.9494 | 4.305052 |
| H2P_N_4_6_9_12 | 1.023679 | 0.435809 | 2.942106 | 6.1868 | -6.06533 | -1.85497 | 4.210356 |
| H2P_N_4_6_10_12 | 0.98958 | 0.439329 |  | 7.0766 | -6.09499 | -1.83429 | 4.260698 |
| H2P_N_4_6_11_12 | 0.312888 | 0.356708 | 2.296706 | 9.2345 | -5.98588 | -1.69525 | 4.29063 |
| H2P_N_4_9_10_11 | 0.288321 | 0.442928 | 2.788736 | 2.9967 | -6.27975 | -2.14613 | 4.133623 |
| H2P_N_4_9_11_12 | 0.804418 | 0.4211 | 2.184496 | 5.898 | -6.17307 | -2.16708 | 4.01199 |
| H2P_N_5_6_9_10 | 0.666204 | 0.405889 | 2.411862 | 4.1899 | -6.18941 | -1.90586 | 4.283556 |
| H2P_N_4_9_10_12 | 0.847363 | 0.439424 | 2.314097 | 3.5604 | -6.08656 | -2.29334 | 3.793213 |
| H2P_N_5_6_9_12 | 0.94999 | 0.337506 |  | 6.8626 | -5.81553 | -1.78559 | 4.029949 |
| H2P_N_5_6_9_11 | 0.941884 | 0.338286 | 2.866445 | 6.2515 | -6.14261 | -1.75756 | 4.385053 |
| H2P_N_4_10_11_12 | 0.272774 | 0.438858 | 2.677923 | 7.3751 | -6.24329 | -1.9445 | 4.298794 |
| H2P_N_5_6_10_12 | 0.297721 | 0.397488 | 2.257222 | 8.5193 | -5.84492 | -1.71647 | 4.128453 |
| H2P_N_5_6_10_11 | 0.284812 | 0.289552 | 2.555638 | 8.5576 | -6.18077 | -1.91846 | 4.271311 |
| H2P_N_5_6_11_12 |  | 0.350573 | 2.266395 | 10.4803 | -5.652 | -1.76953 | 3.882465 |
| H2P_N_5_9_10_11 | 0.274596 | 0.413075 | 2.865045 | 4.7269 | -6.40737 | -2.08593 | 4.371447 |
| H2P_N_5_9_10_12 | 0.887427 | 0.40048 | 2.253792 | 4.5017 | -6.21799 | -2.21399 | 4.004099 |
| H2P_N_5_9_11_12 | 0.895393 | 0.401911 | 2.174183 | 6.8874 | -6.29445 | -2.15429 | 4.140154 |
| H2P_N_6_9_10_11 | 0.311895 | 0.417504 | 2.351276 | 9.287 | -6.27785 | -1.93389 | 4.343964 |
| H2P_N_5_10_11_12 | 0.257356 | 0.387744 | 2.363319 | 8.7555 | -6.38071 | -1.91212 | 4.46859 |
| H2P_N_6_9_10_12 | 1.055278 | 0.435101 | 2.207212 | 4.0045 | -6.092 | -2.06531 | 4.026684 |
| H2P_N_6_9_11_12 | 0.331684 | 0.414688 |  | 6.0183 | -6.04166 | -1.9494 | 4.092262 |
| H2P_N_6_10_11_12 | 0.311674 | 0.379307 | 2.271438 | 8.346 | -6.23921 | -1.76735 | 4.471856 |
| H2P_N_9_10_11_12 | 2.442362 | 0.436324 | 1.58947 | 5.3562 | -6.23077 | -2.30804 | 3.922738 |

FIG. 26

| Molecular property | Min | Max | Mean | Std Dev. | Range |
|---|---|---|---|---|---|
| Full TAP library (n = 135) | | | | | |
| $E_{HOMO}$ (eV) | -6.05 | -5.48 | -5.77 | 0.10 | 0.56 |
| $E_{LUMO}$ (eV) | -3.75 | -3.31 | -3.52 | 0.09 | 0.44 |
| $E_g$ (eV) | 1.94 | 2.41 | 2.25 | 0.10 | 0.47 |
| μ (Debye) | 0.00 | 9.32 | 4.05 | 2.33 | 9.32 |
| Pyridyl-TAP library subset (n = 20) | | | | | |
| $E_{HOMO}$ (eV) | -5.95 | -5.75 | -5.84 | 0.06 | 0.20 |
| $E_{LUMO}$ (eV) | -3.59 | -3.37 | -3.48 | 0.08 | 0.23 |
| $E_g$ (eV) | 2.31 | 2.40 | 2.37 | 0.03 | 0.09 |
| μ (Debye) | 0.00 | 7.98 | 3.20 | 2.37 | 7.98 |

FIG. 27A

| | | TAP isomer | $E_{HOMO}$ (eV) | $E_{LUMO}$ (eV) | $E_g$ (eV) | $\lambda^-$ (eV) | Dipole (D) |
|---|---|---|---|---|---|---|---|
| 1 | | Pentacene | −4.86 | −2.66 | 2.20 | 0.13 | 0.00 |
| | 15 TAP structures with lowest $E_{g\,(\mathrm{TAP})}$ and small $\mu$ | | | | | | |
| 2 | | 2,6,9,12 | −5.82 | −3.69 | 2.13 | 0.18 | 0.62 |
| 3 | | 2,5,9,12 | −5.82 | −3.68 | 2.14 | 0.18 | 1.51 |
| 4 | | 5,6,11,12 | −6.04 | −3.63 | 2.41 | 0.16 | 0.00 |
| 5 | | 2,5,10,11 | −5.77 | −3.63 | 2.14 | 0.18 | 1.30 |
| 6 | | 2,6,10,11 | −5.77 | −3.62 | 2.15 | 0.18 | 2.03 |
| 7 | | 1,6,10,12 | −5.69 | −3.61 | 2.07 | 0.21 | 1.92 |
| 8 | | 1,5,10,12 | −5.69 | −3.61 | 2.08 | 0.22 | 2.52 |
| 9 | | 2,6,8,12 | −5.91 | −3.59 | 2.31 | 0.16 | 0.00 |
| 10 | | 2,6,7,12 | −5.79 | −3.59 | 2.20 | 0.17 | 0.64 |
| 11 | | 2,5,8,12 | −5.92 | −3.58 | 2.34 | 0.17 | 1.42 |
| 12 | | 1,6,7,12 | −5.69 | −3.58 | 2.11 | 0.17 | 0.00 |
| 13 | | 2,5,8,11 | −5.93 | −3.58 | 2.35 | 0.17 | 0.00 |

| Molecular structure | TAP isomer | $E_{HOMO}$ (eV) | $E_{LUMO}$ (eV) | $E_g$ (eV) | $\lambda^-$ (eV) | Dipole (D) |
|---|---|---|---|---|---|---|
| 14  | 2,6,7,11 | −5.81 | −3.58 | 2.23 | 0.18 | 1.63 |
| 15  | 1,2,9,10 | −5.56 | −3.57 | 1.99 | 0.19 | 2.14 |
| 16  | 2,3,8,9 | −5.91 | −3.57 | 2.34 | 0.17 | 0.00 |

| | Molecular structure | TAP isomer | $E_{HOMO}$ (eV) | $E_{LUMO}$ (eV) | $E_g$ (eV) | $\lambda^-$ (eV) | Dipole (D) |
|---|---|---|---|---|---|---|---|
| | Pyridyl-TAP structures with lowest $E_{LUMO}$ and dipole = 0 | | | | | | |
| 17 | | 2,6,8,12 | -5.91 | -3.59 | 2.31 | 0.19 | 0.00 |
| 18 | | 2,5,8,11 | -5.93 | -3.58 | 2.35 | 0.17 | 0.00 |
| 19 | | 1,2,7,8 | -5.76 | -3.37 | 2.40 | 0.15 | 0.00 |
| 20 | | 2,4,8,10 | -5.75 | -3.37 | 2.38 | 0.15 | 0.00 |

FIG. 28

HOST MATERIALS AND LIGANDS FOR DOPANTS IN ORGANIC LIGHT EMITTING DIODES

PRIORITY

This present application is a U.S. national phase application filed under 35 U.S.C. 371 of International Application No. PCT/US2014/063013, which was filed Oct. 29, 2014 and which claims the benefit of U.S. Provisional Application Nos. 61/897,091, filed Oct. 29, 2013, 62/036,533, filed Aug. 12, 2014, 62/003,472, filed May 27, 2014 and 61/994,065, filed May 15, 2014, the contents of which are expressly incorporated by reference in their entirety.

PARTIES TO A JOINT RESEARCH AGREEMENT

The claimed invention was made by, on behalf of, and/or in connection with one or more of the following parties to a joint university corporation research agreement: The Regents of the University of Michigan, Princeton University, University of Southern California, and the Universal Display Corporation. The agreement was in effect on and before the date the claimed invention was made, and the claimed invention was made as a result of activities undertaken within the scope of the agreement.

BACKGROUND OF THE INVENTION

The field of organic electronics is in a stage of explosive growth. Ten years ago there was a great deal of promise in optoelectronic devices based on organic materials and today they are a reality. Samsung is making 10 million Galaxy cell phones a month with organic LED displays. Samsung and LG are selling 55", curved screen, high definition televisions, again composed solely of organic LEDs. Organic solar cells have been advanced to efficiencies exceeding amorphous silicon based devices and their current rate of increase will exceed thin film devices in five years and be competitive with crystalline silicon, the industry standard, on the horizon. Organic transistors have been used to fabricate backplanes for displays and are in line for applications such as flexible electronics and rf id tags. The use of organic materials opens the door to unparalleled versatility. The number of different organic materials that can be generated is limitless, suggesting that the device properties available with these materials and even the types devices themselves are going to be evolving and improving for some time to come.

Opto-electronic devices that make use of organic materials are becoming increasingly desirable for a number of reasons. Many of the materials used to make such devices are relatively inexpensive, so organic opto-electronic devices have the potential for cost advantages over inorganic devices. In addition, the inherent properties of organic materials, such as their flexibility, may make them well suited for particular applications such as fabrication on a flexible substrate. Examples of organic opto-electronic devices include organic light emitting devices (OLEDs), organic phototransistors, organic photovoltaic cells, and organic photodetectors. For OLEDs, the organic materials may have performance advantages over conventional materials. For example, the wavelength at which an organic emissive layer emits light may generally be readily tuned with appropriate dopants.

OLEDs make use of thin organic films that emit light when voltage is applied across the device. OLEDs are becoming an increasingly interesting technology for use in applications such as flat panel displays, illumination, and backlighting. Several OLED materials and configurations are described in U.S. Pat. Nos. 5,844,363, 6,303,238, and 5,707,745, which are incorporated herein by reference in their entirety.

OLED devices are generally (but not always) intended to emit light through at least one of the electrodes, and one or more transparent electrodes may be useful in organic optoelectronic devices. For example, a transparent electrode material, such as indium tin oxide (ITO), may be used as the bottom electrode. A transparent top electrode, such as disclosed in U.S. Pat. Nos. 5,703,436 and 5,707,745, which are incorporated by reference in their entireties, may also be used. For a device intended to emit light only through the bottom electrode, the top electrode does not need to be transparent, and may be comprised of a thick and reflective metal layer having a high electrical conductivity. Similarly, for a device intended to emit light only through the top electrode, the bottom electrode may be opaque and/or reflective. Where an electrode does not need to be transparent, using a thicker layer may provide better conductivity, and using a reflective electrode may increase the amount of light emitted through the other electrode, by reflecting light back towards the transparent electrode. Fully transparent devices may also be fabricated, where both electrodes are transparent. Side emitting OLEDs may also be fabricated, and one or both electrodes may be opaque or reflective in such devices.

With all of the excitement around organic electronics and the promise their devices hold, it is surprising that the materials discovery methods are still largely rooted in age old serial methods of searching. Every new material starts with an idea, typically with a given device application in mind. The researcher could be thinking about an emitter in an OLED, an acceptor material in a solar cell or some other material for a particular device application. Whether the researcher gets an idea from a paper they read or they stare out the window, and idea pops into their head, the idea is a single molecule. This new "hypothetical" material is expected/hoped to have the properties that will make the device a winner. The next step is to try it out. They might put the molecule into a computer and see if the predicted electronic structure matches their expectation or they may go into the lab, synthesize the material and test the real thing. Either way, it is a serial process: one material is envisioned and tested. The researcher might look at a few variants, but the basic plan is to make it, examine it and test it in a device. This is the same process that has been used to identify all of the materials for many years. Altering this paradigm to foster a far more directed and productive path to new materials discovery would represent a significant advance in the art.

If the 20$^{th}$ century was the century of silicon, the 21$^{st}$ century will be all organic. The question is how to find the right material without spending the entire 21$^{st}$ century looking for it. Quite surprisingly, the present invention provides compositions and methods for facilitating the search for such material.

SUMMARY OF THE INVENTION

The present invention provides compound libraries, methods of assembling and organizing these libraries and methods of querying these libraries. In various aspects, the present invention mitigates the restriction on investigators or properties of an array of compounds to serial individual investigations. In an exemplary embodiment, the library comprises multiple planar polycyclic heteroaromatic compounds. In various embodiments, the compounds of the library are related as isomers of a common underlying core or scaffold structure.

The present invention relates to the computer-implemented design of combinatorial libraries of materials. Traditionally, the discovery and development of materials has predominantly been a trial and error process carried out by scientists who generate data one experiment at a time. This process suffers from low success rates, long time lines, and high costs, particularly as the desired materials increase in complexity. When a material is composed of multiple components, theory provides little guidance, and the large variety of possible combinations of components takes a large amount of time to prepare and analyze.

Combinatorial materials science addresses some of these challenges. Combinatorial materials science refers generally to methods for creating collections or libraries of chemically diverse compounds or materials and/or to methods for rapidly testing or screening these libraries for compounds or materials having desirable performance characteristics and properties. By parallel or rapid serial testing of many compounds or materials, combinatorial techniques accelerate the speed of research, facilitate breakthroughs, and expand the amount of information available to researchers.

Furthermore, the ability to observe the relationships between hundreds or thousands of materials in a short period of time enables scientists to make well-informed decisions in the discovery process and to find unexpected trends.

Researchers employing combinatorial techniques design libraries or arrays containing multiple combinations of starting chemicals. It is desirable to design such libraries to explore a desired phase space of starting components and realize good experimental results at a reasonable cost and period of time.

The advent of high speed computers allows the researcher to query libraries for the properties of the compounds contained therein in a parallel fashion. Instead of waiting for serendipity to produce a new OLED material, an investigator can use the computer to assemble and query a library of potential OLED host materials to find the proverbial needles in a haystack. The reason for the serial approach used to date is that there was a significant amount of time needed to assay one material. It was impractical to investigate a large number of molecules in the lab or on the computer, so the researcher focused on the molecules that their intuition told them were the most likely compounds with desired properties. Using an electronically generated OLED host compound library, the present invention allows rapid discovery of news materials, as opposed to serial syntheses and characterization one compound at a time.

The present invention provides libraries of potential OLED host materials and methods of examining very large numbers of such materials to determine which of the millions of possibilities are likely to have desirable OLED host properties. In various embodiments, the starting point of this theoretical search routine is a "library" of compounds. A core structure is chosen, points of possible substitution identified and a plurality of the possible substitutions are considered to generate a plurality of independent structures. This can easily lead libraries that each contain millions of distinct molecules for theoretical study.

This library approach is a powerful one for discovery. Once the computer has created the library of materials, it can be used over and over. The library might have been generated in a search for a new hole transporter for an OLED, for example. If some time in the future an investigator is interested in looking for a p-type transistor material the library is available to query for the materials that have the optimal electronic properties for a transistor. In various embodiments, the library can be used to investigate more than one type of query, and the library does not need to be created or calculated again, it can simply be data mined to find the right material for the new application.

This computational method provides scaffolds based on substituted H2P derivatives, which are desirable as OLED hosts based on their LUMO energy, carrier reorganization energy and high triplet energy.

In various embodiments, the H2P scaffolds function as both host materials and ligands for metal complexation, producing a dopant, e.g., a phosphorescent dopant.

The library approach of the instant invention is also a powerful tool for discovery of organometallic emitters, e.g., phosphorescent organometallic emitters, where the most labile ligand is the same as the host material in the device.

Other objects, aspects and advantages of the invention will be apparent from the detailed description that follows.

BRIEF DESCRIPTION OF THE DRAWINGS

FIG. 5A shows an exemplary library of aza-substituted tPh compounds cross-referenced with exemplary electronic properties of the compounds.

FIG. 17A-E displays computational results from a library of three ring libraries for host materials for OLEDs (high triplet state energy and small reduction potential). Using 0-4 N atoms in the biphenyl fragments leads to a library of 164 unique compounds. Methyl substituents were chosen for this library for ease of computation. The triplet energies range from 1.5 to 3.3 eV and LUMO energies from −0.7 to −2.3 eV. Calculations on 11 of the compounds did not give stable triplet structures and the triplet energies for these compounds are not listed.

FIG. 26. TAP electron acceptor library characterized in terms of B3LYP/6-311G** calculated property minimum, maximum, mean, standard deviation and range.

FIGS. 27A-B. B3LYP/6-311G** calculated properties (HOMO energy ($E_{HOMO}$), LUMO energy ($E_{LUMO}$), HOMO-LUMO gap ($E_g$), electron reorganization energy ($\lambda^-$) and dipole moment ($\mu$) for TAP electron acceptor candidates having lowest $E_{LUMO}$ and small $\mu$.

FIG. 28. B3LYP/6-311G** calculated properties (HOMO energy ($E_{HOMO}$), LUMO energy ($E_{LUMO}$), HOMO-LUMO gap ($E_g$), electron reorganization energy ($\lambda^-$) and dipole moment ($\mu$) for pyridyl-TAP electron acceptor candidates having lowest $E_{LUMO}$ and small $\mu$.

DETAILED DESCRIPTION OF THE INVENTION

I. Introduction

Figure 1:
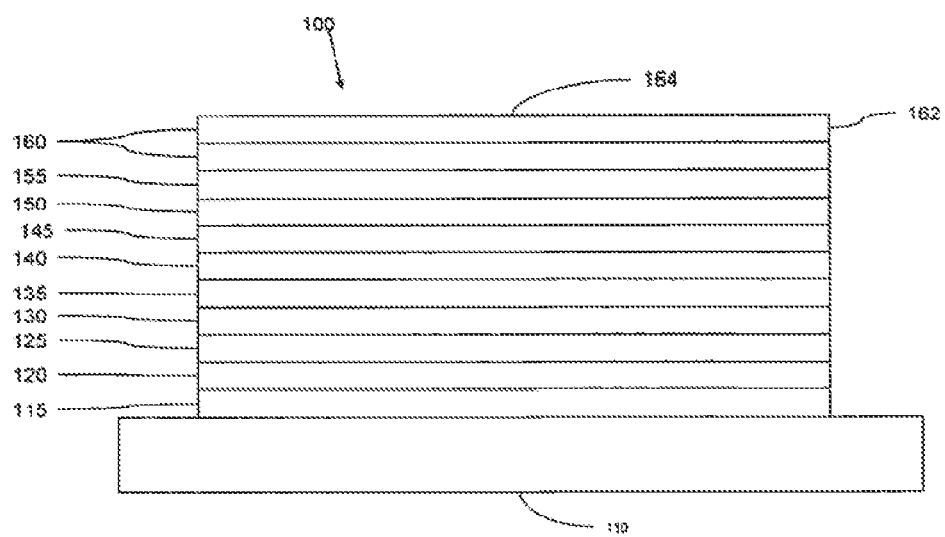
FIG. 1 shows an organic light emitting device having separate electron transport, hole transport, and emissive layers, as well as other layers.
Figure 2A:
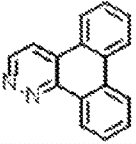
FIGS. 2A-C show an exemplary 6,12-$H_2P$ library in which the compound formulae are cross-referenced with electronic properties of the compounds.
Figure 2A:
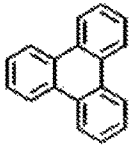
Figure 2A:
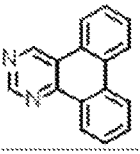
Figure 2A:
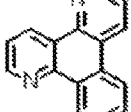
Figure 2A:
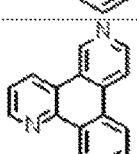
Figure 2B:
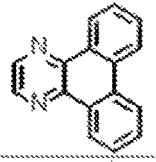
Figure 2B:
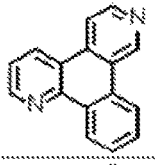
Figure 2B:
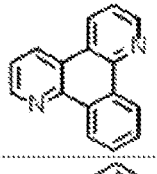
Figure 2B:
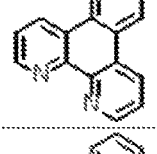
Figure 2B:
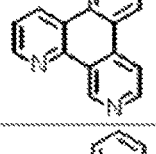
Figure 2B:
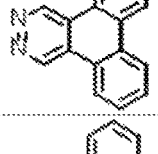
Figure 2B:
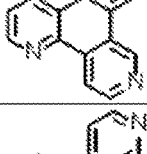
Figure 2B:
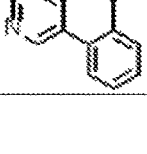
Figure 2C:
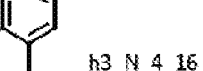
Figure 2C:
Figure 3:
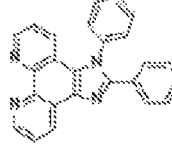
FIG. 3 shows an exemplary $N_2$-triphenylene library in which the compound formulae are cross-referenced with electronic properties of the compounds.
Figure 3:
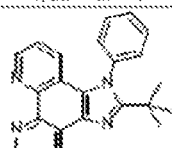
Figure 3:
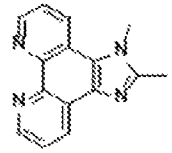

Heteroaromatic compounds with rigid scaffolds are components of multicompound libraries, which, once assembled, can be queried to investigate many electronic properties of these compounds. In various embodiments, discussed herein, the compound libraries are utilized to investigate an array of organic host materials for organic light emitting diodes (OLEDs). The present invention provides libraries of planar heteroaromatic compounds, methods of querying the libraries and OLED devices desinged and fabricated upon the basis of the data gathered about the electronic properties of the planar heteroaromatic compounds.

Before the invention is described in greater detail, it is to be understood that the invention is not limited to particular embodiments described herein as such embodiments may vary. It is also to be understood that the terminology used herein is for the purpose of describing particular embodiments only, and the terminology is not intended to be limiting. The scope of the invention will be limited only by the appended claims. Unless defined otherwise, all technical and scientific terms used herein have the same meaning as commonly understood by one of ordinary skill in the art to which this invention belongs. Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention. Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides the substantial equivalent of the specifically recited number. All publications, patents, and patent applications cited in this specification are incorporated herein by reference to the same extent as if each individual publication, patent, or patent application were specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission that the invention described herein is not entitled to antedate such publication by virtue of prior invention. Further, the dates of publication provided might be different from the actual publication dates, which may need to be independently confirmed.

It is noted that the claims may be drafted to exclude any optional element. As such, this statement is intended to serve as antecedent basis for use of such exclusive terminology as "solely," "only," and the like in connection with the recitation of claim elements, or use of a "negative" limitation. As will be apparent to those of skill in the art upon reading this disclosure, each of the individual embodiments described and illustrated herein has discrete components and features which may be readily separated from or combined with the features of any of the other several embodiments without departing from the scope or spirit of the invention. Any recited method may be carried out in the order of events recited or in any other order that is logically possible. Although any methods and materials similar or equivalent to those described herein may also be used in the practice or testing of the invention, representative illustrative methods and materials are now described.

In describing the present invention, the following terms will be employed, and are defined as indicated below.

II. Definitions

"H2P", as used herein refers to a fused aromatic ring system including two hexagon rings and a pentagon ring fused to a central benzene ring.

As used herein, and as would be understood by one of skill in the art, the term "blocking layer" means that the layer provides a barrier that significantly inhibits transport of charge carriers and/or excitons through the device, without suggesting that the layer necessarily completely blocks the charge carriers and/or excitons. The presence of such a blocking layer in a device may result in substantially higher efficiencies as compared to a similar device lacking a blocking layer. Also, a blocking layer may be used to confine emission to a desired region of an OLED.

Where substituent groups are specified by their conventional chemical formulae, written from left to right, the structures optionally also encompass the chemically identical substituents, which would result from writing the structure from right to left, e.g., —CH$_2$O— is intended to also optionally recite —OCH$_2$—.

As used herein, the term "organic" includes polymeric materials as well as small molecule organic materials that may be used to fabricate organic opto-electronic devices. "Small molecule" refers to any organic material that is not a polymer, and "small molecules" may actually be quite large. Small molecules may include repeat units in some circumstances. For example, using a long chain alkyl group as a substituent does not remove a molecule from the "small molecule" class. Small molecules may also be incorporated into polymers, for example as a pendent group on a polymer backbone or as a part of the backbone. Small molecules may also serve as the core moiety of a dendrimer, which consists of a series of chemical shells built on the core moiety. The core moiety of a dendrimer may be a fluorescent, delayed fluorescent, or phosphorescent small molecule emitter. A dendrimer may be a "small molecule," and it is believed that all dendrimers currently used in the field of OLEDs are small molecules. In general, a small molecule has a well-defined chemical formula with a single molecular weight, whereas a polymer has a chemical formula and a molecular weight that may vary from molecule to molecule.

The term "alkyl," by itself or as part of another substituent, means, unless otherwise stated, a straight or branched chain, or cyclic hydrocarbon radical, or combination thereof, which may be fully saturated, mono- or polyunsaturated and can include di-, tri- and multivalent radicals, having the number of carbon atoms designated (i.e. $C_1$-$C_{10}$ means one to ten carbons). Examples of saturated hydrocarbon radicals include, but are not limited to, groups such as methyl, ethyl, n-propyl, isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to optionally include those derivatives of alkyl defined in more detail below, such as "heteroalkyl." Alkyl groups that are limited to hydrocarbon groups are termed "homoalkyl". Exemplary alkyl groups include the monounsaturated $C_{9-10}$, oleoyl chain or the diunsaturated $C_{9-10, 12-13}$ linoeyl chain.

The term "alkylene" by itself or as part of another substituent means a divalent radical derived from an alkane, as exemplified, but not limited, by —CH$_2$CH$_2$CH$_2$CH$_2$—, and further includes those groups described below as "heteroalkylene." Typically, an alkyl (or alkylene) group will have from 1 to 24 carbon atoms, with those groups having 10 or fewer carbon atoms being preferred in the present invention. A "lower alkyl" or "lower alkylene" is a shorter chain alkyl or alkylene group, generally having eight or fewer carbon atoms.

The terms "alkoxy," "alkylamino" and "alkylthio" (or thioalkoxy) are used in their conventional sense, and refer to those alkyl groups attached to the remainder of the molecule via an oxygen atom, an amino group, or a sulfur atom, respectively.

The terms "aryloxy" and "heteroaryloxy" are used in their conventional sense, and refer to those aryl or heteroaryl groups attached to the remainder of the molecule via an oxygen atom.

The term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si and S, and wherein the nitrogen and sulfur atoms may optionally be oxidized and the nitrogen heteroatom may optionally be quaternized. The heteroatom(s) O, N and S and Si may be placed at any interior position of the heteroalkyl group or at the position at which the alkyl group is attached to the remainder of the molecule. Examples include, but are not limited to, —CH$_2$—CH$_2$—O—CH$_3$, —CH$_2$—CH$_2$—NH—CH$_3$, —CH$_2$—CH$_2$N(CH$_3$)—CH$_3$, —CH$_2$—S—CH$_2$—CH$_3$, —CH$_2$—CH$_2$, —S(O)—CH$_3$, —CH$_2$—CH$_2$—S(O)$_2$—CH$_3$, —CH=CH—O—CH$_3$, —Si(CH$_3$)$_3$, —CH$_2$—CH=N—OCH$_3$, and —CH=CH—N(CH$_3$)—CH$_3$. Up to two heteroatoms may be consecutive, such as, for example, —CH$_2$—NH—OCH$_3$ and —CH$_2$—O—Si(CH$_3$)$_3$. Similarly, the term "heteroalkylene" by itself or as part of another substituent means a divalent radical derived from heteroalkyl, as exemplified, but not limited by, —CH$_2$—CH$_2$—S—CH$_2$—CH$_2$— and —CH$_2$—S—CH$_2$—CH$_2$—NH—CH$_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —CO$_2$R'— represents both —C(O)OR' and —OC(O)R'.

The terms "cycloalkyl" and "heterocycloalkyl", by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopentyl, cyclohexyl, 1-cyclohexenyl, 3-cyclohexenyl, cycloheptyl, and the like. Further exemplary cycloalkyl groups include steroids, e.g., cholesterol and its derivatives. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like.

The terms "halo" or "halogen," by themselves or as part of another substituent, mean, unless otherwise stated, a fluorine, chlorine, bromine, or iodine atom. Additionally, terms such as "haloalkyl," are meant to include monohaloalkyl and polyhaloalkyl. For example, the term "halo(C$_1$-C$_4$)alkyl" is mean to include, but not be limited to, trifluoromethyl, 2,2,2-trifluoroethyl, 4-chlorobutyl, 3-bromopropyl, and the like.

The term "aryl" means, unless otherwise stated, a polyunsaturated, aromatic, substituent that can be a single ring or multiple rings (preferably from 1 to 3 rings), which are fused together or linked covalently. The term "heteroaryl" refers to aryl substituent groups (or rings) that contain from one to four heteroatoms selected from N, O, S, Si and B, wherein the nitrogen and sulfur atoms are optionally oxidized, and the nitrogen atom(s) are optionally quaternized. An exemplary heteroaryl group is a six-membered azine, e.g., pyridinyl, diazinyl and triazinyl. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

As used herein, "heteroarene" refers to a molecule having a reactive heteroaromatic core including one or more intra-annular nitrogen atoms. Exemplary heteroarenes are six-membered rings. This term encompasses diverse compounds, for example, substituted or unsubstituted pyridine, substituted or unsubstituted diazines (i.e., including two intra-annular nitrogen atoms), and substituted or unsubstituted triazines (i.e., including three intra-annular nitrogen atoms). Because heteroarene and heteroaryl describe, respectively, a parent molecule and a substituent formed from the parent molecule, these terms are not mutually exclusive terms and the structures of their reactive aromatic cores are co-extensive. Thus, the discussion regarding "heteroaryl" immediately above is germane to the definition of "heteroarene".

For brevity, the term "aryl" when used in combination with other terms (e.g., aryloxy, arylthioxy, arylalkyl) includes aryl, heteroaryl and heteroarene rings as defined above. Thus, the term "arylalkyl" is meant to include those radicals in which an aryl group is attached to an alkyl group (e.g., benzyl, phenethyl, pyridylmethyl and the like) including those alkyl groups in which a carbon atom (e.g., a methylene group) has been replaced by, for example, an oxygen atom (e.g., phenoxymethyl, 2-pyridyloxymethyl, 3-(1-naphthyloxy)propyl, and the like).

Each of the above terms (e.g., "alkyl," "heteroalkyl," "aryl, "heteroaryl", and "heteroarene") are meant to optionally include both substituted and unsubstituted forms of the indicated species. Exemplary substituents for these species are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) are generically referred to as "alkyl group substituents," and they can be one or more of a variety of groups selected from, but not limited to: H, substituted or unsubstituted aryl, substituted or unsubstituted heteroaryl, substituted or unsubstituted heterocycloalkyl, —OR', =O, =NR', =N—OR', —NR'R", —SR', halogen, —SiR'R"R'", —OC(O)R', —C(O)R', —CO$_2$R', —CONR'R", —OC(O)NR'R", —NR"C(O)R', —NR'—C(O)NR"R'", —NR"C(O)$_2$R', —NR—C(NR'R"R'")=NR"", —NR—C(NR'R")=NR"", —S(O)R', —S(O)$_2$R', —S(O)$_2$NR'R", —NRSO$_2$R', —CN and —NO$_2$ in a number ranging from zero to (2m'+1), where m' is the total number of carbon atoms in such radical. R', R", R'" and R"" each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R'" and R"" groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like). These terms encompass groups considered exemplary "alkyl group substituents", which are components of exemplary "substituted alkyl" and "substituted heteroalkyl" moieties.

Similar to the substituents described for the alkyl radical, substituents for the aryl heteroaryl and heteroarene groups are generically referred to as "aryl group substituents." The substituents are selected from, for example: groups attached to the heteroaryl or heteroarene nucleus through carbon or a heteroatom (e.g., P, N, O, S, Si, or B) including, without limitation, substituted or unsubstituted alkyl, substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R'", —OC(O)R', —C(O)R', —CO$_2$R', —CONR'R", —OC(O)NR'R", —NR"C(O)R', —NR'—C(O)NR'R", —NR"C(O)$_2$R', —NR—C(NR'R"R'")=NR"", —NR—C(NR'R")=NR'", —S(O)R', —S(O)$_2$R', —S(O)$_2$NR'R", —NRSO$_2$R', —CN and —NO$_2$, —R', —N$_3$, —CH(Ph)$_2$, fluoro(C$_1$-C$_4$)alkoxy, and fluoro(C$_1$-C$_4$)alkyl, in a number ranging from zero to the total number of open valences on the aromatic ring system. Each of the above-named groups is attached to the heteroarene or heteroaryl nucleus directly or through a or a heteroatom (e.g., P, N, O, S, Si, or B); and where R', R", R'" and R"" are preferably independently selected from hydrogen, substituted or unsubstituted alkyl, substituted or unsubstituted heteroalkyl, substituted or unsubstituted aryl and substituted or unsubstituted heteroaryl. When a compound of the invention includes more than one R group, for example, each of the R groups is independently selected as are each R', R", R'" and R"" groups when more than one of these groups is present.

Two of the substituents on adjacent atoms of the aryl, heteroarene or heteroaryl ring may optionally be replaced with a substituent of the formula -T-C(O)—(CRR')$_q$—U—, wherein T and U are independently —NR—, —O—, —CRR'— or a single bond, and q is an integer of from 0 to 3. Alternatively, two of the substituents on adjacent atoms of the aryl or heteroaryl ring may optionally be replaced with a substituent of the formula -A-(CH$_2$)$_r$—B—, wherein A and B are independently —CRR'—, —O—, —NR—, —S—, —S(O)$_2$—, —S(O)$_2$—, —S(O)$_2$NR'— or a single bond, and r is an integer of from 1 to 4. One of the single bonds of the new ring so formed may optionally be replaced with a double bond. Alternatively, two of the substituents on adjacent atoms of the aryl, heteroarene or heteroaryl ring may optionally be replaced with a substituent of the formula —(CRR')$_s$—X—(CR"R'")$_d$—, where s and d are independently integers of from 0 to 3, and X is —O—, —NR'—, —S—, —S(O)—, —S(O)$_2$—, or —S(O)$_2$NR'—. The substituents R, R', R" and R'" are preferably independently selected from hydrogen or substituted or unsubstituted (C$_1$-C$_6$)alkyl. These terms encompass groups considered exemplary "aryl group substituents", which are components of exemplary "substituted aryl" "substituted heteroarene" and "substituted heteroaryl" moieties.

As used herein, the term "acyl" describes a substituent containing a carbonyl residue, C(O)R. Exemplary species for R include H, halogen, substituted or unsubstituted alkyl, substituted or unsubstituted aryl, substituted or unsubstituted heteroaryl, and substituted or unsubstituted heterocycloalkyl.

As used herein, the term "fused ring system" means at least two rings, wherein each ring has at least 2 atoms in common with another ring. "Fused ring systems may include aromatic as well as non-aromatic rings. Examples of "fused ring systems" are naphthalenes, indoles, quinolines, chromenes and the like.

As used herein, the term "heteroatom" includes oxygen (O), nitrogen (N), sulfur (S) and silicon (Si) and boron (B).

The symbol "R" is a general abbreviation that represents a substituent group that is selected from H, substituted or unsubstituted alkyl, substituted or unsubstituted heteroalkyl, substituted or unsubstituted aryl, substituted or unsubstituted heteroaryl, and substituted or unsubstituted heterocycloalkyl groups.

The compounds disclosed herein may also contain unnatural proportions of atomic isotopes at one or more of the atoms that constitute such compounds. For example, the compounds may be radiolabeled with radioactive isotopes, such as for example tritium ($^3$H), iodine-125 ($^{125}$I) or carbon-14 ($^{14}$C). All isotopic variations of the compounds of the present invention, whether radioactive or not, are intended to be encompassed within the scope of the present invention.

The term "salt(s)" includes salts of the compounds prepared by the neutralization of acids or bases, depending on the particular ligands or substituents found on the compounds described herein. When compounds of the present invention contain relatively acidic functionalities, base addition salts can be obtained by contacting the neutral form of such compounds with a sufficient amount of the desired base, either neat or in a suitable inert solvent. Examples of base addition salts include sodium, potassium, calcium, ammonium, organic amino, or magnesium salt, or a similar salt. Examples of acid addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids, and the like, as well as the salts derived from relatively nontoxic organic acids like acetic, propionic, isobutyric, butyric, maleic, malic, malonic, benzoic, succinic, suberic, fumaric, lactic, mandelic, phthalic, benzenesulfonic, p-tolylsulfonic, citric, tartaric, methanesulfonic, and the like. Certain specific compounds of the present invention contain both basic and acidic functionalities that allow the compounds to be converted into either base or acid addition salts. Hydrates of the salts are also included.

As used herein, the term "triplet energy" refers to an energy corresponding to the highest energy feature discernable in the phosphorescence spectrum of a given material. The highest energy feature is not necessarily the peak having the greatest intensity in the phosphorescence spectrum, and can, for example, be a local maximum of a clear shoulder on the high energy side of such a peak.

As used herein, and as would be generally understood by one skilled in the art, a first "Highest Occupied Molecular Orbital" (HOMO) or "Lowest Unoccupied Molecular Orbital" (LUMO) energy level is "greater than" or "higher than" a second HOMO or LUMO energy level if the first energy level is closer to the vacuum energy level. Since ionization potentials (IP) are measured as a negative energy relative to a vacuum level, a higher HOMO energy level corresponds to an IP having a smaller absolute value (an IP that is less negative). Similarly, a higher LUMO energy level corresponds to an electron affinity (EA) having a smaller absolute value (an EA that is less negative). On a conventional energy level diagram, with the vacuum level at the top, the LUMO energy level of a material is higher than the HOMO energy level of the same material. A "higher" HOMO or LUMO energy level appears closer to the top of such a diagram than a "lower" HOMO or LUMO energy level.

The term "organometallic" as used herein is as generally understood by one of ordinary skill in the art and as given, for example, in "Inorganic Chemistry" (2nd Edition) by Gary L. Miessler and Donald A. Tan, Prentice Hall (1998). Thus, the term organometallic refers to compounds which have an organic group bonded to a metal through a carbon-metal bond. This class does not include per se coordination compounds, which are substances having only donor bonds from heteroatoms, such as metal complexes of amines, halides, pseudohalides (CN, etc.), and the like. In practice, organometallic compounds generally comprise, in addition to one or more carbon-metal bonds to an organic species, one or more donor bonds from a heteroatom. The carbon-metal bond to an organic species refers to a direct bond between a metal and a carbon atom of an organic group, such as phenyl, alkyl, alkenyl, etc., but does not refer to a metal bond to an "inorganic carbon," such as the carbon of CN or CO.

The terms "core" and "scaffold" are used interchangeably and refer to a molecular structure with one or more substitutable positions. In an exemplary embodiment, in which the structure is a putative host for an OLED, the scaffold comprises a planar component, wherein the planar component comprises a π-electron system distributed over the entirety of the planar component. For the purposes of clarity, the substitutable positions and substituents in those positions obey the classical rules of valence in organic chemistry.

A "basic molecular scaffold" is a computational starting point, which, in one embodiment is a substituted or unsubstituted polycyclic aryl or heteroaryl compound, optionally including one or more intra-annular heteroatoms and/or one or more substituents pendent from an intra-annular atom of the polycyclic system. Exemplary "basic molecular scaffolds" are varied in methods of the invention by insertion or removal of intra-annular heteroatoms, variation of the position and composition of one or more "utilizable substituents", "connectors" and the ring size and composition of one or more "structural unit".

A "utilizable substituent" is a moiety located in an intra-annular position (e.g., a heteroatom) or pendent from an intra-annular atom in a polycylic core or scaffold. The utilizability of a "utilizable substituent" is determined, at least in part, by its obeying the classical rules of valence in organic chemistry when it is placed in the desired position in the molecule.

A "connector" as this term is used herein joins two or more "structural units". Exemplary connectors are selected from a bond, substituted or unsubstituted alkyl, substituted or unsubstituted heteroalkyl, substituted or unsubstituted heterocycloalkyl, substituted or unsubstituted aryl or substituted or unsubstituted heteroaryl.

A "structural unit", as this term is used herein, refers to a mono- or poly-cyclic (e.g., fused ring system) ring systems subunit of a molecule, most generally an aryl or heteroaryl subunit. This term also refers to computationally relevant fragments of such ring systems (e.g., RC—C=C—).

III. The Exemplary Embodiments

A. Compound Libraries

In an exemplary embodiment, the invention provides a library of compounds of use as, or projected to be of use as, an OLED host material. In various embodiments, the library comprises a plurality of compounds organized upon the basis of a common core or scaffold. For example, a common scaffold can be a polycyclic heteroarene system in which the arrangement of the rings within the system, their contact surfaces with adjoining rings within the system and the number of rings within the system are identical. In an exemplary library, a member selected from the identity of a heteroatom, the position of a heteroatom, the number of heteroatoms and a combination of these library features is varied across the library.

In various embodiments, the present invention provides a multistep process in materials discovery. The method can be conceptually broken into three interlocking stages: Exploration, Examination and Elaboration, the "E3 Approach". Exploration involves large-scale theoretical studies of combinatorial libraries of related materials, focusing specifically on their electronic properties. In an exemplary embodiment, these libraries will have up to millions of members, each built around a different promising core (scaffold) structure. In an exemplary embodiment, the process incorporates "data mining" the output of the theoretical study to find the materials that are expected to have the optimal electronic properties for the desired application (for example electron acceptors for OPVs in the present case).

In a representative Examination phase materials are prepared that were predicted to have optimal electronic properties and heir optical and electronic properties are measured. In an exemplary embodiment, this will involve the 5-10 compounds depending on the size of the library, the number of "hits" and the difficulty in synthesizing the materials. The data collected in Examination will be compared to the theoretical predictions and used to validate or invalidate the library. In an exemplary embodiment, further thin film characterization and study of the materials incorporated into devices (e.g., an OLED) is performed. In an exemplary embodiment, the Exploration and Examination phases of the E3 process are focused solely on the electronic properties of the materials.

In various embodiments, during the Exploration and Examination phase, single crystal and thin film structures/morphologies are measured. In an exemplary embodiment, in the two initial phases, no attempt is made to control the structure or morphology of the materials. In the Elaboration phase of the E3 process we will investigate how peripheral substitution, such as addition of alky or aryl groups, affects the structure/morphology of thin films of the materials. Such substitution is not expected to alter the electronic properties, but may control the bulk and thin film morphology of the materials.

In various embodiments, the E3 process leverages data collection and mining off of a large library using a suitable level of theory that provides confidence that the library provides reasonable values or, in a preferred embodiment, correct values for the electronic properties of each member. In an exemplary embodiment, computing resources sufficient to evaluate large libraries that will take the serendipity and intuition out of materials discovery are deployed.

In an exemplary embodiment, a plurality of compounds within the library is related to one or more compound characteristic. Each compound independently related to one or more compound characteristic. For example, a first compound of the library can be related to HOMO (eV), LUMO (eV), the H-L gap (eV), $S_o$-$T_1$ (nm), oxidation potential (eV), reduction potential (eV), hole reorganization energy (eV), electron reorganization energy (eV), triplet energy (eV), dipole moment (D) and the like. A second compound of the library can be related to all of the same characteristics as the first compound or it can be related to a subset of these characteristics, different characteristics or characteristics in addition to those to which the first compound is related. In an exemplary embodiment, each member of the library is related to the same characteristics.

In an exemplary embodiment, the compound formula and one or more compound characteristic are related by means of a relational database, which is queriable.

As will be apparent to those of skill in the art, the present invention is not limited with respect to the compound core (scaffold) structures or the diverse substituted derivatives of these cores. The present invention is further exemplified by reference to a model library of compounds based upon the triphenylene (tPh) system, such a library may include all compounds formed by substituting a nitrogen for a carbon within each accessible position within this system. An exemplary library is formed by the process of "ring-walking" a single nitrogen across each accessible position in the tPh system until the library includes each tPh compound substituted with a single intraannular nitrogen that can be visualized. As will be apparent to those of skill in the art, the process of assembling the library can be practiced with two or more heteroatoms across a polycyclic ring system. Thus, two nitrogens can be "ring-walked" across the accessible positions in a polycyclic heteroarene system. The libraries are not limited to collections of compounds including only nitrogen as a heteroatom.

In an exemplary embodiment, the invention provides a library of polycyclic heteroarenes containing at least 3-, at least 4-, at least 5- or at least 6-rings in a fused ring heteroarene system. In various embodiments, the library includes a plurality of compounds including at least one, at least two, at least three, at least four, at least five at least six, at least seven, or at least eight heteroatoms substituted at an appropriate number of sites within the polyarene system. In various embodiments, at least one, at least two, at least three, at least four, at least five at least six, at least seven, or at least eight of the heteroatoms is nitrogen. In various embodiments, not more than one, not more than two, not more than three, not more than four, not more than five, not more than six or not more than seven of the heteroatoms are nitrogen.

As will be appreciated by those of skill in the art, the libraries of the present invention can include any combination of five- or six-membered rings that produces a planar heteroarene system, and as discussed above, one or more of these rings include at least one heteroatom. In an exemplary embodiment, the at least one heteroatom is at least one nitrogen atom.

Thus, in an exemplary embodiment, the invention provides a library of compounds having the formula:

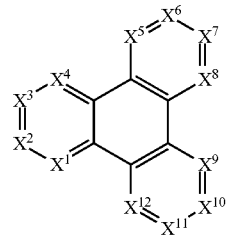

in which $X^1$-$X^{10}$ are members independently selected from N, CR in which R is an "aryl group substituent" as this term is defined herein.

In various embodiments, the invention provides a library of compounds having the formula:

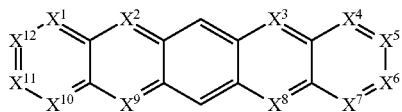

in which $X^1$-$X^{12}$ are members independently selected from N, CR in which R is an "aryl group substituent" as this term is defined herein.

In various embodiments, the invention provides a library of compounds in which one or more of the phenyl moieties of triphenylene are replaced with a five-member ring, maintaining the aromatic system of the overall compound. An exemplary library according to this embodiment has a formula which is a member selected from:

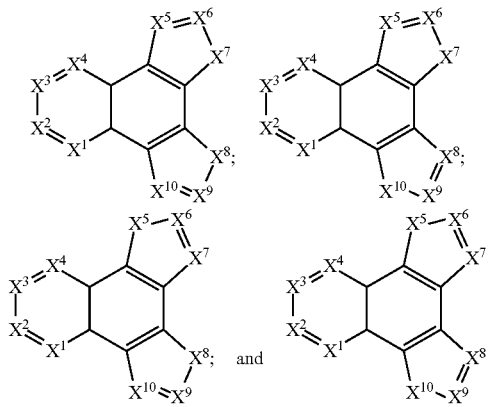

in which $X^1$-$X^{10}$ are members independently selected from N, CR in which R is an "aryl group substituent" as this term is defined herein.

In various embodiments, each R moiety is independently selected from H, substituted or unsubstituted alkyl, substituted or unsubstituted heteroalkyl, substituted or unsubstituted aryl, substituted or unsubstituted heteroaryl, halogen, CN, CF$_3$, acyl, —SO$_2$NR$^1$R$^2$, —NR$^1$R$^2$, —OR$^1$, —S(O)$_2$R$^1$, —C(O)R$^1$, —COOR$^1$, —CONR$^1$R$^2$, —S(O)$_2$OR$^1$, —OC(O)R$^1$, —C(O)NR$^1$R$^2$, —NR$^1$C(O)R$^2$, NR$^1$C(O)NR$^2$R$^3$, C(NR$^1$)R$^2$, —NR$^1$SO$_2$R$^2$, —NO$_2$, and P(O)(OR$^1$)(OR$^2$). Two or more of R$^1$, R$^2$, R$^3$, and R$^4$, together with the atoms to which they are bonded, are optionally joined to form a ring system which is a member selected from substituted or unsubstituted cycloalkyl, substituted or unsubstituted heterocycloalkyl, substituted or unsubstituted aryl and substituted or unsubstituted heteroaryl.

In various embodiments, the invention provides a library of aza-substituted tPh and related fused tricyclic materials can be prepared that will give a high triplet energy and have a readily tunable LUMO energy to allow for careful tailoring of the host properties to match a desired dopant. While the aza-substitution has been shown to lower HOMO and LUMO energies, making the tPh system a potential electron conductor, it also adds a potential problem. While tPh is non-polar, an important property for good carrier mobility, some aza substituted isomers will have high dipole moments and others will have low dipoles. Thus, the task of finding the best aza-substituted tPh to serve as a host for deep blue PHOLEDs involves determining the right number of nitrogens to substitute and in what positions to achieve the desired LUMO and triplet energies and have a low dipole moment. The libraries and methods of the instant invention provide a suite of tools for determining which isomer is the best without the need for synthesizing each compound and testing it individually.

The power of the libraries and methods of the invention are immediately apparent once diversity begins to be appended to a selected core structure (scaffold). For example, there are only two isomers of tPh with a single N substitution, but there are 22 separate isomers with two N substitutions. In exemplary embodiments, alkyl, phenyl groups and/or N-substitutions are incorporated to achieve desirable properties, e.g., the right volatility and mechanical properties, in the amorphous thin films used for OLED fabrication. If a single alkyl or aryl substituent is added to the tPh frame the number of isomers that have two nitrogen substitutions goes up to 114. As will be apparent to those of skill in the art, as additional diversity is appended to the core, the number of potential isomers and analogs expands quickly. The present libraries and methods provide tools for querying the promising diverse chemical space around a selected core.

In the exemplary embodiments set forth above, the OLED host materials consist of molecules comprised of multiple aromatic groups, held together by conjugated linkages or are present as ring fused systems. In a further exemplary embodiment, the library comprises a plurality of members of a formula belonging to the so-called ultra-wide gap (UGH) materials. An example of such a material is shown in the formula below:

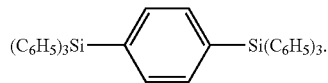

Figure 4:
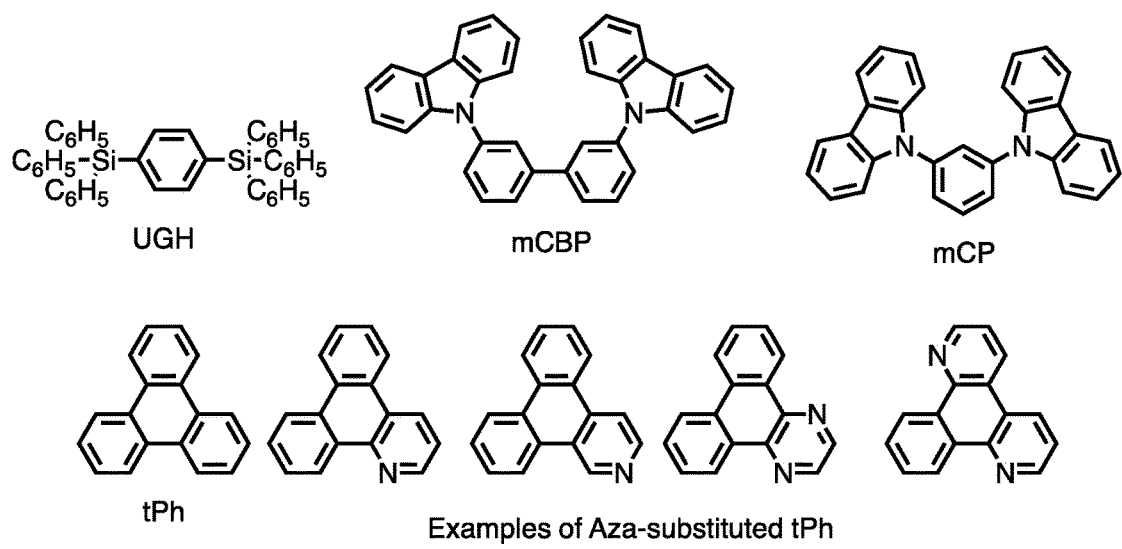
FIG. 4 displays exemplary compounds of use in OLED devices, including exemplary aza-substituted tPh compounds

This UGH material has a very high triplet energy (>3.5 eV), making it a good host material for high energy triplet emitters. In the UGH family of materials, the largest conjugated system is a single phenyl ring. This family of host materials has been used to prepare OLED that emit from phosphorescent dopants with triplet energies of 3.0-3.1 eV. While the UGH materials have high triplet energies, a necessary criterion for high energy phosphorescence, they have very high reduction potentials (very small electron affinities) and high oxidation potentials, making them poor host candidates from a carrier conduction standpoint (FIG. 4). The UGH materials have also proven to give poor PHOLED lifetimes. It is a goal of the present invention to apply the libraries of the invention and the methods of querying these libraries to find high triplet energy materials, suitable for high energy phosphorescent dopants, that will give efficient carrier conduction for either holes or electrons. It is also desirable to have a family of materials with high triplet energies and tunable hole and/or electron energies, such that the host can be tailored to match a given dopant. In this way the host-dopant combination can be designed to give efficient carrier condition and charge recombination at the dopant.

In a further exemplary embodiment, the library is comprised of a plurality of members, which are host materials for blue PHOLEDs. In an exemplary embodiment, the compounds are carbaozole derivatives. An exemplary library is based upon an mCBP and/or a mCP core as shown below:

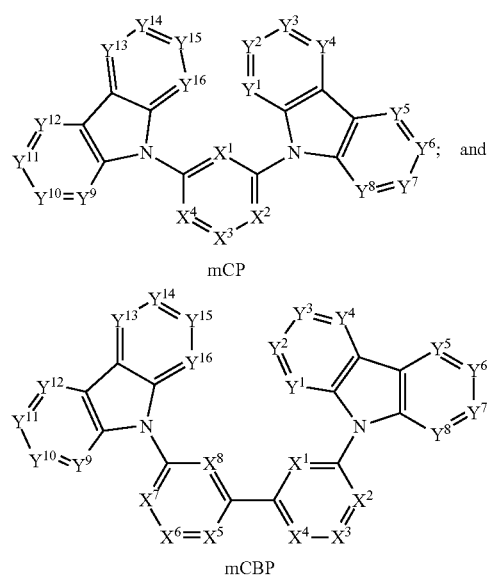

in which each of $X^1$-$X^8$ and $Y^1$-$Y^{16}$ is independently selected from CR and N, in which R is an "aryl group substituent" as this term is defined herein.

In various embodiments, each R is independently selected from the groups from H, substituted or unsubstituted alkyl, substituted or unsubstituted heteroalkyl, substituted or unsubstituted aryl, substituted or unsubstituted heteroaryl, halogen, CN, $CF_3$, acyl, $-SO_2NR^1R^2$, $-NR^1R^2$, $-OR^1$, $-S(O)_2R^1$, $-C(O)R^1$, $-COOR^1$, $-CONR^1R^2$, $-S(O)_2OR^1$, $-OC(O)R^1$, $-C(O)NR^1R^2$, $-NR^1C(O)R^2$, $NR^1C(O)NR^2R^3$, $C(NR^1)R^2$, $-NR^1SO_2R^2$, $-NO_2$, and $P(O)(OR^1)(OR^2)$. Two or more of $R^1$, $R^2$, $R^3$, and $R^4$, together with the atoms to which they are bonded, are optionally joined to form a ring system which is a member selected from substituted or unsubstituted cycloalkyl, substituted or unsubstituted heterocycloalkyl, substituted or unsubstituted aryl and substituted or unsubstituted heteroaryl.

mCBP for example has been used to make blue PHOLEDs, however, its use is limited to unsaturated blue emitters, not the deep blue emitters that are needed for displays and other applications (FIG. 4). mCP gives a higher triplet energy, making it suitable for deep blue PHOLEDs, but it gives very poor carrier conduction and leads to poor device lifetimes (FIG. 4). Triphenylene (tPh) has a higher triplet energy than mCBP and is a promising host material (FIG. 4). Unfortunately, this compound has a high reduction potential and has not been found to make a good host material for deep blue PHOLEDs. Substitution of nitrogen for CH in tPh alters the HOMO and LUMO energies substantially, but does not lower the singlet or triplet energies. The libraries and the methods of the invention provide access to mCBP and mCP compounds possessed of properties desirable for OLEDs.

In an exemplary embodiment, the invention makes us of a theoretical modeling modality sufficiently advanced that a theoretical screening approach can be used to explore all of the potential isomers, allowing for the prediction of parameters such as HOMO, LUMO, $S_1$ and $T_1$ energies as well as hole and electron reorganization energies (useful for predicting carrier mobility), molecular dipole moments and a number of other interesting parameters. An example of a study of this type is shown below, where HOMO and LUMO energies were estimated for several aza-tPh compounds.

Note that the LUMO energies are lowered substantially by Aza-susbstitution, both in number of nitrogens and by their location (FIG. 5A).

Figure 5B:
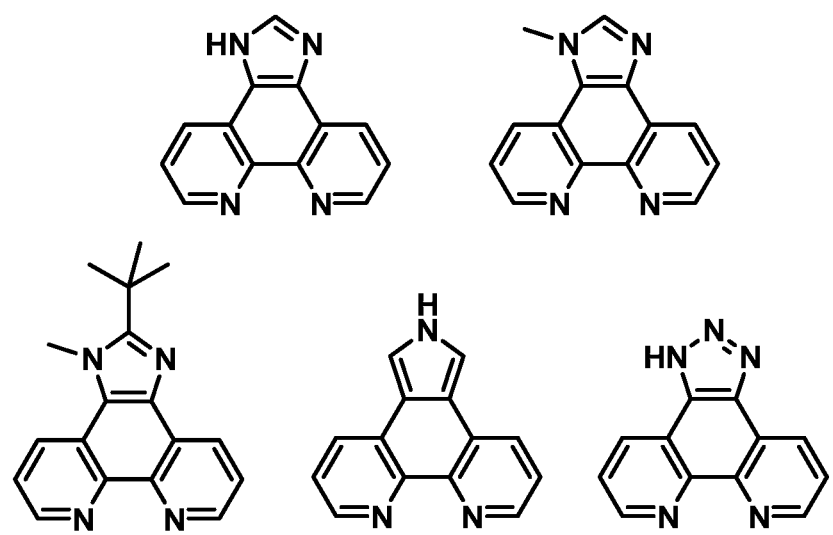
FIG. 5B provides chemical structures of phenanthroline based H2P derivatives with potentially high triplet energies.

The present invention provides systems and methods for exploring all, or substantially all, of the potential isomers and calculating all of the desired parameters, not just HOMO and LUMO energy. In an exemplary embodiment, these theoretical screening experiments are performed for systems with three fused six members rings, such tPh, hereafter referred to as H3 systems. In further exemplary embodiments, the invention provides methods for investigating systems that have two six membered rings and one five membered ring, as shown herein, referred to as H2P and systems with one six membered ring and two five membered rings, i.e., HP2 (FIG. 5B).

Figure 5C:
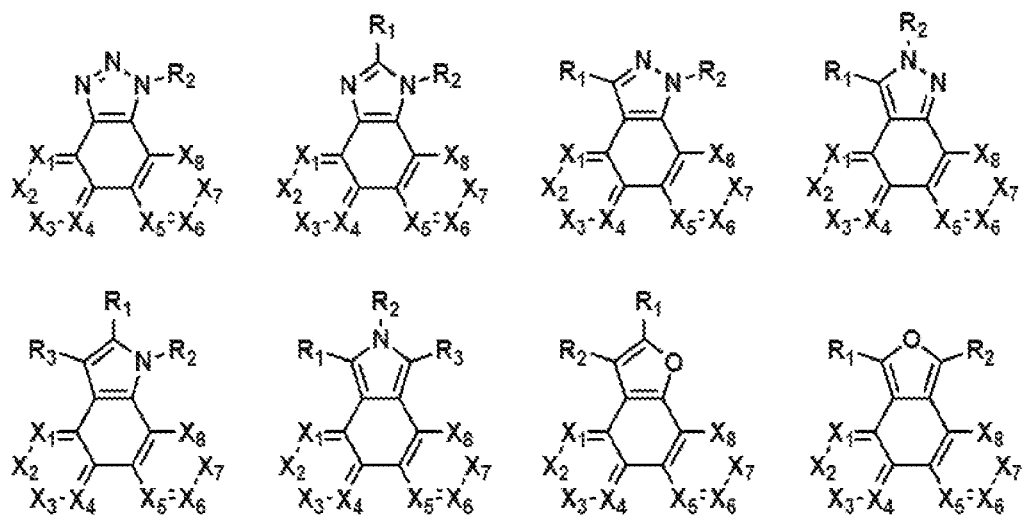
FIG. 5C illustrates exemplary scaffolds based on the H2P structure with potentially high triplet energies.
Figure 5C:
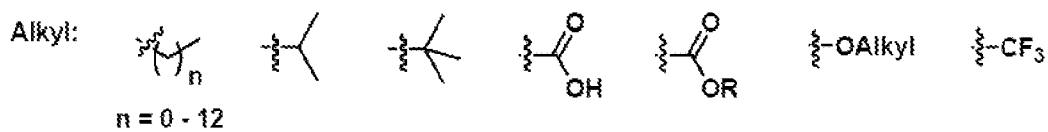
Figure 5C:
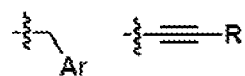
Figure 5C:
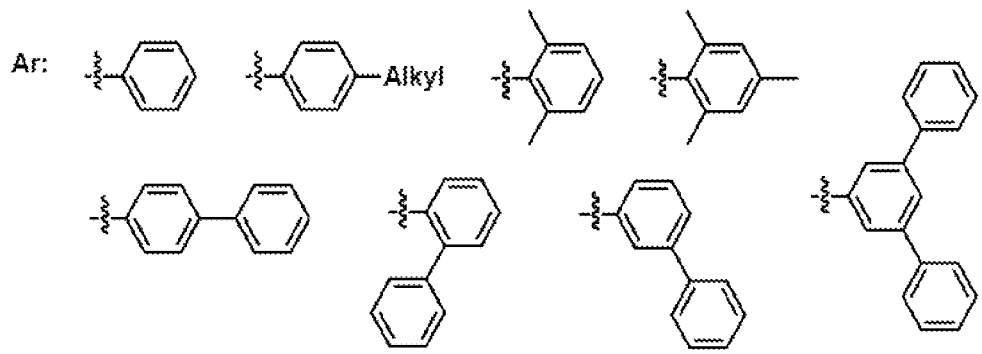

In an exemplary embodiment, the six membered ring substitution is restricted to only intra-annular nitrogen, since these materials are expected to be stable and there are readily available synthetic pathways that can be used to prepare the heterocycles. The five membered rings can also be substituted with N, NR, O, S and PR. The amount of data in the literature is not sufficient to evaluate all of these materials based on experimental data. Considering the large number of potential isomers, this will be a daunting task theoretically if the calculations are done one isomer at a time. Fortunately, combinatorial methods are now available for carrying a large number of calculations in parallel. The combinatorial process involves setting up the framework and identifying the site of potential substitution and number of substituents. This is shown below for H3, H2P and HP2 ring systems. The geometry is optimized for the ground state ($S_0$), $S_1$, $T_1$, cation and anion. These structures are then used for subsequent calculations of HOMO, LUMO, $S_1$ and $T_1$ energies as well as hole and electron reorganization energies and molecular dipole moments. The results for all of the isomers are then presented in tabular fashion so that those that meet the right criteria can be quickly evaluated. In an exemplary embodiment, the computational method described herein is used to characterize a family of dinitrogen substituted H2P derivatives as OLED hosts on the basis of their LUMO energy, carrier reorganization energy and triplet energy, e.g., high triplet energy. The methods of the present invention, in an exemplary embodiment, provide a series of new heterocyclic hosts based on a 6,6,6,5-tetracyclic scaffold. These hosts demonstrated examples of PhOLED devices based on H2P hosts (FIG. 5C). Exemplary compounds produced by a method of the invention are deep blue PHOLEDs.

Figure 5D:
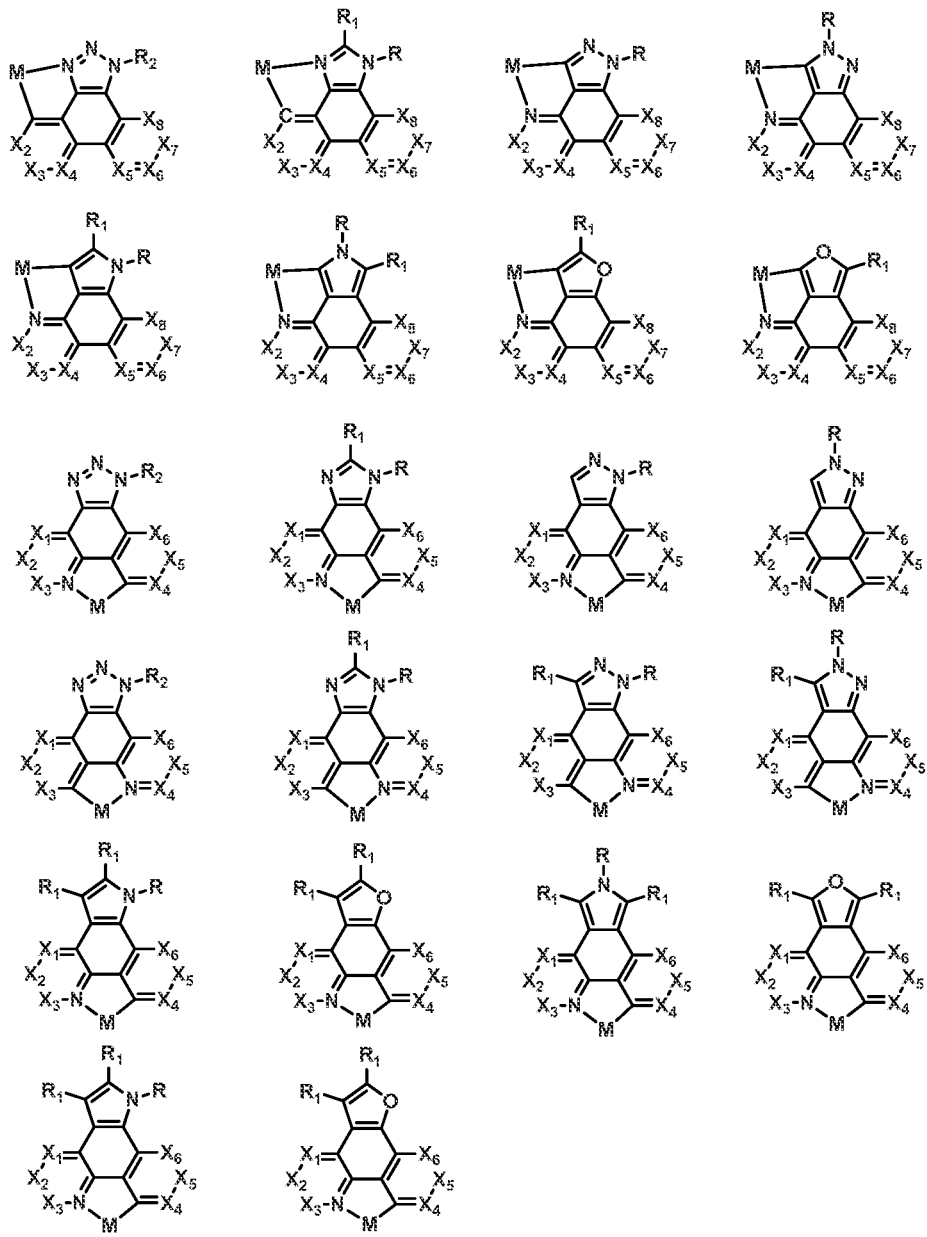
FIG. 5D shows scaffolds based on the H2P structure incorporated into metal complexes.
Figure 5E:
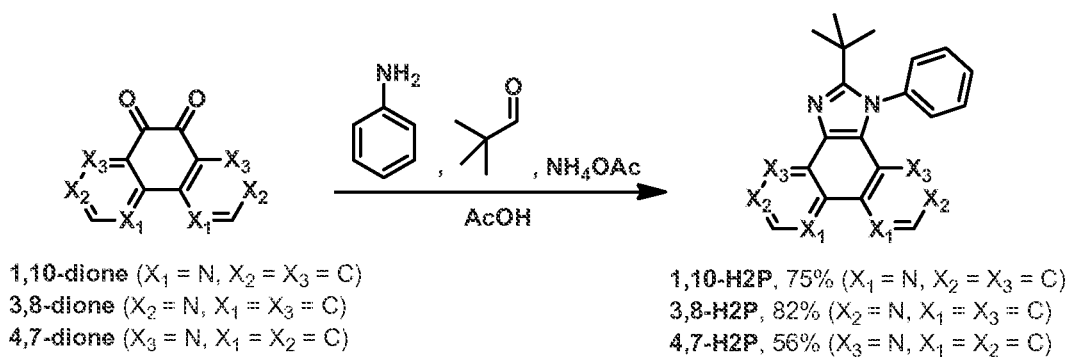
FIG. 5E illustrates an exemplary synthesis of 1,10-H2P, 3,8-H2P, and 4,7-H2P.
Figure 6:
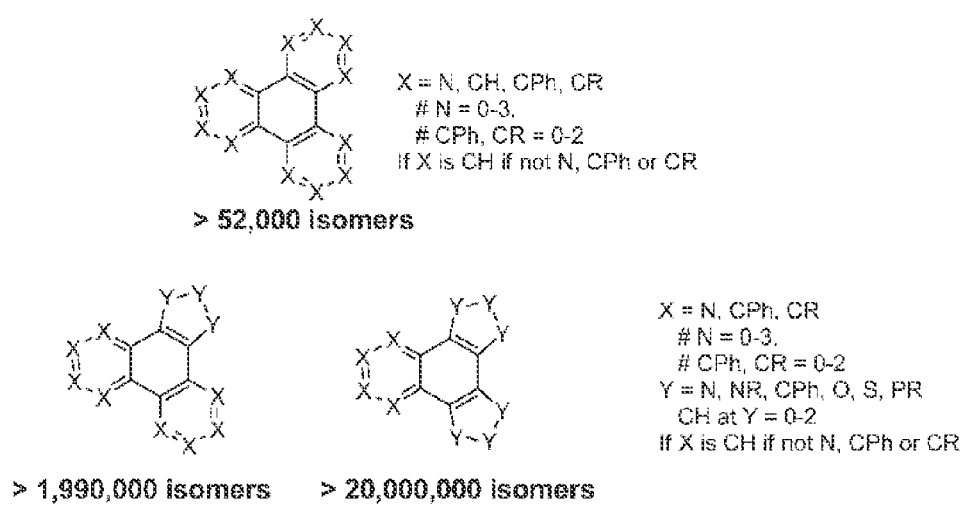
FIG. 6 shows exemplary library scaffolds for OLED compounds and the calculated number of positional isomers derived from these scaffolds.

In various embodiments, the present invention provides for methods and processes for identifying organic host materials and ligands for phosphorescent dopants in organic light emitting diodes (OLED). In an embodiment, the present invention provides for methods and processes for identifying organic host materials and ligands for fluorescent dopants in OLEDs. In another embodiment, the present invention provides for methods and processes for identifying organic host materials and ligands for delayed-fluorescent dopants in OLEDs. As will be understood by one of skill in the art, various emissive dopants can produce emissions via phosphorescence, fluorescence, thermally activated delayed fluorescence, i.e., TADF (also referred to as E-type delayed fluorescence), triplet-triplet annihilation, or combinations of these processes. In an exemplary embodiment, the methods of the invention are of use to identify a ligand with appropriately high triplet energy and a ring structure and conformation that allows for its complexation of a metal or metal ion (FIG. 5D), providing access to phosphorescent dopants. In various embodiments, the presence of one or more nitrogens in the scaffold ring system provides a means of engineering physical properties of metal complexes, e.g., tunable emission wavelength, quantum yield and redox potential.

In various embodiments, the present invention provides organometallic emitters where the most labile ligand is the same as the host material in the device. In various embodiments, emissive dopants can produce emissions via phosphorescence, fluorescence, thermally activated delayed fluorescence, i.e., TADF (also referred to as E-type delayed fluorescence), triplet-triplet annihilation, or combinations of these processes. In various embodiments, the present invention provides phosphorescent organometallic emitters where the most labile ligand is the same as the host material in the device. Therefore, if the ligand dissociates from the metal complex, the dissociated complex readily returns to its original structure by binding one of the host materials in the emissive layer. This "self-healing" character of this particular host-dopant system where the most labile ligand is the same as the host enhances the device lifetime. An example of such a dopant-host pair is shown below.

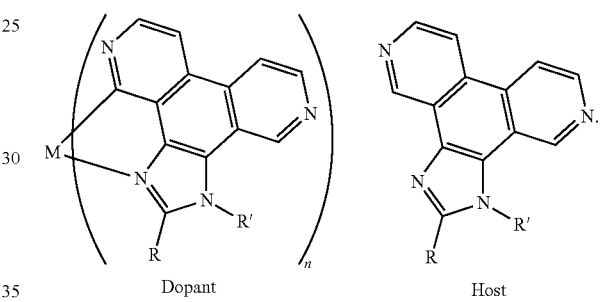

Dopant           Host

In an exemplary embodiment, the system shown above includes R=H, R'=Ph, and M=Ir. The calculated triplet energy and HOMO/LUMO are 3.10 eV and −5.83/−1.60 eV for the host and 2.91 eV and −4.94/1.20 eV for the dopant, respectively. In this particular example, the lower triplet energy of the dopant relative to the host is desirable to trap excitons by the dopant. On the other hand, both HOMO and LUMO are destabilized upon metal coordination (0.9 eV for HOMO and 0.4 eV for LUMO). The destabilization of LUMO results from the electron donation to the bipyridyl moiety. The calculated results suggest that electron donation from the metal to the ligand is the dominant effect to raise both HOMO and LUMO over the back-donation from the imidazole which lowers the LUMO. This host/dopant energy level alignment is advantageous for OLED because holes will be preferably trapped by the dopant which then facilitates subsequent electron trapping due to Coulombic attraction.

As will be appreciated by those of skill in the art, in the system described, and analogous systems, further stabilization/destabilization of the energy levels upon metal coordination is accomplished by altering the R and R' groups as well as the placement of the nitrogen atoms of the ligand to meet proper energy level alignment with adjacent layers.

The invention further includes methods and processes for determining the relative interaction between an OLED host compound and a dopant.

This invention further provides for a screening method for determining compounds that have desirable OLED host compound properties.

B. Organic Light Emitting Diodes

Figure 18A:
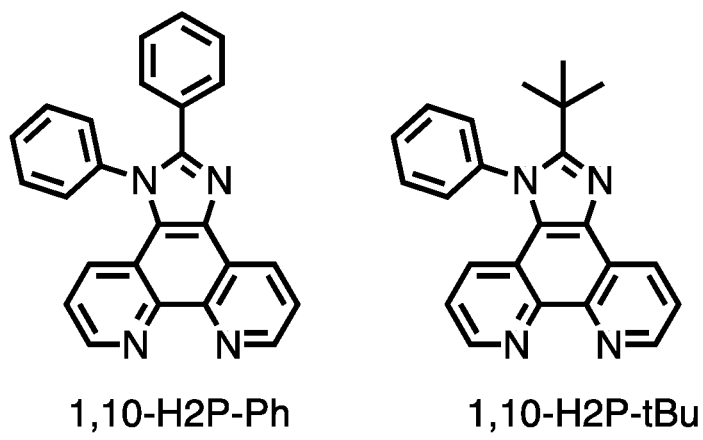
FIG. 18A. Characteristics of devices of Example 4: B, L-V-J characteristics of the devices of Example 4 using different hosts.
Figure 18A:
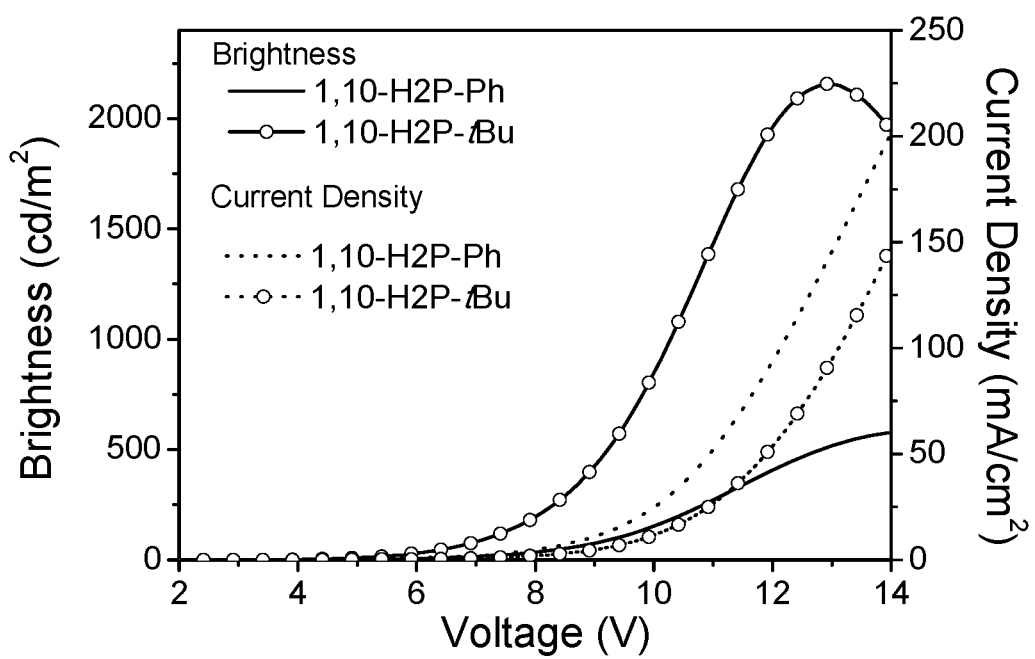
Figure 18B:
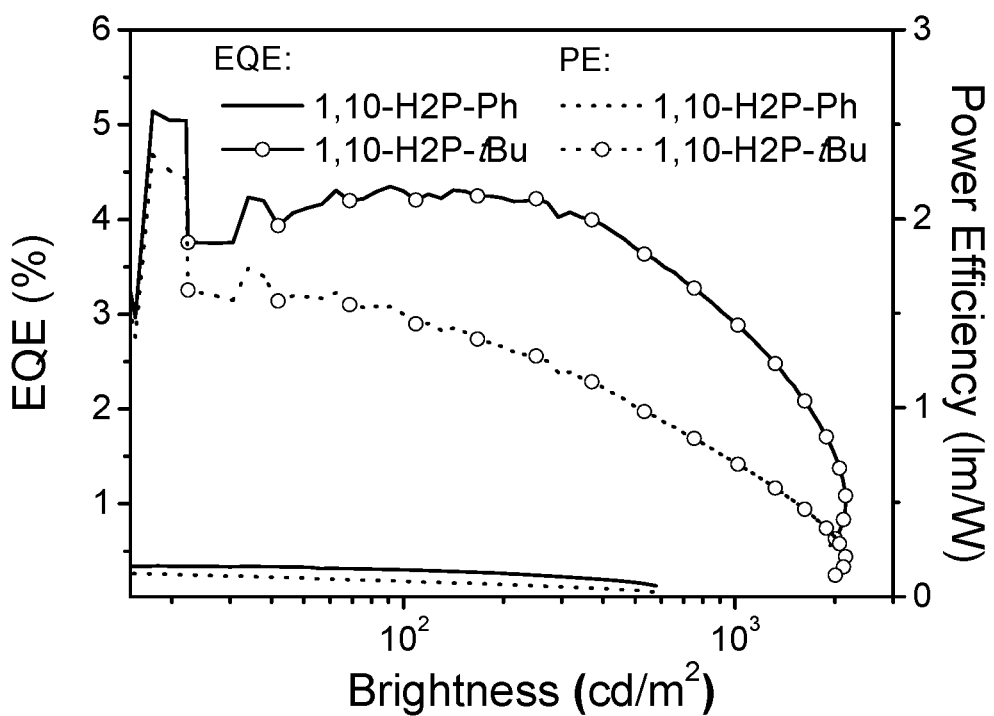
FIG. 18B, EQE and power efficiency of the devices of Example 4 using different hosts.

In various embodiments, the invention provides for the incorporation of a material into an OLED, which is created or identified according to a method or using a library of the instant invention. The material can be a host compound. In an exemplary embodiment, the material is incorporated into an OLED to test whether the results of the library screening are accurate. In an exemplary embodiment, the material is incorporated into an OLED intended for commercialization or another purpose. The properties of exemplary OLED devices incorporating materials whose structure was elucidated using the methods of the invention are displayed in FIG. 18.

Generally, an OLED comprises at least one organic layer disposed between and electrically connected to an anode and a cathode. When a current is applied, the anode injects holes and the cathode injects electrons into the organic layer(s). The injected holes and electrons each migrate toward the oppositely charged electrode. When an electron and hole localize on the same molecule, an "exciton," which is a localized electron-hole pair having an excited energy state, is formed. Light is emitted when the exciton relaxes via a photoemissive mechanism. In some cases, the exciton may be localized on an excimer or an exciplex. Non-radiative mechanisms, such as thermal relaxation, may also occur, but are generally considered undesirable.

The initial OLEDs used emissive molecules that emitted light from their singlet states ("fluorescence") as disclosed, for example, in U.S. Pat. No. 4,769,292, which is incorporated by reference in its entirety. Fluorescent emission generally occurs in a time frame of less than 10 nanoseconds.

More recently, OLEDs having emissive materials that emit light from triplet states ("phosphorescence") have been demonstrated. Baldo et al., "Highly Efficient Phosphorescent Emission from Organic Electroluminescent Devices," Nature, vol. 395, 151-154, 1998; ("Baldo-I") and Baldo et al., "Very high-efficiency green organic light-emitting devices based on electrophosphorescence," Appl. Phys. Lett., vol. 75, No. 3, 4-6 (1999) ("Baldo-II"), which are incorporated by reference in their entireties. Phosphorescence may be referred to as a "forbidden" transition because the transition requires a change in spin states, and quantum mechanics indicates that such a transition is not favored. As a result, phosphorescence generally occurs in a time frame exceeding at least 10 nanoseconds, and typically greater than 100 nanoseconds. If the natural radiative lifetime of phosphorescence is too long, triplets may decay by a non-radiative mechanism, such that no light is emitted. Organic phosphorescence is also often observed in molecules containing heteroatoms with unshared pairs of electrons at very low temperatures. 2,2'-bipyridine is such a molecule. Non-radiative decay mechanisms are typically temperature dependent, such that an organic material that exhibits phosphorescence at liquid nitrogen temperatures typically does not exhibit phosphorescence at room temperature. But, as demonstrated by Baldo, this problem may be addressed by selecting phosphorescent compounds that do phosphoresce at room temperature. Representative emissive layers include doped or un-doped phosphorescent organo-metallic materials such as disclosed in U.S. Pat. Nos. 6,303,238 and 6,310,360; U.S. Patent Application Publication Nos. 2002-0034656; 2002-0182441; 2003-0072964; and WO-02/074015.

Generally, the excitons in an OLED are believed to be created in a ratio of about 3:1, i.e., approximately 75% triplets and 25% singlets. See, Adachi et al., "Nearly 100% Internal Phosphorescent Efficiency In An Organic Light Emitting Device," J. Appl. Phys., 90, 5048 (2001), which is incorporated by reference in its entirety. In many cases, singlet excitons may readily transfer their energy to triplet excited states via "intersystem crossing," whereas triplet excitons may not readily transfer their energy to singlet excited states. As a result, 100% internal quantum efficiency is theoretically possible with phosphorescent OLEDs. In a fluorescent device, the energy of triplet excitons is generally lost to radiationless decay processes that heat-up the device, resulting in much lower internal quantum efficiencies. OLEDs utilizing phosphorescent materials that emit from triplet excited states are disclosed, for example, in U.S. Pat. No. 6,303,238, which is incorporated by reference in its entirety.

Phosphorescence may be preceded by a transition from a triplet excited state to an intermediate non-triplet state from which the emissive decay occurs. For example, organic molecules coordinated to lanthanide elements often phosphoresce from excited states localized on the lanthanide metal. However, such materials do not phosphoresce directly from a triplet excited state but instead emit from an atomic excited state centered on the lanthanide metal ion. The europium diketonate complexes illustrate one group of these types of species.

Phosphorescence from triplets can be enhanced over fluorescence by confining, preferably through bonding, the organic molecule in close proximity to an atom of high atomic number. This phenomenon, called the heavy atom effect, is created by a mechanism known as spin-orbit coupling. Such a phosphorescent transition may be observed from an excited metal-to-ligand charge transfer (MLCT) state of an organometallic molecule such as tris(2-phenylpyridine)iridium(III).

FIG. 1 shows an exemplary organic light emitting device 100. The figures are not necessarily drawn to scale. Device 100 may include a substrate 110, an anode 115, a hole injection layer 120, a hole transport layer 125, an electron blocking layer 130, an emissive layer 135, a hole blocking layer 140, an electron transport layer 145, an electron injection layer 150, a protective layer 155, and a cathode 160. Cathode 160 is a compound cathode having a first conductive layer 162 and a second conductive layer 164. Device 100 may be fabricated by depositing the layers described, in order.

Substrate 110 may be any suitable substrate that provides desired structural properties. Substrate 110 may be flexible or rigid. Substrate 110 may be transparent, translucent or opaque. Plastic and glass are examples of preferred rigid substrate materials. Plastic and metal foils are examples of preferred flexible substrate materials. Substrate 110 may be a semiconductor material in order to facilitate the fabrication of circuitry. For example, substrate 110 may be a silicon wafer upon which circuits are fabricated, capable of controlling OLEDs subsequently deposited on the substrate. Other substrates may be used. The material and thickness of substrate 110 may be chosen to obtain desired structural and optical properties.

Anode 115 may be any suitable anode that is sufficiently conductive to transport holes to the organic layers. The material of anode 115 preferably has a work function higher than about 4 eV (a "high work function material"). Preferred anode materials include conductive metal oxides, such as indium tin oxide (ITO) and indium zinc oxide (IZO), aluminum zinc oxide (AlZnO), and metals. Anode 115 (and substrate 110) may be sufficiently transparent to create a bottom-emitting device. A preferred transparent substrate and anode combination is commercially available ITO (anode) deposited on glass or plastic (substrate). A flexible and transparent substrate-anode combination is disclosed in U.S. Pat. Nos. 5,844,363 and 6,602,540B2, which are incorporated by reference in their entireties. Anode 115 may be opaque and/or reflective. A reflective anode 115 may be preferred for some top-emitting devices, to increase the amount of light emitted from the top of the device. The material and thickness of anode 115 may be chosen to obtain desired conductive and optical properties. Where anode 115 is transparent, there may be a range of thickness for a particular material that is thick enough to provide the desired conductivity, yet thin enough to provide the desired degree of transparency. Other anode materials and structures may be used.

Hole transport layer 125 may include a material capable of transporting holes. Hole transport layer 130 may be intrinsic (undoped), or doped. Doping may be used to enhance conductivity. α-NPD and TPD are examples of intrinsic hole transport layers. An example of a p-doped hole transport layer is m-MTDATA doped with $F_4$-TCNQ at a molar ratio of 50:1, as disclosed in United States Patent Application Publication No. 2003-0230980 to Forrest et al., which is incorporated by reference in its entirety. Other hole transport layers may be used.

Emissive layer 135 may include an organic material capable of emitting light when a current is passed between anode 115 and cathode 160. Preferably, emissive layer 135 contains a phosphorescent emissive material, although emissive materials may also be used which operate by one or more of phosphorescent, fluorescent, TADF, or triplet-triplet annihilation processes. In various embodiments, phosphorescent materials are preferred because of the higher luminescent efficiencies associated with such materials. Emissive layer 135 may also comprise a host material capable of transporting electrons and/or holes, doped with an emissive material that may trap electrons, holes, and/or excitons, such that excitons relax from the emissive material via a photoemissive mechanism. Emissive layer 135 may comprise a single material that combines transport and emissive properties. Whether the emissive material is a dopant or a major constituent, emissive layer 135 may comprise other materials, such as dopants that tune the emission of the emissive material. Emissive layer 135 may include a plurality of emissive materials capable of, in combination, emitting a desired spectrum of light. Examples of phosphorescent emissive materials include $Ir(ppy)_3$. Examples of fluorescent emissive materials include DCM and DMQA. Examples of host materials in OLEDs include $Alq_3$, CBP and mCP. Examples of emissive and host materials in OLEDs are disclosed in U.S. Pat. No. 6,303,238 to Thompson et al., which is incorporated by reference in its entirety. In the present invention, preferred host materials include triphenylene complexes. Triphenylene compounds are useful materials in other applications in OLEDs such as electron transporting materials as described in US US20050025993. Emissive material may be included in emissive layer 135 in a number of ways. For example, an emissive small molecule may be incorporated into a polymer. This may be accomplished by several ways: by doping the small molecule into the polymer either as a separate and distinct molecular species; or by incorporating the small molecule into the backbone of the polymer, so as to form a co-polymer; or by bonding the small molecule as a pendant group on the polymer. Other emissive layer materials and structures may be used. For example, a small molecule emissive material may be present as the core of a dendrimer.

Many useful emissive materials include one or more ligands bound to a metal center. A ligand may be referred to as "photoactive" if it contributes directly to the luminescent properties of an organometallic emissive material. A "photoactive" ligand may provide, in conjunction with a metal, the energy levels from which and to which an electron moves when a photon is emitted. Other ligands may be referred to as "ancillary." Ancillary ligands may modify the photoactive properties of the molecule, for example by shifting the energy levels of a photoactive ligand, but ancillary ligands do not directly provide the energy levels directly involved in light emission. A ligand that is photoactive in one molecule may be ancillary in another. These definitions of photoactive and ancillary are intended as non-limiting theories.

Electron transport layer 145 may include a material capable of transporting electrons. Electron transport layer 145 may be intrinsic (undoped), or doped. Doping may be used to enhance conductivity. $Alq_3$ is an example of an intrinsic electron transport layer. An example of an n-doped electron transport layer is BPhen doped with Li at a molar ratio of 1:1, as disclosed in United States Patent Application Publication No. 2003-0230980 to Forrest et al., which is incorporated by reference in its entirety. Other electron transport layers may be used.

The charge carrying component of the electron transport layer may be selected such that electrons can be efficiently injected from the cathode into the LUMO (Lowest Unoccupied Molecular Orbital) energy level of the electron transport layer. The "charge carrying component" is the material responsible for the LUMO energy level that actually transports electrons. This component may be the base material, or it may be a dopant. The LUMO energy level of an organic material may be generally characterized by the electron affinity of that material and the relative electron injection efficiency of a cathode may be generally characterized in terms of the work function of the cathode material. This means that the preferred properties of an electron transport layer and the adjacent cathode may be specified in terms of the electron affinity of the charge carrying component of the ETL and the work function of the cathode material. In particular, so as to achieve high electron injection efficiency, the work function of the cathode material is preferably not greater than the electron affinity of the charge carrying component of the electron transport layer by more than about 0.75 eV, more preferably, by not more than about 0.5 eV. Similar considerations apply to any layer into which electrons are being injected.

Cathode 160 may be any suitable material or combination of materials known to the art, such that Cathode 160 is capable of conducting electrons and injecting them into the organic layers of device 100. Cathode 160 may be transparent or opaque, and may be reflective. Metals and metal oxides are examples of suitable cathode materials. Cathode 160 may be a single layer, or may have a compound structure. FIG. 1 shows a compound cathode 160 having a thin metal layer 162 and a thicker conductive metal oxide layer 164. In a compound cathode, preferred materials for the thicker layer 164 include ITO, IZO, and other materials known to the art. U.S. Pat. Nos. 5,703,436, 5,707,745, 6,548,956B2, and 6,576,134B2, which are incorporated by reference in their entireties, disclose examples of cathodes including compound cathodes having a thin layer of metal such as Mg:Ag with an overlying transparent, electrically-conductive, sputter-deposited ITO layer. The part of cathode 160 that is in contact with the underlying organic layer, whether it is a single layer cathode 160, the thin metal layer 162 of a compound cathode, or some other part, is preferably made of a material having a work function lower than about 4 eV (a "low work function material"). Other cathode materials and structures may be used.

Blocking layers may be used to reduce the number of charge carriers (electrons or holes) and/or excitons that leave the emissive layer. An electron blocking layer 130 may be disposed between emissive layer 135 and the hole transport layer 125, to block electrons from leaving emissive layer 135 in the direction of hole transport layer 125. Similarly, a hole blocking layer 140 may be disposed between emissive layer 135 and electron transport layer 145, to block holes from leaving emissive layer 135 in the direction of electron transport layer 145. Blocking layers may also be used to block excitons from diffusing out of the emissive layer. The theory and use of blocking layers is described in more detail in U.S. Pat. No. 6,097,147 and United States Patent Application Publication No. 2003-0230980 to Forrest et al., which are incorporated by reference in their entireties.

Generally, injection layers are comprised of a material that may improve the injection of charge carriers from one layer, such as an electrode or an organic layer, into an adjacent organic layer. Injection layers may also perform a charge transport function. In device 100, hole injection layer 120 may be any layer that improves the injection of holes from anode 115 into hole transport layer 125. CuPc is an example of a material that may be used as a hole injection layer from an ITO anode 115, and other anodes. In device 100, electron injection layer 150 may be any layer that improves the injection of electrons into electron transport layer 145. LiF/Al is an example of a material that may be used as an electron injection layer into an electron transport layer from an adjacent layer. Other materials or combinations of materials may be used for injection layers. Depending upon the configuration of a particular device, injection layers may be disposed at locations different than those shown in device 100. More examples of injection layers are provided in U.S. patent application Ser. No. 09/931,948 to Lu et al., which is incorporated by reference in its entirety. A hole injection layer may comprise a solution deposited material, such as a spin-coated polymer, e.g., PEDOT:PSS, or it may be a vapor deposited small molecule material, e.g., CuPc or MTDATA.

A hole injection layer (HIL) may planarize or wet the anode surface so as to provide efficient hole injection from the anode into the hole injecting material. A hole injection layer may also have a charge carrying component having HOMO (Highest Occupied Molecular Orbital) energy levels that favorably match up, as defined by their herein-described relative ionization potential (IP) energies, with the adjacent anode layer on one side of the in and the hole transporting layer on the opposite side of the HIL. The "charge carrying component" is the material responsible for the HOMO energy level that actually transports holes. This component may be the base material of the HIL, or it may be a dopant. Using a doped HIL allows the dopant to be selected for its electrical properties, and the host to be selected for morphological properties such as wetting, flexibility, toughness, etc. Preferred properties for the HIL material are such that holes can be efficiently injected from the anode into the HIL material. In particular, the charge carrying component of the HIL preferably has an IP not more than about 0.7 eV greater that the IP of the anode material. More preferably, the charge carrying component has an IP not more than about 0.5 eV greater than the anode material. Similar considerations apply to any layer into which holes are being injected. HIL materials are further distinguished from conventional hole transporting materials that are typically used in the hole transporting layer of an OLED in that such HIL materials may have a hole conductivity that is substantially less than the hole conductivity of conventional hole transporting materials. The thickness of the HIL of the present invention may be thick enough to help planarize or wet the surface of the anode layer. For example, an HIL thickness of as little as 10 nm may be acceptable for a very smooth anode surface. However, since anode surfaces tend to be very rough, a thickness for the HIL of up to 50 nm may be desired in some cases.

A protective layer may be used to protect underlying layers during subsequent fabrication processes. For example, the processes used to fabricate metal or metal oxide top electrodes may damage organic layers, and a protective layer may be used to reduce or eliminate such damage. In device 100, protective layer 155 may reduce damage to underlying organic layers during the fabrication of cathode 160. Preferably, a protective layer has a high carrier mobility for the type of carrier that it transports (electrons in device 100), such that it does not significantly increase the operating voltage of device 100. CuPc, BCP, and various metal phthalocyanines are examples of materials that may be used in protective layers. Other materials or combinations of materials may be used. The thickness of protective layer 155 is preferably thick enough that there is little or no damage to underlying layers due to fabrication processes that occur after organic protective layer 160 is deposited, yet not so thick as to significantly increase the operating voltage of device 100. Protective layer 155 may be doped to increase its conductivity. For example, a CuPc or BCP protective layer 160 may be doped with Li. A more detailed description of protective layers may be found in U.S. patent application Ser. No. 09/931,948 to Lu et al., which is incorporated by reference in its entirety.

The simple layered structure illustrated in FIG. 1 is provided by way of non-limiting example, and it is understood that embodiments of the invention may be used in connection with a wide variety of other structures. The specific materials and structures described are exemplary in nature, and other materials and structures may be used. Functional OLEDs may be achieved by combining the various layers described in different ways, or layers may be omitted entirely, based on design, performance, and cost factors. Other layers not specifically described may also be included. Materials other than those specifically described may be used. Although many of the examples provided herein describe various layers as comprising a single material, it is understood that combinations of materials, such as a mixture of host and dopant, or more generally a mixture, may be used. Also, the layers may have various sublayers.

Structures and materials not specifically described may also be used, such as OLEDs comprised of polymeric materials (PLEDs) such as disclosed in U.S. Pat. No. 5,247, 190, Friend et al., which is incorporated by reference in its entirety. By way of further example, OLEDs having a single organic layer may be used. OLEDs may be stacked, for example as described in U.S. Pat. No. 5,707,745 to Forrest et al, which is incorporated by reference in its entirety. The OLED structure may deviate from the simple layered structure illustrated in FIG. 1. For example, the substrate may include an angled reflective surface to improve out-coupling, such as a mesa structure as described in U.S. Pat. No. 6,091,195 to Forrest et al., and/or a pit structure as described in U.S. Pat. No. 5,834,893 to Bulovic et al., which are incorporated by reference in their entireties.

Unless otherwise specified, any of the layers of the various embodiments may be deposited by any suitable method. For the organic layers, preferred methods include thermal evaporation, ink-jet, such as described in U.S. Pat. Nos. 6,013,982 and 6,087,196, which are incorporated by reference in their entireties, organic vapor phase deposition (OVPD), such as described in U.S. Pat. No. 6,337,102 to Forrest et al., which is incorporated by reference in its entirety, and deposition by organic vapor jet printing (OVJP), such as described in U.S. patent application Ser. No. 10/233,470, which is incorporated by reference in its entirety. Other suitable deposition methods include spin coating and other solution based processes. Solution based processes are preferably carried out in nitrogen or an inert atmosphere. For the other layers, preferred methods include thermal evaporation. Preferred patterning methods include deposition through a mask, cold welding such as described in U.S. Pat. Nos. 6,294,398 and 6,468,819, which are incorporated by reference in their entireties, and patterning associated with some of the deposition methods such as ink jet and OVJD. Other methods may also be used. The materials to be deposited may be modified to make them compatible with a particular deposition method. For example, substituents such as alkyl and aryl groups, branched or unbranched, and preferably containing at least 3 carbons, may be used in small molecules to enhance their ability to undergo solution processing. Substituents having 20 carbons or more may be used, and 3-20 carbons is a preferred range. Materials with asymmetric structures may have better solution processibility than those having symmetric structures, because asymmetric materials may have a lower tendency to recrystallize. Dendrimer substituents may be used to enhance the ability of small molecules to undergo solution processing.

Devices fabricated in accordance with embodiments of the invention may be incorporated into a wide variety of consumer products, including flat panel displays, computer monitors, televisions, billboards, lights for interior or exterior illumination and/or signaling, heads up displays, fully transparent displays, flexible displays, laser printers, telephones, cell phones, personal digital assistants (PDAs), laptop computers, digital cameras, camcorders, viewfinders, micro-displays, vehicles, a large area wall, theater or stadium screen, or a sign. Various control mechanisms may be used to control devices fabricated in accordance with the present invention, including passive matrix and active matrix. Many of the devices are intended for use in a temperature range comfortable to humans, such as 18° C. to 30° C., and more preferably at room temperature (20-25° C.).

The materials and structures described herein may have applications in devices other than OLEDs. For example, other optoelectronic devices such as organic solar cells and organic photodetectors may employ the materials and structures. More generally, organic devices, such as organic transistors, may employ the materials and structures.

C. Library Generation

In various embodiments, the invention provides methods for generating libraries and conducting the Exploration phase of the E3 approach. In an exemplary approach one decides on a core (scaffold) structure. Examples of core structures are provided herein and in the Figured appended hereto. The library is generated by considering a plurality of possible substitutions on the various positions of the core, and various positional permutations of these substitutions. This is shown for example with the triphenylene library discussed hereinabove, in which up to two nitrogens were considered in the 12 possible positions. In this embodiment, a computer program was used to generate the set of 14 unique structures. In various embodiments, software designed to perform automated molecular modeling, was used to calculate a number of selected electronic properties for the 14 molecules, plus the parent triphenylene. FIG. 2 provides these data, along with eh triplet energies for three of the materials, pulled from literature data. FIGS. 19-23 and FIGS. 25-28 provide similar data for a library of nitrogen substituted pentacenes. The correspondence between the calculated and measured data is quite good. With this data set in hand it is now possible to "data-mine" the table to look for the material(s) that have the best parameters for a given application.

The first step of an exemplary method of the present invention comprises covering all the combinations of one or more substitution sites selected from substitutable sites existing on a basic molecular scaffold and utilizable substituents by using computers, creating all molecular structures possible for the basic molecular scaffold, and storing the created molecular structures in a database. If necessary, conditions for combinations may be preliminarily established, and molecular structures are generated based on all the combinations acceptable under the conditions in order to effectively utilize computer resources. The method of the present invention is characterized in that molecular structures satisfying the requirements necessary for exhibiting the physiological activity are identified from the exhaustive combinatorial compound database obtained by the above step (second step).

The generation of molecular structures to be stored in databases may be performed by, for example, the following steps: (A) step of selecting one or more basic molecular scaffolds on which molecular structures are generated from molecular scaffolds of known compounds or their analogous molecular scaffolds, or generating them by combination; (B) step of selecting one or more substitution sites to which substituents are introduced from one or more substitutable sites existing on the basic molecular scaffolds for each basic molecular scaffold; (C) step of nominating utilizable substituents, and if necessary, determining a maximum use of each nominated substituent, or corresponding the substituents to each substitution site; and (D) preparing all the possible combinations of all the substitution sites selected in the above step (B) and all the substituents nominated in the above step (C), or when an optional condition is established in the above step (C), preparing all the possible combinations satisfying the condition to generate molecular structures of compounds.

In various embodiments, in step (A), the basic molecular scaffolds can be suitably selected from basic structures of known OLED host compounds having desirable OLED host properties, for example, those already known to those skilled in the art such as HOMO (eV), LUMO (eV), the H-L gap (eV), $S_0$-$T_1$ (nm), oxidation potential (eV), reduction potential (eV), hole reorganization energy (eV), electron reorganization energy (eV), triplet energy (eV), dipole moment (D).

In the step (A), the basic molecular scaffold itself may also be generated by combination. For this purpose, for example, a method comprising generating all the combinations of one or more structural units having substitutable sites and one or more connectors can be employed. For example, the generation of the basic molecular structures may be performed by the steps set out below.

In various embodiments, in step (A), the basic molecular scaffold itself may also be selected from one or more molecular scaffolds generated by combination. For creating such molecular scaffolds, for example, a method comprising preparing all the combinations of one or more structural units having substitutable sites and one or more connectors to connect between two structural units can be employed. For example, the generation of the basic molecular structures may be performed by the following steps: (E) step of selecting one or more structural units from utilizable structural units; (F) step of optionally adding conditions for use of each structural unit such as the maximum use in a molecular structure, whether or not adjacent use is acceptable, and whether or not the use is limited only at the end; (G) step of selecting one or more connectors from utilizable connectors; (H) determining the minimum and maximum numbers of structural units to be connected and generating all possible combinations of all of the structural units and the connectors selected in the above steps (E) and (G) (or when conditions for use are established for one or more structural units in the above step (F), generating all possible combinations satisfying the conditions) to generate one or more basic molecular scaffolds.

Databases conventionally used or the database search method for identifying OLED host compounds have been limited to those of existing and available compounds, and no compound database constructed in an artificial manner as described above has been applied to the databases search method. Therefore, the above compound database of the present invention is novel. Computer readable media for storing the databases is not particularly limited so long as it can surely store information of database and the information can be read when required. For example, computer readable media available to those skilled in the art such as magnetic tapes, hard disks, floppy disks, and CD ROM can be employed.

The method for constructing the compound database not limited to those mentioned above, and any database constructed by any method may fall within the scope of the present invention so long as it covers an the combinations of substitution sites selected from all the substitutable sites of the basic molecular scaffold and nominated substituents. The above-described method for preparing a compound database should be understood as an example, and it will be readily understood by those skilled in the art that appropriate alterations and modifications can be made depending on a purpose.

The second step of the method of the present invention comprises the step of retrieving or extracting compounds that meet the requirements necessary for exhibiting the OLED host characteristics from the compound database mentioned above. This retrieval step is also performed by computers, and any algorithm may be used so long as it can be used as a method for retrieving compounds that meet the requirements necessary for exhibiting the desired OLED host characteristics.

For example, compounds can be retrieved by selecting conjugated structures and/or functional groups considered essential for exhibiting the desired OLED host activity based on the chemical structure of a known OLED host, and superposing the basic molecular scaffold of the OLED host and three-dimensionally relative positions of the selected functional groups with the three-dimensional structural information of molecular structures stored in the compound database to judge similarity between the known OLED host and the molecular structures. As such a superposing method, for example, programs such as ISIS-3D (MDL Information Systems, Inc.), UNITY (Tripos, Inc.), and Chem-X (Chemical Design, Ltd.) are available for those skilled in the art.

Hydrogen-bonding category numbers, information for force-field energy calculation, and information for generating conformations are assigned to three-dimensional atomic coordinates of molecular structures stored in the above compound database. The hydrogen-bonding category numbers are identification numbers for functional groups capable of forming hydrogen bonds, and assigned to heteroatoms that directly participate in hydrogen bonds by the functional groups. By referring to the number, a geometric structure of the functional group and the nature of the hydrogen bond are characterized, and the positions of partner hydrogen-bonding atoms (dummy atoms) are instantly generated.

The information of force field energy calculation is numbers of atoms and the state of electrons given to each atom for calculating intramolecular and intermolecular interaction energies by means of molecular force field being used as atom type number and atomic charge. The information for generating conformations is used for generating different conformations by systematically varying torsion angles of rotatable bonds, including the initial and final values of the torsion angles and values of step angle. It includes, for one bond to be rotated, a set of four atomic numbers defying the torsion angle, and the initial and final values of the torsion angle and a step angle of rotation.

D. Informatics

The libraries of the invention can be assembled using one or more method or computer program for executing the method. For example, as the automatic structure construction method, the method of Nisibata et al. can be used (Nishibata, Y. and Itai, A, *Tetrahedron*, 47, pp. 8985-8990, 1991; Nishibata, Y and Itai, A, *J. Med. Chem*, 36, pp. 2921-2928, 1993). The advantage of the automatic structure construction method is that it can broadly suggest desirable structures that meet the requirements for exhibiting OLED host compound characteristics regardless of known or unknown structures.

As the database method, there has been known a method of selecting compounds by judging whether or not types of functional groups, their relative three-dimensional positions and other in compounds correspond to those in a molecule known to function as an OLED host (for example, a method utilizing programs such as ISIS-3D:MDL Information Systems, Inc.; UNITY: Tripos, Inc.; and Chem-X: Chemical Design Ltd). This method can be utilized even when structural information of the target OLED host is not available, and therefore, it can be used for a wide range of purposes.

When the basic molecular scaffold of an OLED host compound that has been confirmed or assumed to have desirable OLED host material properties is available, a high-speed database search method based on the matching of topologies can be utilized program "EUREKA", PCT/JP96/03325). In this method, derivatives having desirable OLED host molecule characteristics or molecules having analogous structures (analogs) can be retrieved from a database based on the OLED host compound characteristics of the basic molecular scaffold.

The above database search method may be applied to a database composed of any compounds. In an exemplary embodiment, the library is composed only of known or commercially available compounds. This embodiment provides the advantage that, by searching a database of available (in-house or commercially available) compounds, one can immediately obtain hit compounds satisfying the requirements and evaluate their OLED host compound properties without syntheses. When a database storing only existing (reported) compounds is used, the method has an advantage that the identified compounds may at least exist, and synthetic method and physical properties thereof are often already known, although the compounds might not be immediately obtained without synthesis.

However, structures stored in such databases of available compounds or existing compounds constitute only a part of an astronomical number of structures that can theoretically exist, and the structures may sometimes be biased or they may exist sparsely among the possible structures. Therefore, they often do not contain any compounds with an optimum chemical structure endowing the maximum physiological activity in nature. When such a database is used and if retrieved compounds have desirable OLED host compound characteristics, there arise problems that truly promising compounds as lead compounds may be overlooked because of a weak activity of retrieved compounds, and that great effort and time may be needed for improving the retrieved compounds because of large deviation from the optimal structure.

When a certain structure has been confirmed as a lead, or alternatively, a lead has been found by random screening or the aforementioned methods, improvement to achieve the highest desired OLED host compound activity by chemical modification is conventionally performed by synthesizing a great number of derivatives and analogous compounds by trial-and-error, and therefore, it requires great efforts and time.

In various embodiments, the present invention provides a database that includes at least one set of data assay data acquired from an OLED host compound. The data contained in the database is acquired using a method of the invention. The database can be in substantially any form in which data can be maintained and transmitted, but is preferably an electronic database. The electronic database of the invention can be maintained on any electronic device allowing for the storage of and access to the database, such as a personal computer, but is preferably distributed on a wide area network, such as the World Wide Web.

The focus of the present section on databases, which include OLED host compound data is for clarity of illustration only. It will be apparent to those of skill in the art that similar databases can be assembled for any assay data acquired using an assay of the invention.

An array of methods for indexing and retrieving molecular information is known in the art. For example, U.S. Pat. Nos. 6,023,659 and 5,966,712 disclose a relational database system for storing biomolecular sequence information in a manner that allows sequences to be catalogued and searched according to one or more protein function hierarchies. U.S. Pat. No. 5,953,727 discloses a relational database having sequence records containing information in a format that allows a collection of partial-length DNA sequences to be catalogued and searched according to association with one or more sequencing projects for obtaining full-length sequences from the collection of partial length sequences. U.S. Pat. No. 5,706,498 discloses a gene database retrieval system for making a retrieval of a gene sequence similar to a sequence data item in a gene database based on the degree of similarity between a key sequence and a target sequence. U.S. Pat. No. 5,538,897 discloses a method using mass spectroscopy fragmentation patterns of peptides to identify amino acid sequences in computer databases by comparison of predicted mass spectra with experimentally-derived mass spectra using a closeness-of-fit measure. U.S. Pat. No. 5,926,818 discloses a multidimensional database comprising a functionality for multi-dimensional data analysis described as on-line analytical processing (OLAP), which entails the consolidation of projected and actual data according to more than one consolidation path or dimension. U.S. Pat. No. 5,295,261 reports a hybrid database structure in which the fields of each database record are divided into two classes, navigational and informational data, with navigational fields stored in a hierarchical topological map which can be viewed as a tree structure or as the merger of two or more such tree structures. As will be apparent to those of skill in the art, these database designs are applicable to the instant invention by substituting in the database architecture values for characteristics relevant to OLED host materials and putative host material structures for the therapeutic or biological agents and the data relevant to the therapeutic efficacy or distribution of these compounds, respectively.

Any acceptable relational database structure and software for working with this structure can be used in practicing the instant invention. A number of different relational database software programs available commercially (for example, from Oracle, Tripos, MDL, Oxford Molecular ("Chemical Design"), IDBS ("Activity Base")), and other software vendors which are capable of presenting a user (i.e., the operator) with a series of structured, predetermined questions and a list of acceptable answers for each question, and from the answer selected by the user for each question be able to search the database and select information (e.g., HOMO/LUMO energy) which are most responsive to the user's answers.

Relational database software is a preferred type of software for managing the data processed in practicing the instant invention. This type of software is well known to those of skill in the art. The specific descriptions and details, of such software therefore do not need to be described in detail in this specification. In an exemplary embodiment, the user, having logged on to the software/database system of the present invention, will simply encounter a series of interactive screens or Web site pages which pose the applicable questions seriatim and use the answers individually or in combination to retrieve from the database identification of the components which, when combined, will provide overall optimum properties of the system specified by the operator in response to the interactive questions from the software.

In an exemplary embodiment, the present invention provides a computer database comprising a computer and software for storing in computer-retrievable form OLED host compound characteristic data records (e.g, HOMO-LUMO gap) cross-tabulated, for example, with the structure of the compound.

The invention also provides for the storage and retrieval of a collection of data in a computer data storage apparatus, which can include magnetic disks, optical disks, magneto-optical disks, DRAM, SRAM, SGRAM, SDRAM, RDRAM, DDR RAM, magnetic bubble memory devices, and other data storage devices, including CPU registers and on-CPU data storage arrays. Typically, the target data records are stored as a bit pattern in an array of magnetic domains on a magnetizable medium or as an array of charge states or transistor gate states, such as an array of cells in a DRAM device (e.g., each cell comprised of a transistor and a charge storage area, which may be on the transistor). In one embodiment, the invention provides such storage devices, and computer systems built therewith, comprising a bit pattern encoding a protein expression fingerprint record comprising unique identifiers for at least 10 target data records cross-tabulated with compound structure.

When a promising candidate OLED host compound ("lead") is identified, the invention, in various embodiments, provides a method for identifying structurally related compounds, comprising performing a computerized comparison between a OLED host compound record stored in or retrieved from a computer storage device or database and at least one other OLED host compound structure. The comparison can include a comparison algorithm or computer program embodiment thereof (e.g., FASTA, TFASTA, GAP, BESTFIT). Other useful comparison algorithms are known to those of skill in the art and find use in the instant invention.

In an exemplary embodiment, the invention also preferably provides a magnetic disk, such as an IBM-compatible (DOS, Windows, Windows95/98/2000, Windows NT, OS/2) or other format (e.g., Linux, SunOS, Solaris, AIX, SCO Unix, VMS, MV, Macintosh, etc.) floppy diskette or hard (fixed, Winchester) disk drive, comprising a bit pattern encoding data from an assay of the invention in a file format suitable for retrieval and processing in a computerized sequence analysis, comparison, or relative quantitation method.

In various embodiments, the invention also provides a network, comprising a plurality of computing devices linked via a data link, such as an Ethernet cable (coax or 10 BaseT), telephone line, ISDN line, wireless network, optical fiber, or other suitable signal transmission medium, whereby at least one network device (e.g., computer, disk array, etc.) comprises a pattern of magnetic domains (e.g., magnetic disk) and/or charge domains (e.g., an array of DRAM cells) composing a bit pattern encoding data acquired from an assay of the invention.

The invention also optionally provides a method for transmitting assay data that includes generating an electronic signal on an electronic communications device, such as a modem, ISDN terminal adapter, DSL, cable modem, ATM switch, or the like, wherein the signal includes (in native or encrypted format) a bit pattern encoding data from an assay or a database comprising a plurality of assay results obtained by the method of the invention.

In an exemplary embodiment, the invention provides a computer system for comparing a query target to a database containing an array of data structures, such as putative OLED host compound structures generated by the method of the invention, and ranking database targets based on the degree of identity and gap weight to the target data. A central processor is preferably initialized to load and execute the computer program for alignment and/or comparison of the assay results. Data for a query target is entered into the central processor via an I/O device. Execution of the computer program results in the central processor retrieving the assay data from the data file, which comprises a binary description of an assay result.

The target data or record and the computer program can be transferred to secondary memory, which is typically random access memory (e.g., DRAM, SRAM, SGRAM, or SDRAM). Targets are ranked according to the degree of correspondence between a selected assay characteristic (e.g., HOMO/LUMO energy) and the same characteristic of the query target and results are output via an I/O device. For example, a central processor can be a conventional computer (e.g., Intel Pentium, PowerPC, α, PA-8000, SPARC, MIPS 4400, MIPS 10000, VAX, etc.); a program can be a commercial or public domain software package (e.g., UWGCG Sequence Analysis Software, Darwin); a data file can be an optical or magnetic disk, a data server, a memory device (e.g., DRAM, SRAM, SGRAM, SDRAM, EPROM, bubble memory, flash memory, etc.); an I/O device can be a terminal comprising a video display and a keyboard, a modem, an ISDN terminal adapter, an Ethernet port, a punched card reader, a magnetic strip reader, or other suitable I/O device.

In various embodiments provides the use of a computer system, such as that described above, which comprises: (1) a computer; (2) a stored bit pattern encoding a collection of parameters for OLED host materials obtained by the methods of the invention, which may be stored in the computer; (3) a comparison target, such as a query target; and (4) a program for alignment and comparison, typically with rank-ordering of comparison results on the basis of computed similarity values.

The following examples illustrate embodiments of the invention and are not intended to limit the scope of the compositions of the invention or the methods in which they find use.

EXAMPLES

Example 1

Experimental Section
Introduction

Due to synthetic accessibility, most reported H2P derivatives are based on 1,10-[f]phenanthroline. There is no report of H2Ps with potential high triplet energies with different nitrogen placement other than 1,10-positions. By placing nitrogen atoms at different position on H2P, physical properties such as triplet energy, redox potential, and charge transport ability can be tuned to meet the requirements of blue PhOLED applications. For example, three H2P isomers based on imidazo[4,5-f]-1,10-phenanthroline, imidazo[4,5-f]-3,8-phenanthroline, and imidazo[4,5-f]-4,7-phenanthroline derivative were shown to possess different triplet energies ranging from 2.76-2.91 eV. Moreover, significant discrepancies in their hole-transport properties lead to more than 10 times difference in device efficiencies for the H2P-based devices. Computations based on the methods of the invention for these H2P hosts not only showed triplet energies well-matched to the experimental values, but can also account for the trend of hole-transport ability by using the calculated hole reorganization energies. These results demonstrate that the physical properties for H2P hosts can be efficiently tuned by placement of nitrogen heteroatom(s) at different positions on the aromatic rings. The isomeric H2P hosts also possess different charge-carrier transport capabilities which are considered to be similar for isoelectronic isomers based on the same molecular scaffold.

The system for numbering positions on phenanthrene differs for phenanthroline (e.g., 4,5-diazaphenanthrene is equal to 1,10-phenanthroline). To clarify the nomenclature, as used herein, structures, atom labels, and ring-fused labels of phenanthrene and 1,10-phenanthroline are shown in Scheme 1.

Scheme 1. Structures, atom labels, and ring-fused labels for phenanthrene and 1,10-phenanthroline.

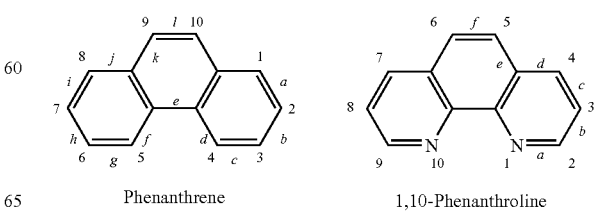

Phenanthrene 1,10-Phenanthroline 6,12-H2P-Ph:

A mixture of 1,10-phenanthroline-5,6-dione (210 mg, 1 mmol), benzaldehyde (106 mg, 1 mmol), aniline (112 mg, 1.2 mmol), and ammonium acetate (770 mg, 10 mmol) were dissolved in acetic acid (5 mL) and refluxed for 12 h. The reaction was cooled to RT and poured into NaOH$_{(aq)}$ (100 mL, 0.5M). The precipitation was dissolved in CH$_2$Cl$_2$ and extracted with NaOH$_{(aq)}$. The organic layer was combined, dried with MgSO$_4$, and evaporated. The resulting solid was washed with minimal amount of methanol to afford crude 1,10-H2P-Ph as a white solid (250 mg, 67% yield). The product was further purified by sublimation. $^1$H NMR (CDCl$_3$, 400 MHz) δ 9.19 (dd, J=4.4 Hz, 2.0 Hz, 1H), 9.15 (dd, J=8.0, 2.0 Hz, 1H), 9.04 (dd, 4.4 Hz, 2.0 Hz, 1H), 7.76 (dd, J=8.0, 4.4 Hz, 1H), 7.67-7.61 (m, 3H), 7.58 (d, J=8.0 Hz, 2H), 7.53 (d, J=8.0 Hz, 2H), 7.45 (dd, 8.0, 2.0 Hz, 1H), 7.35-7.27 (m, 4H); $^{13}$C (CDCl$_3$, 100 MHz) δ 152.2, 148.9, 147.9, 144.8, 144.2, 138.0, 136.1, 130.6, 130.5, 130.3, 129.8, 129.3, 128.8, 128.4, 128.0, 126.9, 124.0, 123.5, 122.2, 119.9; LCMS (m/z) 373 (M+H).

6,12-H2P-tBu:

A mixture of 1,10-phenanthroline-5,6-dione (630 mg, 3 mmol), pivalaldehyde (258 mg, 3 mmol), aniline (335 mg, 3.6 mmol), and ammonium acetate (2.31 g, 10 mmol) were dissolved in acetic acid (15 mL) and refluxed for 5 h. The reaction was cooled to RT and poured into NaOH$_{(aq)}$ (200 mL, 0.5M). The precipitation was collected and washed with deionized water to afford crude 1,10-H2P-tBu as a light green solid (1.1 g, 99% yield). The product was further purified by sublimation. $^1$H NMR (CDCl$_3$, 400 MHz) δ 9.16 (dd, J=4.4 Hz, 2.0 Hz, 1H), 9.09 (dd, J=8.0, 2.0 Hz, 1H), 8.99 (dd, 4.4 Hz, 2.0 Hz, 1H), 7.74-7.65 (m, 4H), 7.56 (d, J=8.0 Hz, 2H), 7.20 (dd, 8.0, 4.0 Hz, 1H), 6.94 (dd, 8.0, 2.0 Hz, 1H), 1.42 (s, 9H); $^{13}$C (CDCl$_3$, 100 MHz) δ 160.6, 148.5, 147.4, 144.4, 143.8, 139.2, 134.2, 130.6, 130.4, 130.2, 129.8, 127.6, 127.4, 124.0, 123.3, 122.0, 120.0, 35.6, 30.5; LCMS (m/z) 353 (M+H).

1,10-H2P-tBu:

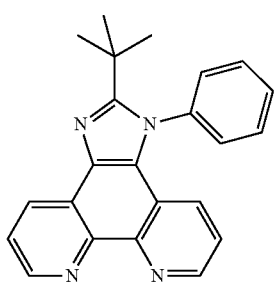 [SMILES: CC(C)(C)c1nc2c3cccnc3c3ncccc3c2n1-c1ccccc1]

A mixture of 1,10-phenanthroline-5,6-dione (630 mg, 3 mmol), pivalaldehyde (258 mg, 3 mmol), aniline (335 mg, 3.6 mmol), and ammonium acetate (2.31 g, 10 mmol) were dissolved in acetic acid (15 mL) and refluxed for 3 h. The reaction was cooled to RT and poured into NaOH$_{(aq)}$ (200 mL, 0.5M). The precipitation was collected and washed with deionized water. The product was purified by column chromatography on silica (EA/DCM/MeOH=19/19/2) to afford pure 1,10-H2P as a white solid (835 mg, 76% yield). The product was further purified by sublimation. $^1$H NMR (CDCl$_3$, 400 MHz) δ 9.16 (dd, J=4.4 Hz, 2.0 Hz, 1H), 9.09 (dd, J=8.0, 2.0 Hz, 1H), 8.99 (dd, J=4.4 Hz, 2.0 Hz, 1H), 7.74-7.65 (m, 4H), 7.56 (d, J=8.0 Hz, 2H), 7.20 (dd, J=8.0, 4.0 Hz, 1H), 6.94 (dd, J=8.0, 2.0 Hz, 1H), 1.42 (s, 9H); $^{13}$C (CDCl$_3$, 100 MHz) δ 160.6, 148.5, 147.4, 144.4, 143.8, 139.2, 134.2, 130.6, 130.4, 130.2, 129.8, 127.6, 127.4, 124.0, 123.3, 122.0, 120.0, 35.6, 30.5; LCMS (m/z) 353 (M+H); HRMS (m/z, ESI) calcd for C$_{23}$H$_{21}$N$_4$ 353.1766, found 353.1773.

3,8-H2P-tBu:

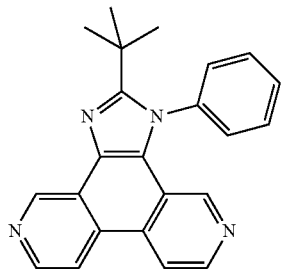 [SMILES: CC(C)(C)c1nc2c3cnccc3c3ccncc3c2n1-c1ccccc1]

A mixture of 3,8-phenanthroline-5,6-dione (630 mg, 3 mmol), pivalaldehyde (258 mg, 3 mmol), aniline (335 mg, 3.6 mmol), and ammonium acetate (2.31 g, 10 mmol) were dissolved in acetic acid (15 mL) and refluxed for 3 h. The reaction was cooled to RT and poured into NaOH$_{(aq)}$ (200 mL, 0.5M). The precipitation was collected and washed with deionized water. The product was purified by column chromatography on silica (EA/DCM/MeOH=9/9/2) to afford pure 3,8-H2P as a pale yellow solid (791 mg, 72% yield). The product was further purified by sublimation. $^1$H NMR (CDCl$_3$, 400 MHz) δ 10.14 (s, 1H), 8.82 (d, J=5.6 Hz, 1H), 8.63 (d, J=5.6 Hz, 1H), 8.44 (d, J=5.6 Hz, 1H), 8.38 (d, J=5.6 Hz, 1H), 8.09 (s, 1H), 7.74-7.65 (m, 3H), 7.58-7.56 (m, 2H), 1.43 (s, 9H); $^{13}$C (CDCl$_3$, 100 MHz) δ 160.9, 147.0, 144.5, 144.0, 143.6, 139.3, 135.0, 131.5, 130.7, 130.6, 130.3, 129.5, 128.4, 123.1, 120.0, 117.4, 116.3, 35.6, 30.5; LCMS (m/z) 353 (M+H); HRMS (m/z, ESI) calcd for C$_{23}$H$_{21}$N$_4$ 353.1766, found 353.1761.

4,7-H2P-tBu:

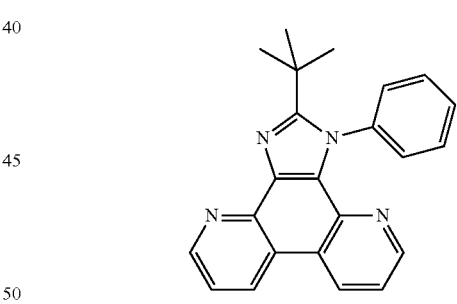

A mixture of 4,7-phenanthroline-5,6-dione (630 mg, 3 mmol), pivalaldehyde (258 mg, 3 mmol), aniline (335 mg, 3.6 mmol), and ammonium acetate (2.31 g, 10 mmol) were dissolved in acetic acid (15 mL) and refluxed for 3 h. The reaction was cooled to RT and poured into NaOH$_{(aq)}$ (200 mL, 0.5M). The precipitate was collected and washed with deionized water. The product was purified by column chromatography on silica gel (EA/Hex=2/1) to afford pure 3,8-H2P as an off-white solid (615 mg, 56% yield). The product was further purified by sublimation. $^1$H NMR (CDCl$_3$, 400 MHz) δ 9.18 (d, J=4.4 Hz, 1H), 8.91 (d, J=8.0 Hz, 1H), 8.86 (dd, J=8.0, 1.6 Hz, 1H), 8.44 (dd, J=4.4, 1.6 Hz, 1H), 7.61-7.52 (m, 4H), 7.49-7.47 (m, 2H), 7.37 (dd, J=8.0, 4.4 Hz, 1H), 1.46 (s, 9H); $^{13}$C (CDCl$_3$, 100 MHz) δ 161.5, 150.4, 148.8, 142.9, 140.2, 140.0, 131.9, 131.1, 130.8, 129.7, 128.9, 128.5, 122.7, 122.2, 120.1, 119.6, 110.0, 35.7, 30.7; LCMS (m/z) 353 (M+H); HRMS (m/z, ESI) calcd for $C_{23}H_{21}N_4$ 353.1766, found 353.1775.

Other exemplary structures of ligands that can be synthesized by methods analogous to those set forth above are provided in FIG. 5C.

Example 2

Screening Methods for OLED Materials

Once a library has been identified and the molecular modeling software has been used to predict the electronic properties of each member of that library, the library needs to be searched to find the optimal compounds for the chosen application, in the present case for use as host materials in phosphorescent OLEDs. In other embodiments, the library needs to be searched to find the optimal compounds for use as host materials in OLEDs which operate by one or more of phosphorescent, fluorescent, TADF, or triplet-triplet annihilation processes. The approach described here could be used for OLEDs of any color (e.g. blue). Exemplary screening methods include sorting the library by singlet, triplet, HOMO, LUMO energies as well as dipole moment and reorganization energies for holes and electrons and set thresholds for each, based on a given dopant. With sufficiently stringent thresholds only a small number of compounds in the library will meet all of the conditions to be chosen as a good host candidate.

Exemplary libraries of the invention are displayed in FIG. 2, FIG. 3, FIG. 5(a), FIG. 5(b), FIG. 5(c), and FIG. 5(d).

Figure 7:
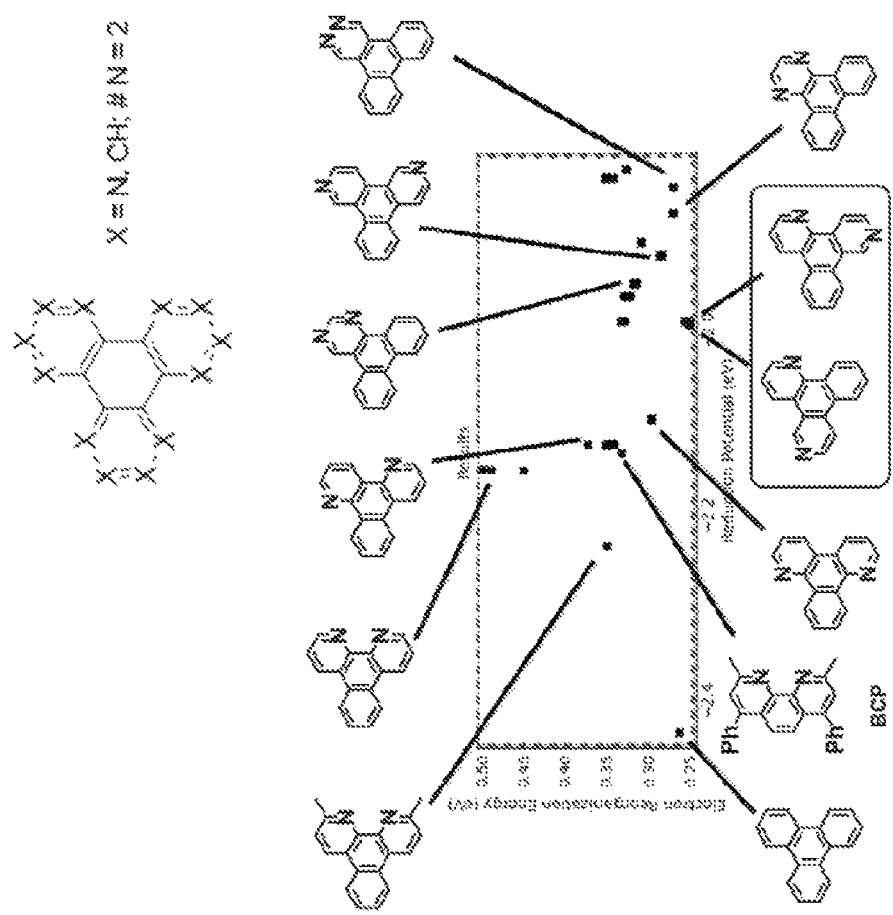
FIG. 7 shows exemplary members of a library based on a selected scaffold arranged in graphic manner with respect to their calculated electron reorganization energy and reduction potential.
Figure 8A:
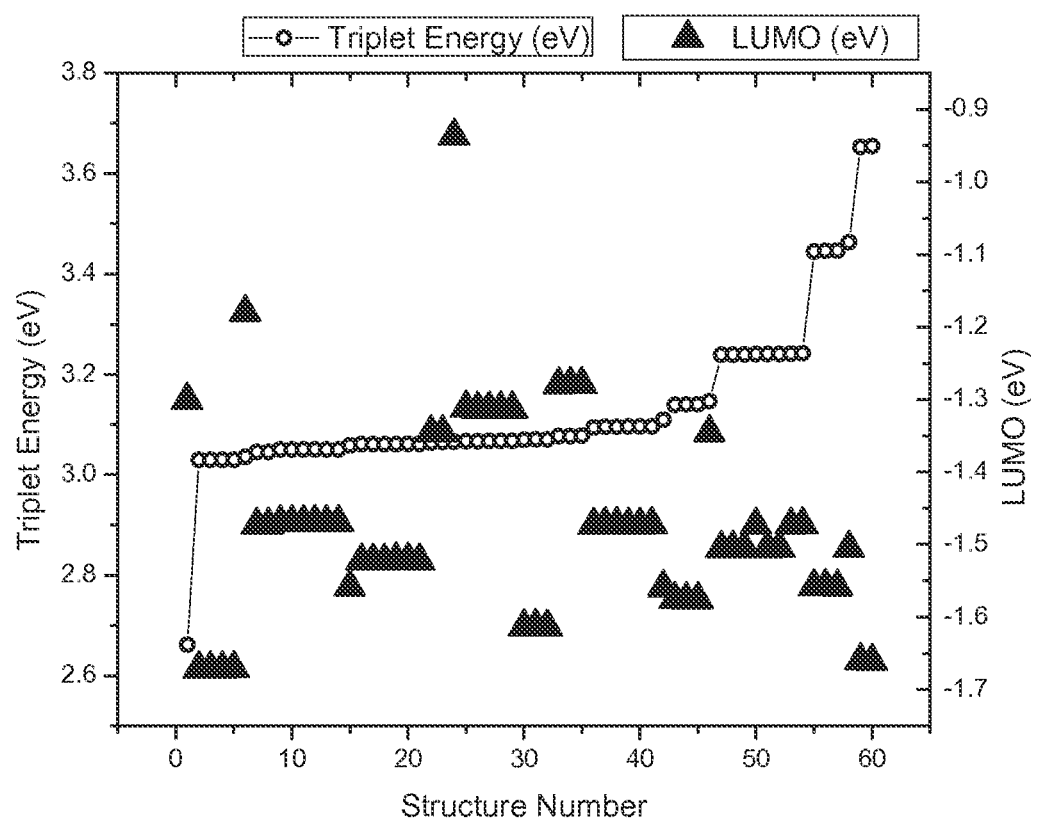
FIGS. 8A-B is a graphical display of the results of a small scale calculation for diaza-tPh. The plots show the data sorted to show the range of possible values for each parameter.
Figure 8B:
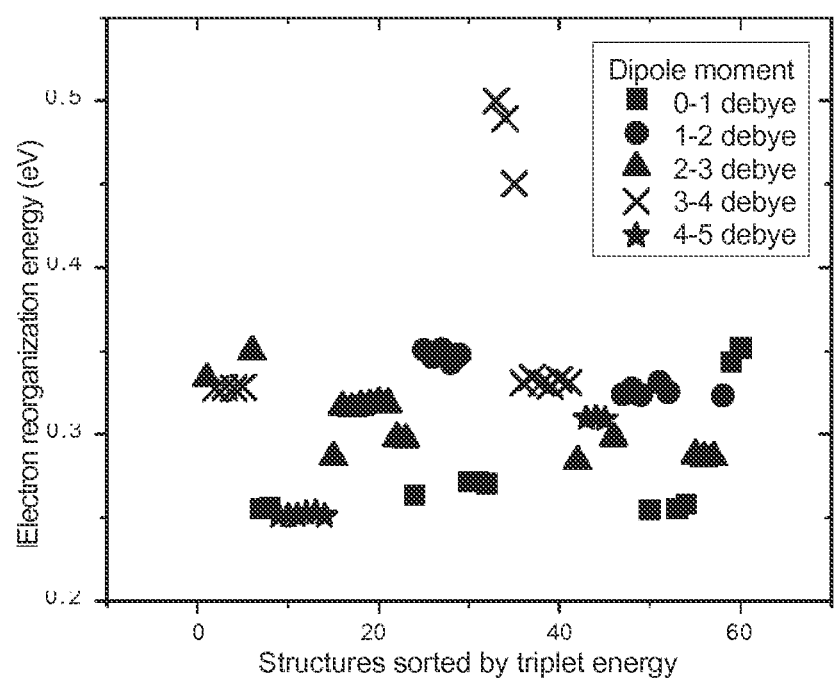
Figure 9:
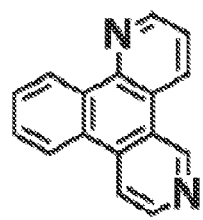
FIG. 9 displays exemplary aza-substituted tPh isomers cross-referenced with their reorganization energies and dipole moments.
Figure 9:
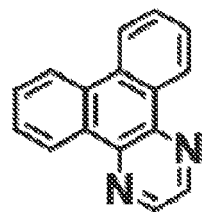
Figure 9:
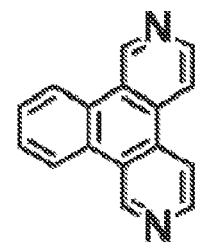

A small scale calculation was carried out a fairly low level of theory (run on a desktop computer) for diaza-tPh (FIG. 7). The level of theory was too low to get correct geometries for all of the isomers, so the inherent three fold symmetry of the molecule was not expressed. For this reason, instead of giving back 22 isomers of N2-tPh, the program returned 66 isomers. The plots in FIG. 7, FIG. 8, FIG. 9 and FIG. 10 show the data sorted to show the range of possible values for each parameter. tPh, BCP and dimethyl-N2-tPh were also calculated for comparison. The closely clustered groups of three are the same isomer.

Figure 10:
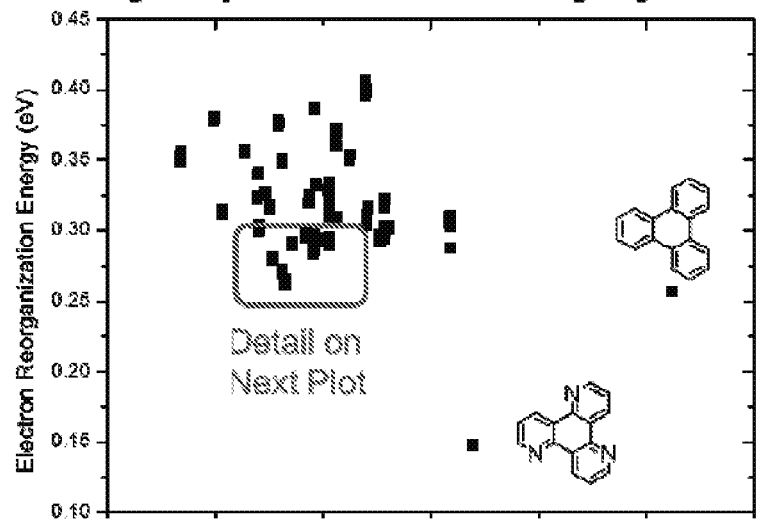
FIG. 10 is a graphical display of the data from a combinatorial study of triaza-tPh showing the calculated electron reorganization energy vs. the energy of the LUMO for these compounds.
Figure 11:
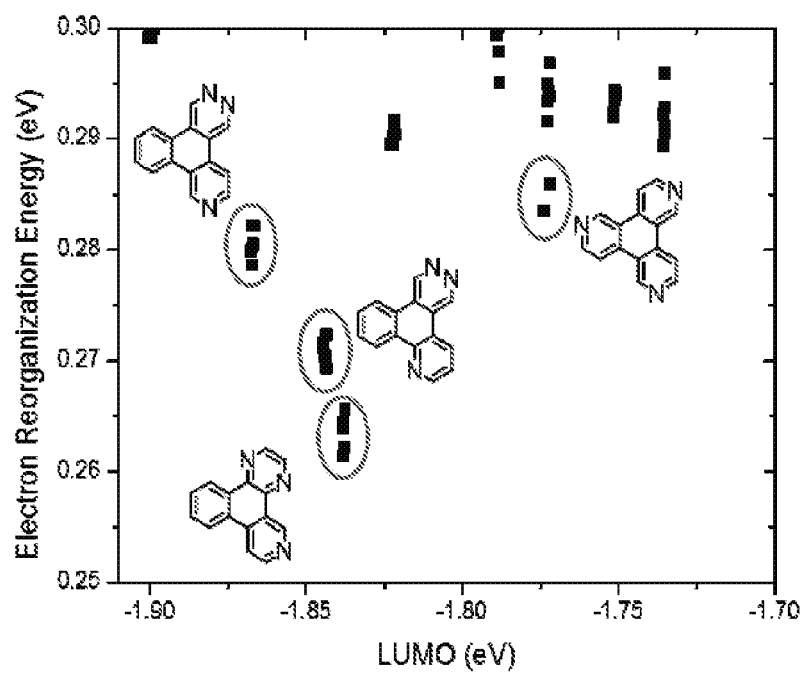
FIG. 11 is the detail of the highlighted inset of FIG. 10.
Figure 12:
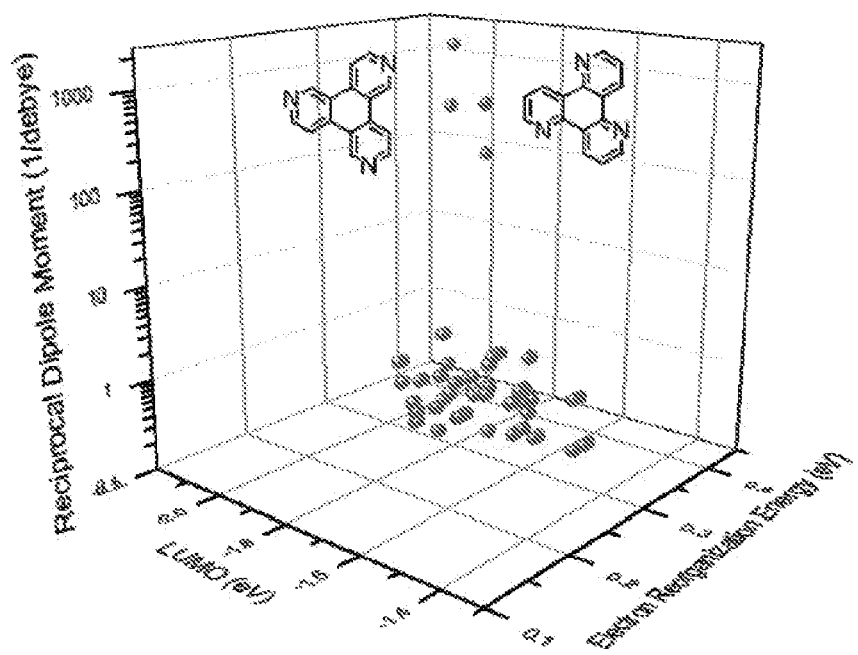
FIG. 12 is a 3D plot that highlights the molecules with low dipole moment. The vertical axis is the reciprocal of the dipole moment.
Figure 13:
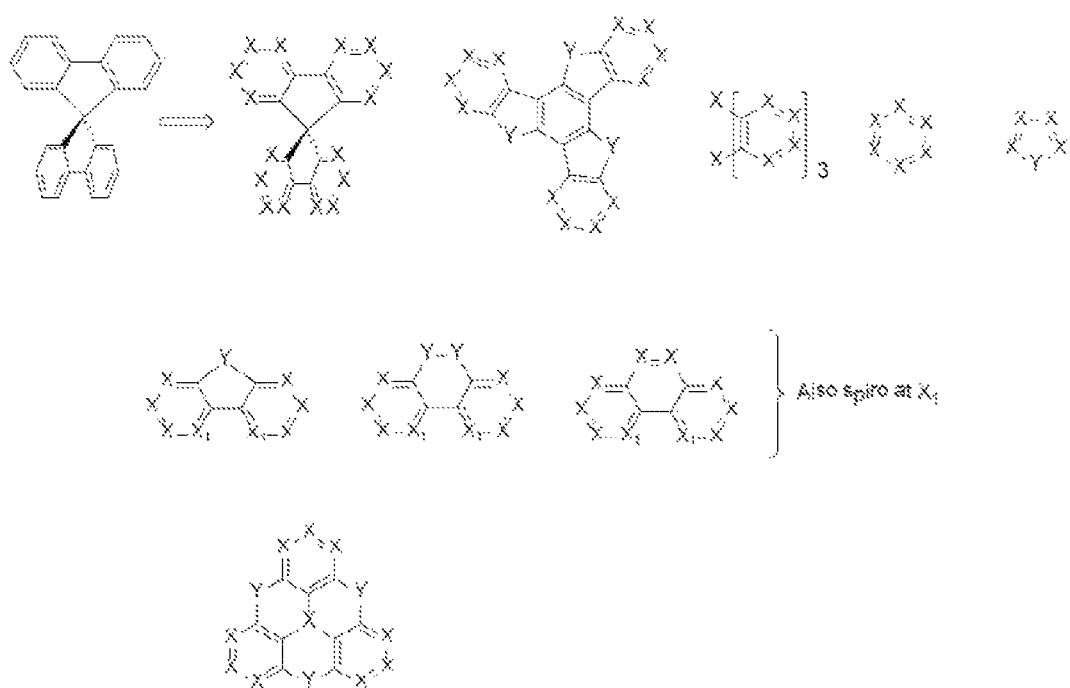
FIG. 13 shows exemplary scaffolds for a library of blue phosphorescent materials.

A combinatorial study of triaza-tPh was also performed. Again the level of theory used did not take advantage of the potential three fold and mirror plane symmetry, so there were some redundant structures, but there were clearly some of the compound that are expected to be superior OLED host materials. The data from this screen is shown in FIG. 10, FIG. 11 and FIG. 12.

Certain criteria are presently thought to be relevant to the selection of a useful OLED host material. These include, without limitation:

1. The host preferably has higher singlet and triplet energies than the dopant. While a host with high energy than the dopant is a necessary criterion to achieve high luminance efficiency from the dopant, this condition is not sufficient. If the host has a singlet or triplet energy 100-200 mV above that of the dopant quenching of dopant emission will still be observed, since the host levels can be accessed thermally from the dopant.

2. The host preferably has a HOMO that is deeper than that of the dopant or a LUMO that is shallower than the LUMO of the dopant, to promote hole and electron trapping, respectively. As in the excited state energies, there will be a minimum difference needed to effectively trap a given carrier at the dopant. Typically a minimum of 300 mV difference between dopant and host HOMO or LUMO levels is preferred to effectively trap holes or electrons, respectively, on the dopant. Carrier trapping at the dopant is important for achieving high efficiency electroluminescence.

3. In order for a molecular host material to have high carrier mobility, it preferably has a low molecular dipole moment. Amorphous films of polar molecular materials give rise to carrier trapping sites where the molecular dipoles occasionally line up to form local regions of positive or negative character, which act as carrier traps. This effect is well known for organic materials in fields well outside of OLEDs, such as electrophotography. Thus good host materials are typically not polar molecules.

4. A low reorganization energy for hole or electron transfer is preferred for the host to have high carrier mobility. Carrier transport involves intermolecular hopping which is an outer-sphere electron transfer process in a neat thin film. Theories are well developed to characterize these electron transfer processes and it is clear that low reorganization energy is requisite to fast intermolecular electron transfer and thus a high hopping rate and subsequent carrier mobility.

5. An available $\pi$-surface is preferred for host molecules to effectively communicate with each other. The key issue here is that if the frontier orbitals are largely found in the interior of the molecule, intermolecular overlap will be inefficient and carrier transfer between molecules will be impeded. The level of exposed $\pi$-surface can be estimated from the theoretical predictions of the molecular shape and extension of the filled and vacant $\pi$-symmetry orbitals. Quantifying the exposed surface involves evaluating the contact area with a large object, such as a Xe atom, which can only access the exposed surface of the molecule and not the interior regions inaccessible to the large atom. If one considers only the HOMO or LUMO orbitals in the analysis, the exposed $\pi$-surface can be evaluated for both filled (hole) and vacant (electron) surfaces to predict the strength of intermolecular interaction for promoting hole and electron transfer between molecules.

6. The molecular polarizibility is a parameter that relates to carrier conduction, energy transfer and lattice energy or sublimation temperature.

7. Prediction of the relative thermal stabilities of a series of compounds is accomplished by tabulating the number of carbon to heteroatom (i.e. non-hydrogen and non-carbon) bonds in each compound. These carbon-to-heteroatom bonds are generally weaker than C—C bonds.

Criteria 1 and 2 above relate to interactions of the host with a specific dopant, with a given electronic structure. Points 3-7 are related to the host material alone. Thus, an exemplary method to survey a host library is to first sort the library by 3-7 and then take the best materials from that screen and further sort them for their match to a given dopant (points 1 and 2).

Example 3

Screening Libraries for OPV Materials

Figure 14:
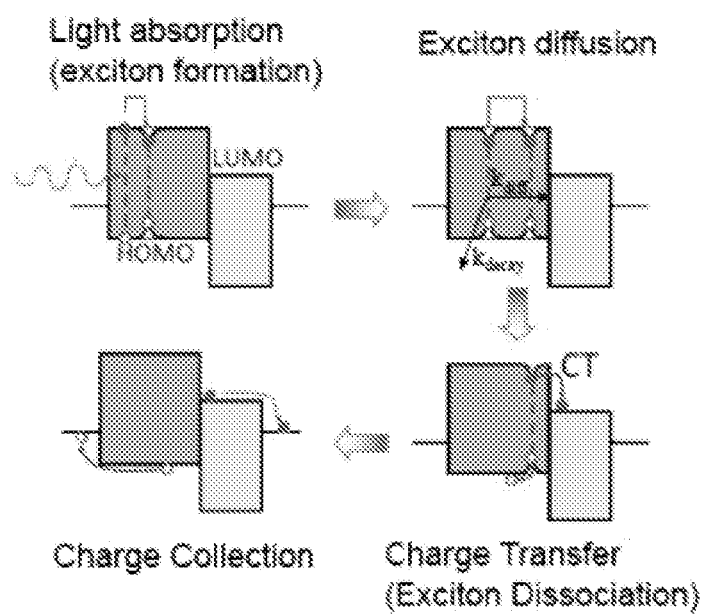
FIG. 14. General mechanism for photocurrent generation in OPVs. The donor is shown in dark and the acceptor in light.
Figure 15:
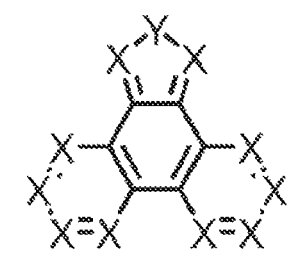
FIG. 15 shows exemplary scaffolds for a library of the invention and the calculated number isomers for each scaffold.
Figure 15:
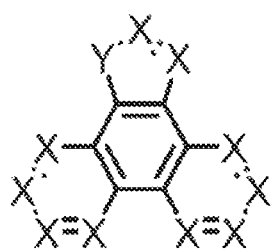
Figure 15:
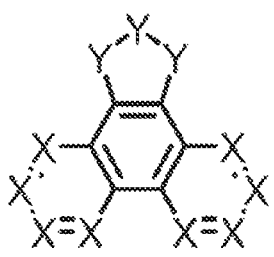
Figure 15:
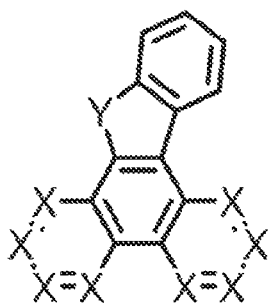
Figure 16:
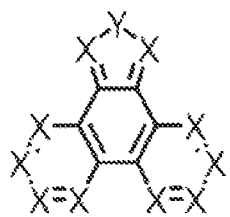
FIG. 16 displays an exemplary algorithm used to calculate the number of possible structures.
Figure 17A:
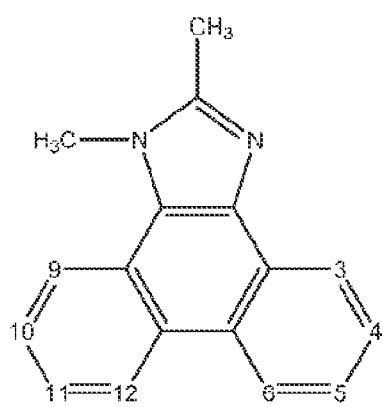

The basic mechanism of photocurrent generation in OPVs can be illustrated with two organic materials, one a net electron donor (D) and the other an acceptor (A). The process is illustrated in FIG. 14 and can be broken down into four sequential steps. The first step is light absorption, leading to exciton formation. The exciton can be formed in either the donor or acceptor layer. The exciton then diffuses to the D/A interface, or alternatively decays to the ground state. The optimal thickness is determined by the exciton diffusion length, which is related to the ratio of the diffusion rate, kdiff; to its natural decay rate, kdecay. The typically short exciton diffusion lengths (LD) of ~10 nm limiting the thickness of D and A layers, and thus the amount of light that can be collected and ultimately the efficiency of OPVs.

At the D/A interface, the exciton undergoes a charge transfer reaction, forming a hole and electron in the D and A layers, respectively. The driving force for charge transfer is the offset between the energy available from the excited donor and the acceptor lowest unoccupied molecular orbital (LUMO). In this process, an electron is transferred from the donor to the acceptor, in the exothermic process, "CT" in FIG. 14. A large driving force makes charge separation efficient. While the CT process leads to the hole and electron localized on separate molecules they are Coulombically bound at the interface. Thus, after the CT process a charge separation process takes places, that moves the hole and electron away from the D/A interface and generates free charges, which are transported to the electrodes (illustrated as "Charge Collection").

There are a number of criteria that relate to OPV materials. The following factors are presently believed to be important:

1. The acceptors are preferably readily reduced and donors readily oxidized.
2. The acceptor/donor preferably has very low reorganization energies for electron transfer, leading to a high carrier mobility.
3. A low dipole moment is preferred to reduced tendency for charge trapping from inhomogeneous polarization effects common in less symmetric molecules.
4. The π-system is preferably distributed over the accessible surface of the molecule to give strong electronic connection with ALL of its neighbors, leading to very little anisotropy for electron conduction.
5. The triplet energy of the donor and acceptor are preferably larger than the energy difference between the donor-HOMO and acceptor-LUMO ($\Delta E_{DA}$). If this is not the case the CT state will transfer its energy to the triplet and charge separation may not take place.
6. In order to achieve the highest open circuit voltage the $\Delta E_{DA}$ is preferably maximized and is within 300 mV of the energy of the lowest absorption and for either the donor or acceptor.
7. The absorption spectra of the donor and acceptor preferably do not overlap. Each preferably absorbs independently to achieve the broadest spectra coverage. Moreover, the donor and acceptor are preferably strongly absorbing to minimize the amount of material needed to efficiently absorb the incident light energy.

Clearly the parameters listed above are interdependent. In an exemplary embodiment, the library is screened by identifying a donor that satisfies 1-4. The identified donor is paired with the library of acceptors to find the acceptor that satisfies 1-4 and best fits 5-7 for the given donor. This donor acceptor pair is expected to give the highest cell voltage and current of the D/A pairs. Alternatively, one could start with an acceptor that meets the parameters in 1-4 and use it to screen a donor library with 5-7.

Example 4

Device Fabrication and Characterization

Glass substrates coated with patterned ITO (width of patterned stripes is 2 mm, thickness=150±10 nm; sheet resistance=20±5 $\Omega cm^{-2}$; transmission 84% at 550 nm; courtesy of Thin Film Devices, Inc.) were cleaned with soap and acetone. ITO substrates were exposed to ozone atmosphere (UVOCS T10×10/OES) for 10 min immediately before loading into the high-vacuum chamber. Deposition rates for layers of neat materials: NPD (0.1 nm/s), TCTA (0.1 nm/s), BCP (0.1 nm/s), LiF (0.01 nm/s), and Al (0.2 nm/s). Deposition rates for mixed films (% FIrpic content by volume): 1,10-H2P-Ph:FIrpic (8% FIrpic)—codeposition 1,10-H2P-Ph (0.21 nm/s):FIrpic (0.01 nm/s); 1,10-H2P-tBu:FIrpic (8% FIrpic)—codeposition 1,10-H2P-tBu (0.23 nm/s):FIrpic (0.01 nm/s). The devices were tested in air within 30 min after fabrication. Light coming out from the front surface was collected by a UV-818 Si photocathode leading to a Keithley 2400 SourceMeter/2000 multimeter coupled to a Newport 1835-C optical meter. Device current-voltage and light-intensity characteristics were measured using the LabVIEW program by National Instruments.

Device Structure:
ITO/NPD (40 nm)/TCTA (5 nm)/Host: FIrpic (8 wt %, 30 nm)/BCP (40 nm)/LiF (1 nm)/Al (120 nm)

TABLE 1

Performance of the OLEDs made using different host materials

|  | $V_{on}$ (V) | $L_{max}$ (cd/m$^2$) | $I_{max}$ (MA/m$^2$) | $\eta_{ext}$ (%) | $\eta_c$ (cd/A) | $\eta_p$ (lm/W) |
|---|---|---|---|---|---|---|
| 1,10-H2P-Ph | 4.6 | 577 | 202 | 0.34 | 0.75 | 0.13 |
| 1,10-H2P-tBu | 3.7 | 2156 | 150 | 5.37 | 12.4 | 8.11 |

Example 5

Methods

The results presented in this work were obtained using the Schrödinger Materials Science Suite (Version 1.0) (2013, Materials Science Suite version 1.0; Jaguar version 8.0 (New York: Schrodinger, LLC)). An electron acceptor candidate library was generated using the MSCombi structure enumeration module, substituting four nitrogen over 12 CH sites on the pentacene molecular framework producing 135 unique TAP structures, from a total of 495 symmetry-related structures. The molecular geometry, highest occupied molecular orbital (HOMO) energy, LUMO energy, HOMO-LUMO gap and dipole moment (pt) for each TAP structure was calculated in an automated fashion with the Jaguar density functional theory (DFT) package (Version 8.R42) (Bochevarov, et al., 2013, Int. J. Quantum Chem., 113:2110) using the B3LYP hybrid density functional, which corresponds to Becke's three-parameter exchange functional (B3) (Becke, A D, 1993, J. Chem. Phys., 98:5648) along with the Lee-Yang-Parr gradient-corrected correlation functional (LYP) (Lee, et al., 1988, Phys. Rev. B, 37:785). The Pople triple-c polarized basis set, 6-311G (Krishnan, et al., 1980, J. Chem. Phys., 72:650) was used in these calculations. Electron reorganization energies were computed for leading TAP structures using the Optoelectronic module, also at the B3LYP/6-311G level of theory. Data analysis and interactive property visualization was carried out using the built-in functionality of the Materials Science Suite.

Example 6

Optical Properties

Figure 29:
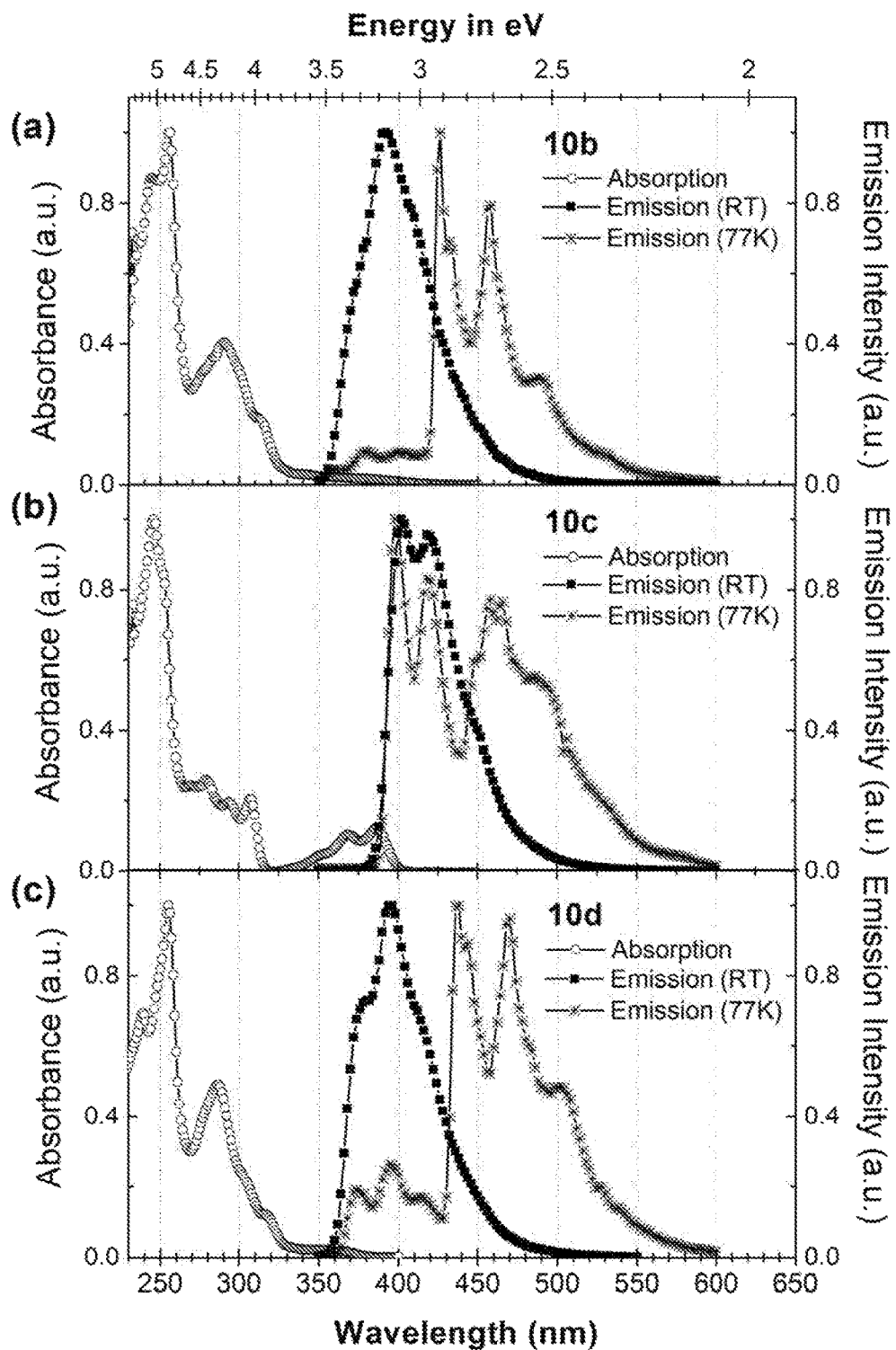
FIG. 29. Absorption (solid line), fluorescence (circle), and phosphorescence spectra (dashed line) of (a) 1,10-H2P, (b) 3,8-H2P, and (c) 4,7-H2P. In each subfigure, the bottom axis refers to wavelength and the top axis denotes energy.

As shown in FIG. 29, H2P compounds exhibited intense π-π* absorptions at around 250 nm and 290 nm. A tail from 320 nm to 400 nm was observed for 1,10-H2P and 4,7-H2P, whereas a relative distinct absorption was found for 3,8-

Figure 30:
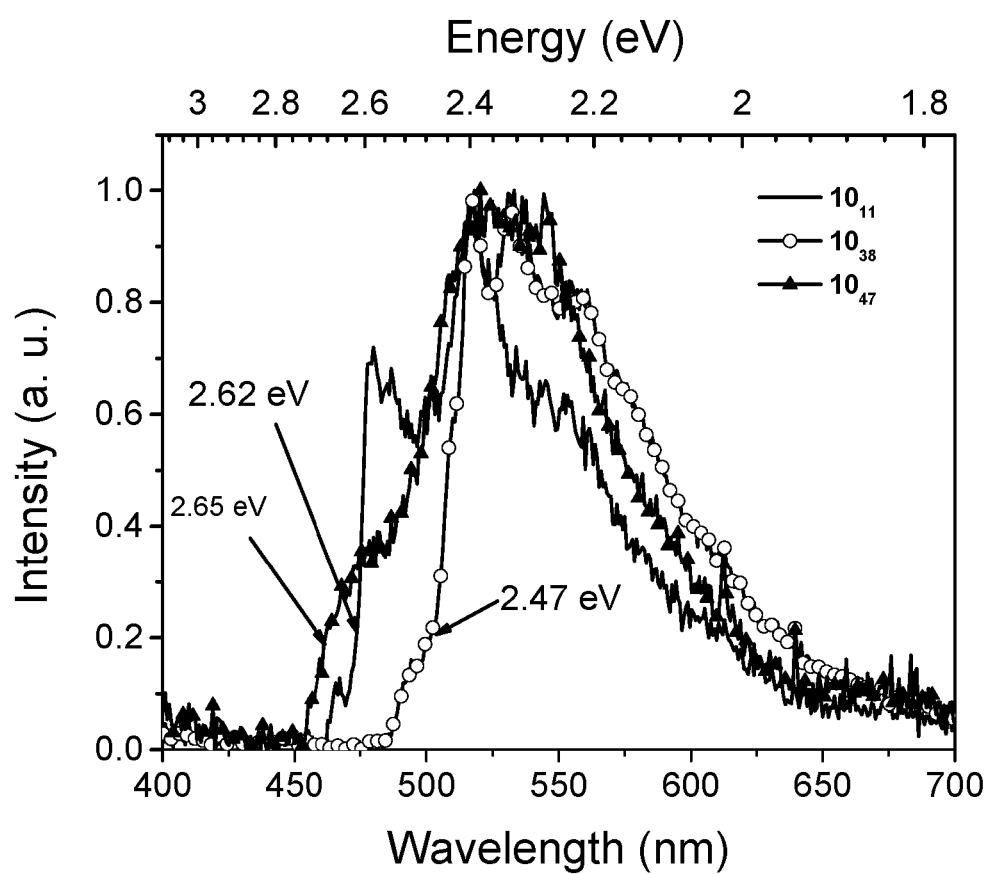
FIG. 30. Solid-state phosphorescent spectra for 1,10-H2P, 3,8-H2P, and 4,7-H2P.

H2P. These absorption features in longer wavelengths indicate a charge transfer characteristic. Optical energy gaps corresponding to the energy of the long wavelength edge of the absorption band for 1,10-H2P, 3,8-H2P, and 4,7-H2P were calculated as 3.26, 3.10, and 2.99 eV, respectively. 1,10-H2P, 3,8-H2P, and 4,7-H2P have emission maxima at 396, 402, and 392 nm, respectively, in 2-MeTHF solutions at RT. Three vibronic sub-bands from 0-0, 0-1, and 0-2 are involved in the emissions. The triplet energies ($E_T$) of 1,10-H2P, 3,8-H2P, and 4,7-H2P were calculated as 2.83, 2.76, and 2.91 eV, respectively, referring to the highest energy vibronic sub-band of the phosphorescence spectra measured in 2-MeTHF at 77K. The photoluminescent quantum yields (PLQYs) of 10% FIrpic-doped H2P vacuum-deposited films are 0.61, 0.20, and 0.40 for 1,10-H2P, 3,8-H2P, and 4,7-H2P, respectively. The lowest PLQY for 3,8-H2P as the host material is due to its lowest triplet energy where severe quenching of FIrpic emission was occurred. However, 4,7-H2P with the highest triplet energy did not provide the highest PLQY, probably indicating a lower triplet energy in the solid state than that of 1,10-H2P. The triplet energies of the H2P hosts are in good agreement with the values obtained from calculation. Triplet energies obtained in solid-states are 0.17-0.31 eV lower than those in solutions FIG. 30. The trend of solid-state triplet energies rationalizes the PLQYs of the 10% FIrpic-doped films. The different degrees of triplet energy decrease in solid state are presumably due to different molecular packing motifs. All physical data are summarized in Table 2.

Example 7

Device Characterization

Figure 31:
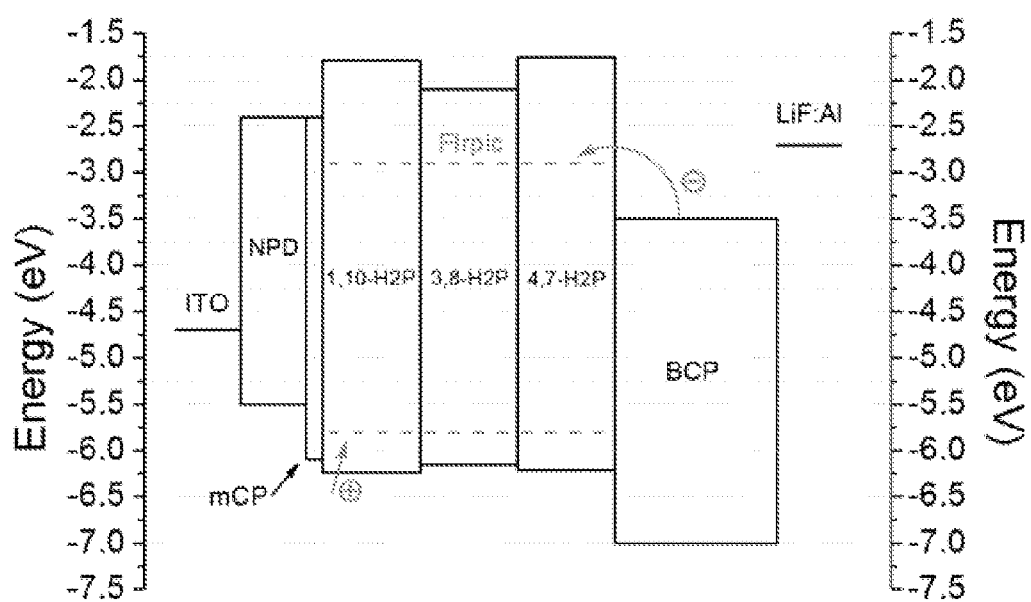
FIG. 31 shows Energy level diagram of the device.
Figure 32:
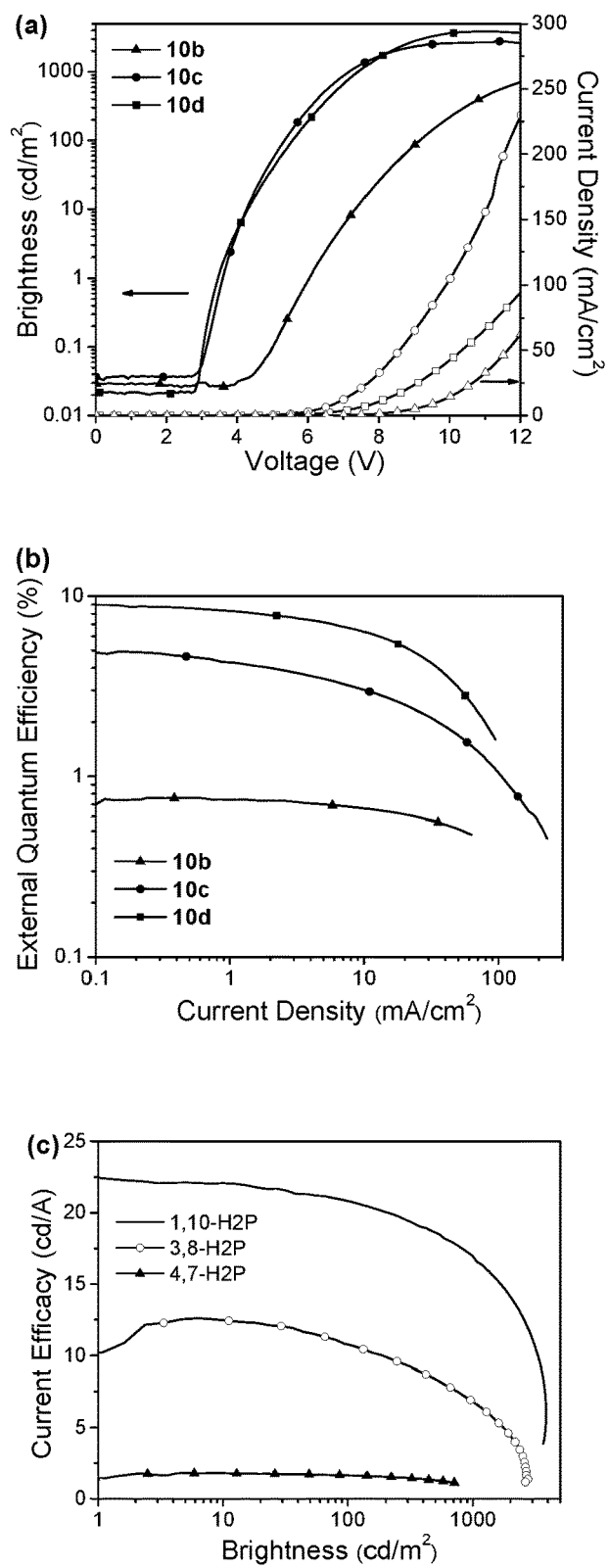
FIG. 32. (a) J-V-L characteristics, (b) plot of $\eta_{next}$ versus current density, and (c) current efficacy versus brightness.

A relatively simple configuration for OLED devices was utilized in this experiment: ITO/NPD (20 nm)/mCP (5 nm)/H2P: FIrpic (10%, 30 nm)/BCP (50 nm)/LiF (1 nm)/Al. NPD/mCP functioned as the hole-transporting layers while BCP was introduced as both hole-blocking and electron-transporting layer. The large energy gaps between the LUMO energy levels of BCP (−3.5 eV) and H2P hosts (−1.76 to −2.10 eV) suggests that electrons would be injected from BCP into FIrpic directly (FIG. 31). FIG. 32 shows the current density-voltage-brightness (J-V-L) characteristics, external quantum efficiency ($\pi_{ext}$) versus current density, and current efficacy versus brightness of these devices.

The device performance with 3,8-H2P as the host exhibited the maximum $\pi_{ext}$ above the theoretical limit when considering a 20% PLQY, suggesting an outstanding charge carrier balance. 1,10-H2P-based device showed a higher maximum $\pi_{ext}$ than that of the 3,8-H2P-based device due to its higher triplet energy which better prevents the reverse energy transfer from FIrpic back to the host. Surprisingly, the 4,7-H2P-based device exhibited the worse device performance among the three hosts despite a 40% QY in the 10% FIrpic-doped film. The inferior device performance is reminiscent of the highest hole reorganization energy obtained from computational calculation, which suggests a potential issue for a poor hole-transport capability for 4,7-H2P. Since the energy gaps between the HOMO energy levels of mCP (−6.1 eV) and H2P hosts (−6.15 to −6.24 eV), are small, holes have good chance to inject from mCP to H2P hosts. As a result, host material with poor hole-transport property might encumber the holes to hop from the host to dopant, leading to poor device efficiencies. Table 3 summarizes the device data.

TABLE 2

Summary of calculated and experimental physical properties for 1,10-H2P, 3,8-H2P, and 4,7-H2P

|  | $E_{oxi}$ (V)[a] | | $E_{red}$ (V)[b] | | Hole reorg. | Elec. reorg. | $E_T$ (eV) | | PLQY[g] | HOMO/LUMO[h] |
| --- | --- | --- | --- | --- | --- | --- | --- | --- | --- | --- |
|  | Calc. | Exp. | Calc. | Exp. | (eV)[e] | (eV)[f] | Calc. | Exp. |  |  |
| 1,10-H2P | +1.42 | +1.17[c] | −2.28 | −2.51[c] | 0.28 | 0.22 | 2.90 | 2.83 | 0.61 | −6.24/−1.79 |
| 3,8-H2P | +1.46 | +1.11[d] | −1.96 | −2.25[c] | 0.25 | 0.31 | 2.84 | 2.76 | 0.20 | −6.15/−2.10 |
| 4,7-H2P | +1.48 | +1.15[d] | −2.18 | −2.54[c] | 1.01 | 0.32 | 2.92 | 2.91 | 0.40 | −6.21/−1.76 |

[a]Oxidation potential vs. ferrocene/ferrocenium redox couple.
[b]Reduction potential vs. ferrocene/ferrocenium redox couple.
[c]Quasi-reversible.
[d]irreversible.
[e]Calculated hole reorganization energy.
[f]Calculated electron reorganization energy.
[g]Photoluminescent quantum yield of vacuum deposited films containing 10% FIrpic-doped H2P.
[h]HOMO and LUMO energy levels were calculated from the redox potential with published correlation.

TABLE 3

EL performance of devices with H2P hosts

|  | $V_{on}$[a] (V) | $L_{max}$ (cd m$^{-2}$) | $\eta_{ext, max}$ (%) | $\eta_{ext}$@100 nit (%) | $\eta_{ext}$@1000 nit (%) | $\eta_{p, max}$ (lm W$^{-1}$) | $\eta_p$@1000 nit (lm W$^{-1}$) | $\eta_p$@1000 nit (lm W$^{-1}$) | $\eta_{c, max}$ (cd A$^{-1}$) | $\eta_c$@100 nit (cd A$^{-1}$) | $\eta_c$@1000 nit (cd A$^{-1}$) |
| --- | --- | --- | --- | --- | --- | --- | --- | --- | --- | --- | --- |
| 1,10-H2P | 3.4 | 3866 (11 V) | 9.32 | 8.60 | 7.02 | 18.99 | 10.65 | 6.58 | 22.53 | 20.79 | 16.97 |
| 3,8-H2P | 3.6 | 2780 (10 V) | 5.08 | 4.32 | 2.79 | 9.16 | 5.80 | 2.79 | 12.60 | 10.72 | 6.91 |
| 4,7-H2P | 6.0 | 710 (10 V) | 0.76 | 0.69 | — | 0.79 | 0.51 | — | 1.81 | 1.64 | — |

[a]Turn-on voltage at a brightness of 1 cd m$^{-2}$.

Figure 33:
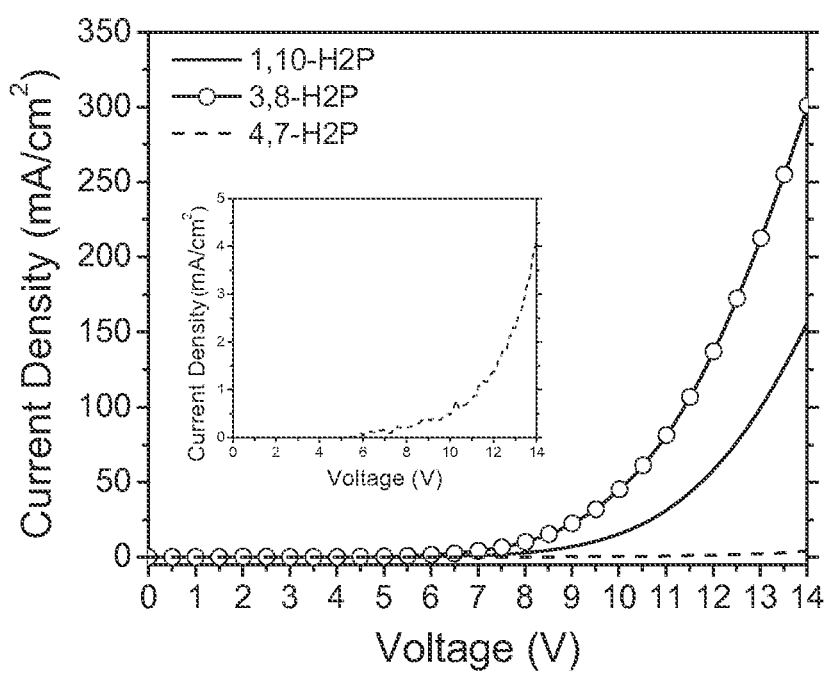
FIG. 33 shows current density-voltage (I-V) characteristics of hole-only devices. Inset: zoomed plot for 4,7-H2P.

To evaluate the hole-transport property, hole-only devices were fabricated with a structure of ITO/NPD (20 nm)/mCP (5 nm)/H2P (40 nm)/NPD (20 nm)/Al. FIG. 33 depicts the current versus voltage characteristics of the hole-only devices. As expected, the device with 4,7-H2P did not show any turn-on characteristic between 0 and 14V, suggesting an exceptional poor hole-transport capability as compared to those of 1,10-H2P and 3,8-H2P. The faster turn-on for the device with 3,8-H2P than that of the device with 1,10-H2P can account for the superior charge carrier balance of 3,8-H2P-based device in terms of its better hole-transport property.

Results and Discussion

The development of new classes of electron acceptor materials for OPV application would expand the selection of possible electron donor materials and enable new devices and architectures that could lead to greatly enhanced OPV efficiencies. Leading requirements for an electron acceptor to replace fullerenes in OPV include a low LUMO energy in the range −3.0 to −4.1 eV, for efficient charge separation, and a band gap 2.0 eV, for increased solar absorption. Pentacene is one of the most widely used organic semiconductors (Laquindanum, et al., 1996, *Chem. Mater.*, 8:2542; Klauk, et al., *J. Appl. Phys.*, 92:5259; Nanditha, et al., 2007, *Appl. Phys. Lett.*, 90:113505; Chen, et al., 2007, *Appl. Phys. Lett.*, 91:191109; Hung, et al., 2011, *Thin Solid Films*, 519:5270) and as such, represents a known molecular framework to chemically tailor for application as an OPV acceptor.

Substitution of nitrogen into the carbon framework (N for CH) of pentacene scaffold is a strategy that has been examined in previous reports (Winkler, et al., 2007, *J. Am. Chem. Soc.*, 129:1805; Chen, et al., 2006, *Chem Phys Chem.*, 7:2003; Liang, et al., 2010, *Chem. Mater.*, 22:6438; Liang, et al., 2011, *Adv. Mater.*, 23:1535; Liang, et al., 2011, *Adv. Mater.*, 23:5514). Winkler and Houk (Winkler, et al., 2007, *J. Am. Chem. Soc.*, 129:1805) carried out a survey of N-rich pentacenes using hybrid DFT. It was found that replacement of CH by N strongly enhances the electron affinity and may facilitate electron transfer. Chemical modification involving added electron withdrawing substituents has also been examined. Chen and Cao (Chen, et al., 2006, *Chem Phys Chem.*, 7:2003) analyzed the properties related to charge transfer for fluorine-derivatized pentacenes and azapentacenes, also using hybrid DFT, They found that N-incorporation was preferable over fluorination for increasing the electron affinity while maintaining useful reorganization energies.

The performance of DFT in predicting HOMO and LUMO energies at a level useful for energy level engineering for organic optoelectronics has been studied previously (Zhan, et al., 2003, *J. Phys. Chem. A,* 107:4184; Djurovich, et al., 2009, *Org. Electron.,* 10:515). Although Koopman's Theorem (Koopmans, T, 1933, Physica, 1:104) is not strictly valid for DFT, Kohn-Sham orbital energies from hybrid DFT have been shown to correlate with experimental frontier orbital measurements. Dixon and co-workers (Zhan, et al., 2003, *J. Phys. Chem. A,* 107:4184), surveyed numerous atomic and molecular systems and found that for HOMO, LUMO and other related molecular properties, comparisons between results from hybrid DFT and experimental data gives generally applicable linear correlations. The prediction of LUMO energies was found to be more sensitive to basis set effects than HOMO energies. It was found that if a basis set produces negative LUMO energies then it is applicable for studying trends across a chemical library. Djurovich et al. (Djurovich, et al., 2009, *Org. Electron.*, 10:515) compared hybrid DFT LUMO energies to experimental values measured for a series of organic semiconductor compounds using inverse photoelectron spectroscopy, optical or electrochemical measurements. A predictive linear correlation was found for experimental and calculated LUMO levels, with hybrid DFT LUMO providing an accurate estimate of the transport level for organic semiconductors.

Figure 19:
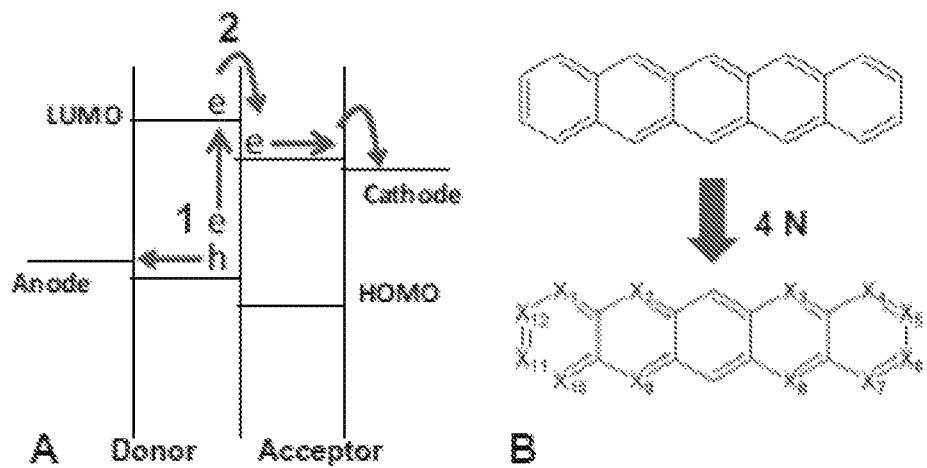
FIG. 19. (A) General mechanism for photocurrent generation in OPVs; (B) elemental substitution pattern used for generating the TAP structure library (4N for CH, over 12 sites on the pentacene scaffold).

A library of 495 TAPs structures was generated using a combinatorial substitution scheme producing 135 stereochemically unique TAPs to investigate the effect of nitrogen substitution on the properties of pentacene related to performance as an OPV acceptor material. The chemical space is defined by exhaustively substituting four N for CH over 12 sites on the pentacene scaffold as shown in FIG. 19. Quantum chemical analysis of these structures allows the determination of property limits and variability of this focused chemical library for alternative OPV electron acceptor materials.

Figure 20:
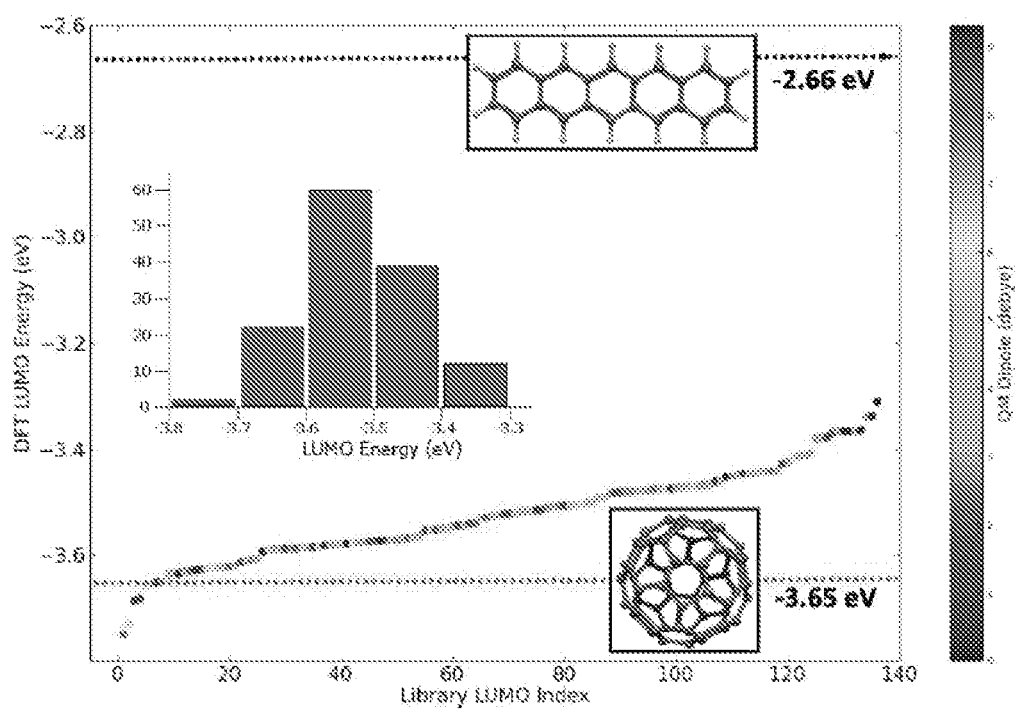
FIG. 20. Ordered plot and histogram (inset) of the B3LYP/6-311G** calculated LUMO energies ($E_{LUMO}$) for the TAP OPV acceptor library. Reference structures, pentacene and C60 are shown with their respective $E_{LUMO}$ values indicated.
Figure 21:
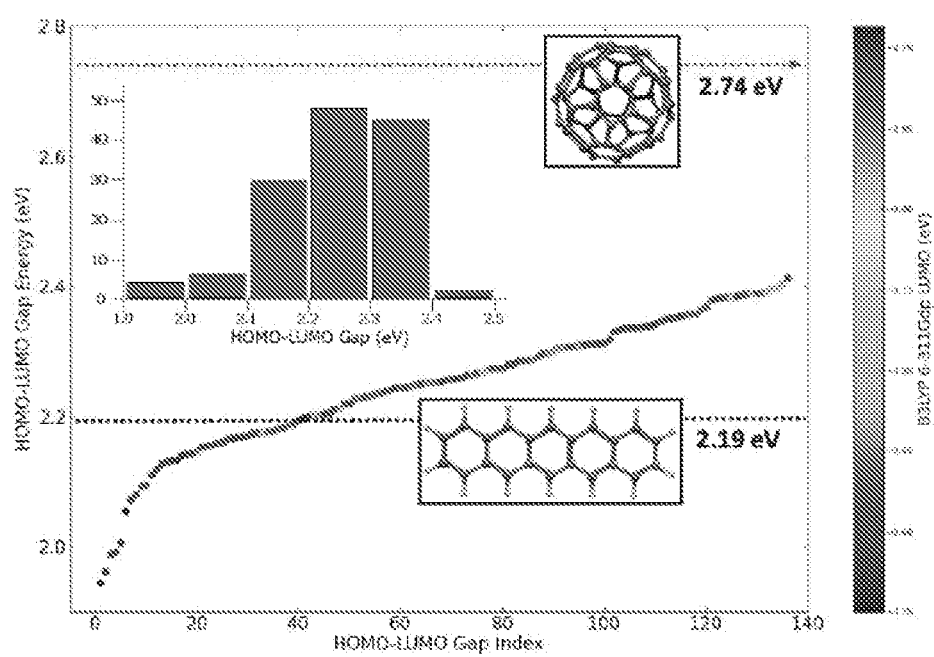
FIG. 21. Ordered plot and histogram (inset) of the B3LYP/6-311G** calculated HOMO-LUMO gap energies ($E_g$) for the TAP OPV acceptor library. Reference structures, pentacene and C60 are shown with their respective $E_g$ values indicated.
Figure 22:
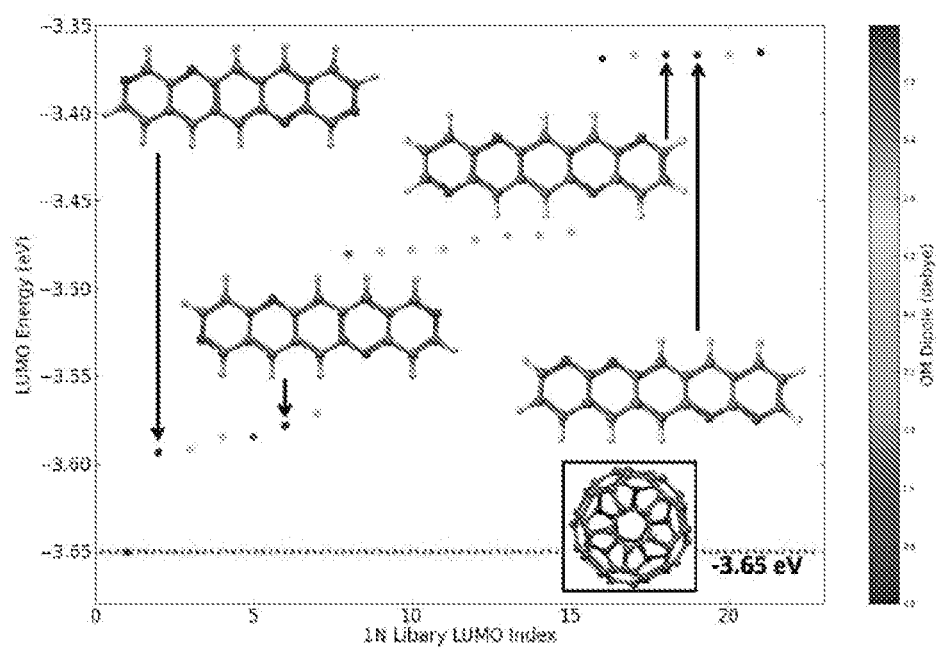
FIG. 22. Ordered plot of the B3LYP/6-311G** calculated LUMO energies ($E_{LUMO}$) for the pyridyl-TAP subset of the OPV acceptor library. Zero dipole pyridyl-TAP structures are shown and their respective $E_{LUMO}$ values are indicated, along with the $E_{LUMO}$ of C60 for comparison.
Figure 23:
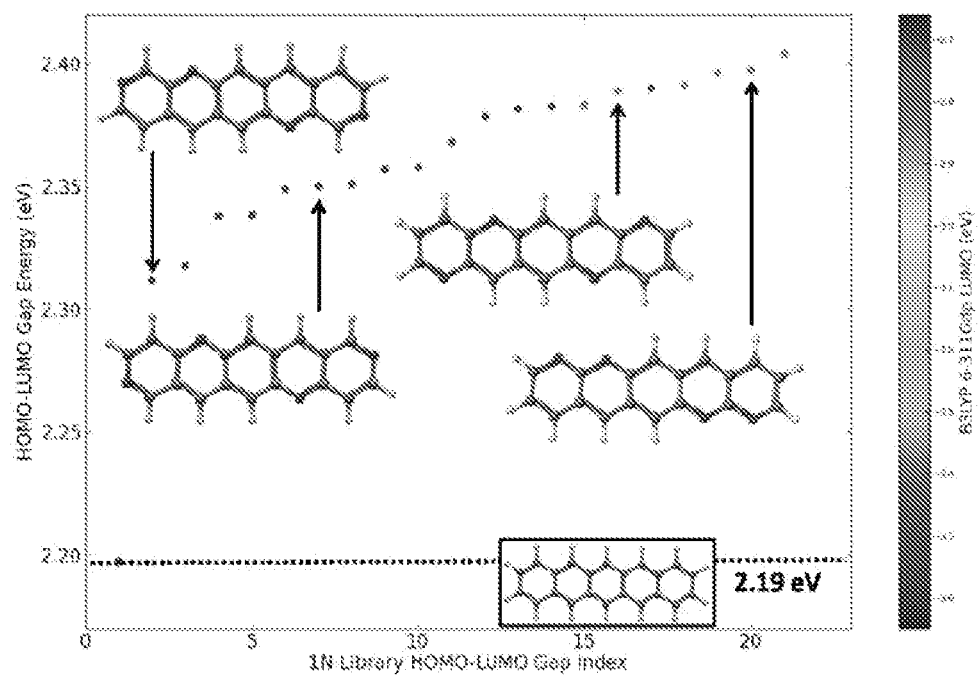
FIG. 23. Ordered plot of the B3LYP/6-311G** calculated HOMO-LUMO gap energies ($E_g$) for the pyridyl-TAP subset of the OPV acceptor library. Zero dipole pyridyl-TAP structures are shown and their respective $E_g$ values are indicated, along with the $E_g$ of pentacene for comparison.

Molecular properties for each TAP candidate, along with those for pentacene and C60, was computed using the B3LYP/6-311G** level of theory. The properties under examination are the LUMO energies ($E_{LUMO}$), HOMO-LUMO energy gap ($E_g$) and electric dipole moment ($\mu$). The property ranges, averages and standard deviations for the calculated TAPS library are presented in FIG. 26. To visualize the variation and distribution of the properties, ordered library plots and histograms for $E_{LUMO}$ and $E_g$ over the entire TAP library, and for the pyridyl-TAP subset of the library (containing one N substitution per six-member ring), are given in FIGS. 20-23, respectively. In each of the figures, the plot shows the variability in the property across the library by means of a scatter plot (XY) with the TAP structures ordered so that the relative property of interest is increasing. For comparison, the ordered property plots for the complete TAP library are annotated to show the calculated values for pentacene and C60. The insets on FIGS. 20 and 21 show the property distribution across the library as a histogram of the calculated property. FIGS. 22 and 23 are annotated to label pyridyl-TAP structures of interest.

An immediate observation in FIGS. 20 and 21 is that across the chemical space defined by substituting 4N into the pentacene core scaffold, both $E_{LUMO}$ and $E_g$ vary nearly uniformly over their range, with no large discontinuous regions of property values. FIG. 20 shows the variability and distribution of the LUMO orbital energies across the structure library. The desired effect of nitrogen incorporation on $E_{LUMO}$ is obvious with all of the N4-pentacene candidates having an $E_{LUMO}$ lower than that of pentacene by 1.09-0.65 eV. The entire TAPS library has $E_{LUMO}$ in a range that is comparable to that of C60, to within 0.1-0.34 eV, indicating their suitability as potential candidates for electron acceptors for OPV. As shown in FIG. 20 and in FIG. 26, the $E_{LUMO}$ values have a range of 440 meV, from −3.75 to −3.31 eV. The library LUMO average energy and standard deviation is −3.52 and 0.09 eV, respectively. Interestingly, some of the TAP structures are predicted to have an $E_{LUMO}$ lower than that of C60.

One property that can affect the charge transport efficiency for organic semiconductor materials is the electric dipole moment. A sizeable dipole moment can promote strong electron-dipole interactions in the amorphous condensed phase that lead to charge trapping which in turn impede electron transport. The computed dipole moments (t) across the library vary from 0 to 9.32D. The mean and standard deviation for the TAPS library dipole moment are 4.05D and 2.33D, respectively. The data points in FIG. 20 are colored by dipole moment, with the range represented by the colors blue to red, for t=0 to 9.32D respectively.

Another desirable characteristic for OPV acceptor materials is a small HOMO-LUMO gap, satisfying a partial requirement for enhanced optical adsorption. From FIG. 21 and FIG. 26, the $E_g$ energies span from 1.94 to 2.41 eV, with a mean and standard deviation of 2.25 and 0.10 eV, respectively. All of the TAP library structures are predicted to have a more favorable $E_g$ than C60 by 0.80-0.33 eV. The library minimum and maximum $E_g$ values almost evenly bracket the $E_g$ of pentacene (+0.25, −0.22 eV). The data points in FIG. 21 are colored by $_{ELUMO}$, with values from low to high energies represented by blue to red, respectively.

Figure 27B:
Figure 27B:
Figure 27B:

To identify promising TAP acceptor candidates, the 135 structure library was first sorted by $E_{LUMO}$, selecting the top 25 low LUMO energy structures, which were then sorted by dipole moment to select 15 exemplary TAP structures. According to Marcus theory, electron transfer within a molecular homodimer can be described by an Arrhenius-like rate equation with an exponential dependence on the negative reorganization energy. For charge transport in organic solids, the intramolecular reorganization energy is the dominant contribution, over medium polarization effects (inner- and outer-sphere reorganization energy, respectively). The electron intramolecular reorganization energy is calculated as the sum of the difference between the vertical and adiabatic electron affinity for a neutral TAP molecule and the difference between the vertical and adiabatic ionization energy of the reduced TAP species. In this work, intramolecular electron reorganization energies were calculated for these systems using the B3LYP/6-311G level of theory. The structure, frontier orbital energies and electron reorganization energies ($\lambda^-$) for the 15 exemplary TAP acceptor candidates are presented in FIG. 27, along with data for pentacene for comparison. The pentacene properties under consideration are calculated to be −2.66, 2.20 and 0.13 eV, for $E_{LUMO}$, $E_g$ and $\lambda^-$, respectively. These values can be compared to results of previous theoretical studies, which give pentacene properties in agreement (<0.1 eV) with those reported here. For example, pentacene $\lambda^-$ was computed to be 0.131 and 0.133 eV, with the 6-311+G (Winkler, et al., 2007, *J. Am. Chem. Soc.*, 129:1805) and 6-31G** basis sets (Chen, et al., 2006, *Chem Phys Chem.*, 7:2003), respectively. Many of the TAP structures shown in FIG. 27 incorporate pyrazinyl- or pyridazinyl-subunits that contain two nitrogens substituted into one ring either on adjacent or opposing sites. For these structures the $E_{LUMO}$ range from −3.57 to −3.69 eV, whereas the $E_g$ vary from 2.41 to 1.99 eV. All of the computed $\lambda-$ values for the TAP structures in FIG. 27 are less than 0.25 eV and comparable to that of pentacene (+0.03 to +0.09 eV), suggesting that these structures should show efficient electron mobility as long as good electronic coupling in the condensed phase is achieved.

Figure 24:
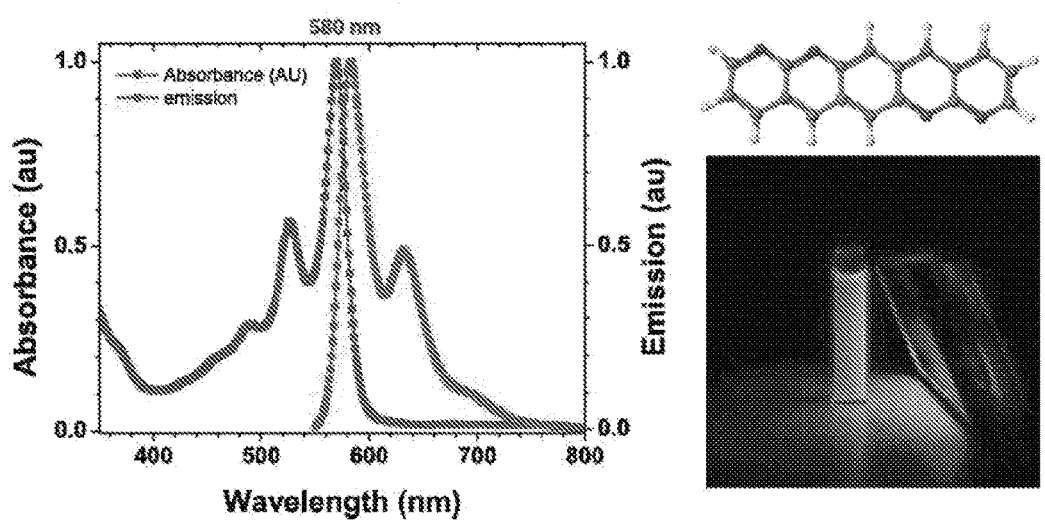
FIG. 24. Experimental optical adsorption and emission spectra (in pyridine, right) and molecular structure and laboratory image for a representative pyridyl-TAP (1,7,8,14 N$_4$-pentacene).
Figure 25:
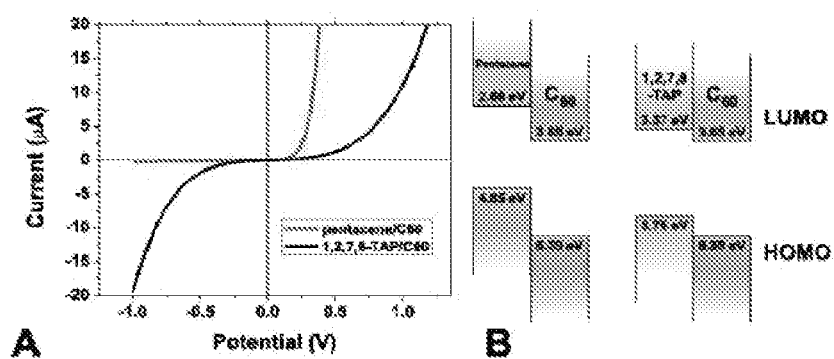
FIG. 25. Current-voltage (I-V) curves for a bilayer devices with structure ITO/pentacene (or 1,2,7,8-TAP) (250 Å)/C60 (400 Å)/BCP (100 Å)/Al (left) and calculated schematic energy level diagram for the active materials (right) (BCP=2,9-dimethyl-4,7-diphenyl-1,10-phenanthroline).

In addition to having desirable properties associated with performance as electron acceptors for OPV, a paramount requirement for lead TAP structures is that they are relatively inexpensive and synthetically accessible. In identifying suitable TAPs targets for synthesis we focus on a subset of the full TAPs library. TAP candidates that have a single N substitution per ring, composed of only pyridyl-subunits, should be more synthetically tractable. The subset of pyridyl-TAPs consists of 20 structures. From FIG. 26, the subset $E_{LUMO}$ range is from −3.59 to −3.37 eV, which is 0.93-0.71 eV lower and 0.06-0.28 eV higher than the $E_{LUMO}$ of pentacene and C60, respectively. For the pyridyl-subset the range of $E_g$ is 0.09 eV, with a minimal value of 2.31 eV, a mean value of 2.37 eV and a standard deviation of only 0.03 eV. The $E_{LUMO}$ and $E_g$ ordered subset plots are presented in FIGS. 22 and 23. Selecting for pyridyl-TAP structures that have a zero dipole moment to minimize solid state trapping, defines another set of exemplary TAP structures. These structures are presented in FIG. 28, with FIGS. 22 and 23 annotated to indicate the associated $E_{LUMO}$ and $E_g$ data points. The pyridyl-TAP structure with the lowest $E_{LUMO}$ (−3.59 eV) and smallest $E_g$ (2.31 eV) is structure 17 (also structure 9 in FIG. 27A), corresponding to 2,6,8,12-TAP and has an electron reorganization energy, $\lambda^-$, of 0.16 eV. The pyridyl-TAP candidates in FIG. 28, have LUMO energies from −3.59 to −3.37 eV, which are significantly lowered from the LUMO of pentacene (−2.66 eV) and are comparable to that of C60 (−3.65 eV). Their HOMO-LUMO gaps are from 2.31-2.40 eV, which is 0.43-0.34 eV smaller than the $E_g$ for C60. The zero dipole pyridyl-TAPS have favorable $\lambda^-$ values of about 150-170 meV. The use of virtual screening to evaluate the TAP design space for application as OPV acceptors can provide valuable guidance to experimental efforts. With this data in hand, we have recently developed a synthetic route to synthesize TAPs in significant quantities for caracterization and device testing. In FIG. 24, the measured optical adsorption and emission spectra for 1,2,7,8-TAP in pyridine is shown (structure 19, FIG. 28). While the observed optical gap (2.13 eV) is lower than the HOMO-LUMO gap predicted from calculation (2.39 eV), the transition energy and vibrationally structured lineshape is consistent with that displayed by dissolved pentacene (Nijegorodov, et al., 1997, *Spectrochim. Acta A*, 53:1813). The sharp, well-resolved vibronic progressions displayed in FIG. 24 are independent of concentration, indicating that the spectra originate from molecular, as opposed to aggregated, species. Synthesis, characterization and device testing of the electrical properties for this compound and other isomers is underway to establish TAPs as viable core scaffold for the development of OPV acceptors and will be reported elsewhere. However, preliminary data from simple bilayer heterostructure devices show behavior consistent for a material with a LUMO energy comparable to that of C60 (FIG. 25). A device made with pentacene/C60 displays the asymmetric I-V curve expected for a diode due to the 1 eV offset between the frontier orbital energies of the two materials, whereas a similar device made with 1,2,7,8-TAP/C60 displays a near symmetric I-V trace. The electrical response from the latter device is indicative of a near barrierless flow of electrons between the two materials thus indicating a close match in HOMO/LUMO energies for the two compounds.

The molecular design space for a target chemical application can be enormous, depending on the structural motifs and rules used to define the candidate structures. Exhaustive screening, illustrated here, provides a complete survey of the property landscape across the library, establishing limits and identifying lead candidates. Other virtual screening strategies can be used to attempt to reduce the computational effort required to identify lead structures. For example, inverse design approaches start with selected target properties and then use methods such as simulated annealing or genetic algorithms to identify candidates that fulfill the requirements with a minimal number of simulations (Glen, et al., 1995, *J. Comput. Aided Mol. Des.*, 9:181; Venkatasubramanian, et al., 1995, *J. Chem. Inform. Modeling*, 35:188).

The results presented herein demonstrate a powerful approach for exploring the property limits of chemical design space for organic optoelectronic materials. The examples presented provide details of the effect of incorporating four nitrogens into the pentacene scaffold (TAPs) on calculated LUMO energies and HOMO-LUMO gaps, primary properties associated with performance as electron acceptor materials in OPV devices. Additionally, exemplary TAP acceptor candidates were identified and further evaluated with respect to their electron reorganization energies. A subset of pyridyl-TAPs was discussed as tractable synthetic targets for experimental synthesis and development into a new class of OPV acceptor materials.

As demonstrated herein, the present invention provides methods for automating complex material modeling workflows to explore formulation and chemical design space to rapidly accelerate materials discovery, analysis and optimization. In addition to identifying specific lead candidates to pursue experimentally, the resulting aggregate of data from high-throughput modeling studies reveals structure-property trends and underlying physical patterns.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A data storage and retrieval apparatus comprising a combinatorial library stored thereon, the combinatorial library comprising a plurality of organic semiconductors,
    wherein each member of the plurality of organic semiconductors comprises a planar component, said planar component comprises a π-electron system distributed over the entirety of said planar component, each member of said plurality of organic semiconductors is cross-referenced with at least one electronic property of said organic semiconductor,
    wherein each member of the plurality of organic semiconductors is a polycyclic heteroaromatic compound, and the combinatorial library is configured for creating host material compounds for organic light emitting diodes (OLEDs).

2. The data storage and retrieval apparatus of claim 1, wherein each of said plurality of organic semiconductors is associated with at least one electronic property for said semiconductor, wherein said at least one electronic property is a member selected from oxidation potential (eV), reduction potential (eV), hole reorganization energy (eV), electron reorganization energy (eV), triplet energy (eV), single energy (eV), dipole moment (D), HOMO (eV), LUMO (eV).

3. The data storage and retrieval apparatus of claim 1, wherein said library comprises from about 2 to about 20,000,000 members.

4. The data storage and retrieval apparatus of claim 1, wherein said library comprises from about 2,000 to about 10,000,000 members.

5. The data storage and retrieval apparatus of claim 4, wherein said library comprises from about 10,000 to about 1,000,000 members.

6. The data storage and retrieval apparatus of claim 1, wherein said library is in a relational database format.

7. The data storage and retrieval apparatus of claim 1, wherein each member of said library comprises a scaffold of a H2P chemical structure, the H2P chemical structure being a fused aromatic ring system comprising two hexagon rings and a pentagon ring fused to a central benzene ring.

8. The data storage and retrieval apparatus of claim 1, wherein each member of said library comprises a scaffold of 1,10-phenanthroline.

9. A computer-implemented method for creating OLED host compounds, comprising:
    (1) generating a compound database of compounds storing molecular structures covering all the combinations of one or more substitution sites selected from substitutable sites existing on a basic molecular scaffold and utilizable substituents, wherein each compound in the compound database is a polycyclic heteroaromatic compound;
    (2) extracting molecular structures satisfying a plurality of requirements for exhibiting desired OLED host compound characteristics from the compound database; and
    (3) identifying desired OLED host compounds and outputting results for fabricating organic light emitting diodes.

10. The method of claim 9 wherein a molecular scaffold of a known OLED host material having the desired OLED host compound characteristics or a molecular scaffold analogous thereto is used as the basic molecular scaffold.

11. The method of claim 9 wherein one or more molecular scaffolds of OLED host material candidates generated by the automatic structure construction method or molecular scaffolds analogous thereto are used as the basic molecular scaffold.

12. The method of claim 9 wherein two or more basic molecular scaffolds generated by combination are used.

13. The method of claim 12 wherein the generation of the basic molecular scaffolds by the combination is carried out by a method comprising generating all the combinations of one or more structural units having substitutable sites and one or more connectors.

14. The method of claim 13 wherein the generation of basic molecular scaffolds by combination is carried out by a method comprising the following: (E) selecting one or more structural units from all utilizable structural units; (F) optionally adding conditions for using each structural unit; (G) selecting one or more connectors from all utilizable connectors; and (H) determining the maximum and minimum numbers of structural units to be connected and generating all possible combinations from all structural units and all connectors selected in (E) and (G), or when conditions for using the units are established in (F), generating all possible combinations satisfying the conditions, to create one or more basic molecular scaffolds.

15. The method of claim 9 wherein the extracting (2) is carried out by a method comprising extracting molecular structures with a property which is a member selected from oxidation potential (eV), reduction potential (eV), hole reorganization energy (eV), electron reorganization energy (eV), triplet energy (eV), single energy (eV), dipole moment (D), HOMO (eV), LUMO (eV) having a value appropriate for the compound to function as a host compound for an OLE.

16. The method of claim 9 wherein the extracting process (2) is carried out by a method of selecting a lead candidate compound functioning as an OLED host compound from a database containing compound property data for each atom and covalent bond scheme in compounds of the library by using a computer, which comprises selecting a lead candidate compound by matching one or more query molecules capable of acting as host materials in OLEDs with compounds stored in a database based on information about atom types and covalent bond schemes of the query molecules.

17. The method of claim 9 wherein the extraction process (2) is carried out by a method comprising using a computer to assess similarity with a compound confirmed or assumed to have the desired OLED host material characteristics based on the molecular structure of the compound or arrangement of functional groups in the compound.

18. A computer readable media comprising a three-dimensional database stored thereon used for a method for creating host material compounds for OLEDs by database search methods using computers, the database storing molecular structures covering all the combinations of one or more substitution site selected from all substitutable sites existing on a basic molecular scaffold and utilizable substituents, wherein each molecular structure is a polycyclic heteroaromatic compound.

19. The computer readable media of claim 18, wherein the database is constructed by using the molecular scaffold of a known OLED host compound having a desired OLED host compound characteristic or a molecular scaffold analogous thereto as the basic molecular scaffold.

20. The computer readable media of claim 18, wherein the database is constructed by using the molecular scaffold of an OLED host compound candidate generated by the automatic structure construction method or a molecular scaffold analogous thereto as the basic molecular scaffold.

* * * * *